US008352485B2

(12) United States Patent  (10) Patent No.: US 8,352,485 B2
Dexter et al. (45) Date of Patent: Jan. 8, 2013

(54) SYSTEMS AND METHODS OF DISPLAYING DOCUMENT CHUNKS IN RESPONSE TO A SEARCH REQUEST

(75) Inventors: Jeffrey Matthew Dexter, Rancho Santa Margarita, CA (US); Robert Smik, Cupertino, CA (US)

(73) Assignee: Tigerlogic Corporation, Irvine, CA (US)

( * ) Notice: Subject to any disclaimer, the term of this patent is extended or adjusted under 35 U.S.C. 154(b) by 0 days.

(21) Appl. No.: 13/316,394

(22) Filed: Dec. 9, 2011

(65) Prior Publication Data

US 2012/0084321 A1 Apr. 5, 2012

Related U.S. Application Data

(63) Continuation of application No. 12/035,546, filed on Feb. 22, 2008, now Pat. No. 8,078,630.

(51) Int. Cl.
*G06F 17/30* (2006.01)
(52) U.S. Cl. .......................................... 707/758; 715/200
(58) Field of Classification Search .................. 707/758; 715/200
See application file for complete search history.

(56) References Cited

U.S. PATENT DOCUMENTS

| 5,873,077 | A | 2/1999 | Kanoh et al. |
| 6,006,217 | A | 12/1999 | Lumsden |
| 6,184,885 | B1 | 2/2001 | DeStefano |
| 6,411,962 | B1 | 6/2002 | Kupiec |
| 6,594,658 | B2 | 7/2003 | Woods |
| 6,711,565 | B1 | 3/2004 | Subramaniam et al. |
| 6,732,086 | B2 | 5/2004 | Plow et al. |
| 6,763,388 | B1 | 7/2004 | Tsimelzon |
| 6,839,702 | B1 | 1/2005 | Patel et al. |
| 7,047,287 | B2 | 5/2006 | Sim et al. |
| 7,299,222 | B1 | 11/2007 | Hogan et al. |
| 7,584,422 | B2 | 9/2009 | Ben-Yehuda et al. |
| 2001/0032200 | A1 | 10/2001 | Greyvenstein |
| 2003/0146939 | A1 | 8/2003 | Petropoulos et al. |
| 2004/0006740 | A1 | 1/2004 | Krohn et al. |
| 2004/0193596 | A1 | 9/2004 | Defelice et al. |
| 2004/0199874 | A1 | 10/2004 | Larson |
| 2004/0267724 | A1 | 12/2004 | Hoffman |
| 2005/0010559 | A1 | 1/2005 | Du et al. |
| 2005/0050459 | A1 | 3/2005 | Qu et al. |

(Continued)

FOREIGN PATENT DOCUMENTS

KR 2007-0086012 A 8/2007

(Continued)

OTHER PUBLICATIONS

Wikipedia, Adobe Acrobat, accessed Mar. 7, 2012 at 10.58 AM EST.*

(Continued)

*Primary Examiner* — William Spieler
(74) *Attorney, Agent, or Firm* — Morgan, Lewis & Bockius LLP

(57) ABSTRACT

A computer displays a portion of a document to a user. Upon receiving a user-specified text string that includes multiple search keywords, the computer identifies a chunk within the document that satisfies the search keywords and displays the identified chunk to the user, wherein terms in the identified chunk that match the search keywords are either ordered differently from the search keywords in the user-specified text string or separated from one another by at least one term not matching any of the search keywords.

17 Claims, 70 Drawing Sheets

U.S. PATENT DOCUMENTS

| | | | |
|---|---|---|---|
| 2005/0091612 A1 | 4/2005 | Stabb et al. | |
| 2005/0149576 A1 | 7/2005 | Marmaros et al. | |
| 2005/0283473 A1* | 12/2005 | Rousso et al. | 707/5 |
| 2005/0289103 A1 | 12/2005 | Bier | |
| 2006/0010146 A1 | 1/2006 | Nayak | |
| 2006/0026147 A1 | 2/2006 | Cone et al. | |
| 2006/0136194 A1 | 6/2006 | Armstrong et al. | |
| 2006/0224554 A1 | 10/2006 | Bailey et al. | |
| 2007/0100967 A1 | 5/2007 | Smith et al. | |
| 2007/0136698 A1 | 6/2007 | Trujillo et al. | |
| 2007/0156919 A1 | 7/2007 | Potti et al. | |
| 2007/0192293 A1 | 8/2007 | Swen | |
| 2008/0010256 A1* | 1/2008 | Lindblad et al. | 707/3 |
| 2008/0040221 A1 | 2/2008 | Wiseman et al. | |
| 2008/0046803 A1 | 2/2008 | Beauchamp et al. | |
| 2008/0077571 A1 | 3/2008 | Harris et al. | |
| 2008/0091670 A1 | 4/2008 | Ismalon | |
| 2008/0097990 A1 | 4/2008 | Mustafa | |
| 2008/0235608 A1 | 9/2008 | Prabhu | |
| 2009/0100022 A1 | 4/2009 | Nayak et al. | |
| 2009/0157572 A1 | 6/2009 | Chidlovskii | |
| 2009/0182715 A1 | 7/2009 | Falkenberg | |
| 2009/0204602 A1 | 8/2009 | Sarlos | |
| 2009/0234816 A1 | 9/2009 | Armstrong | |
| 2009/0307599 A1 | 12/2009 | Davies et al. | |
| 2010/0070484 A1 | 3/2010 | Kraft et al. | |
| 2010/0094878 A1 | 4/2010 | Soroca et al. | |
| 2010/0153889 A1 | 6/2010 | Krause | |

FOREIGN PATENT DOCUMENTS

| | | | |
|---|---|---|---|
| KR | 2009-0111826 A | 10/2009 | |
| WO | WO2005/041065 A1 | 5/2005 | |

OTHER PUBLICATIONS

Behringer, Searching PDF files with Adobe Reader, accessed Mar. 7, 2012.*
Broida, Lifehacker, "Download of the Day: Cooliris Previews (IE/Firefox/Safari)," Nov. 29, 2006, 2 pgs.
Dexter, Examiner's Answer for U.S. Appl. No. 12/035,587, May 12, 2011, 10 pgs.
Dexter, Final Office Action for U.S. Appl. No. 12/035,541, Dec. 9, 2010, 30 pgs.
Dexter, Final Office Action for U.S. Appl. No. 12/035,546, Nov. 22, 2010, 12 pgs.
Dexter, Final Office Action for U.S. Appl. No. 12/035,587, Sep. 20, 2010, 8 pgs.
Dexter, Final Office Action for U.S. Appl. No. 12/035,592, Sep. 8, 2010, 9 pgs.
Dexter, Final Office Action for U.S. Appl. No. 12/035,597, Dec. 10, 2010, 20 pgs.
Dexter, Final Office Action for U.S. Appl. No. 12/035,600, Jan. 26, 2011, 32 pgs.
Dexter, Final Office Action for U.S. Appl. No. 12/035,607, Apr. 18, 2011, 20 pgs.
Dexter, Notice of Allowance for U.S. Appl. No. 12/035,546, Aug. 8, 2011, 6 pgs.
Dexter, Notice of Allowance for U.S. Appl. No. 12/035,557, Dec. 28, 2010, 6 pgs.
Dexter, Notice of Allowance for U.S. Appl. No. 12/035,566, Dec. 29, 2010, 4 pgs.
Dexter, Office Action for U.S. Appl. No. 12/035,541, May 18, 2010, 25 pgs.
Dexter, Office Action for U.S. Appl. No. 12/035,541, May 23, 2011, 27 pgs.
Dexter, Office Action for U.S. Appl. No. 12/035,546, Mar. 2, 2011, 11 pgs.
Dexter, Office Action for U.S. Appl. No. 12/035,546, May 18, 2010, 8 pgs.
Dexter, Office Action for U.S. Appl. No. 12/035,557, May 21, 2010, 12 pgs.
Dexter, Office Action for U.S. Appl. No. 12/035,560, May 25, 2010, 6 pgs.
Dexter, Office Action for U.S. Appl. No. 12/035,566, Apr. 21, 2010, 10 pgs.
Dexter, Office Action for U.S. Appl. No. 12/035,566, Sep. 21, 2010, 10 pgs.
Dexter, Office Action for U.S. Appl. No. 12/035,587, May 7, 2010, 8 pgs.
Dexter, Office Action for U.S. Appl. No. 12/035,592, Apr. 21, 2010, 8 pgs.
Dexter, Office Action for U.S. Appl. No. 12/035,597, May 27, 2010, 16 pgs.
Dexter, Office Action for U.S. Appl. No. 12/035,600, Jun. 24, 2011, 10 pgs.
Dexter, Office Action for U.S. Appl. No. 12/035,600, Jun. 25, 2010, 23 pgs.
Dexter, Office Action for U.S. Appl. No. 12/035,607 dated Oct. 8, 2010, 11 pgs.
FileHippo.com, Download Google Toolbar 4.0.1601.4978, May 13, 2010.
Google Press Center, Testimonials Archive, Jan. 13, 2007, 5 pgs.
Google Toolbar 4.01601.4978 Screenshots, May 13, 2010, 9 pgs.
Google, Reviewer's Guide: Google Toolbar 4, Jul. 2006, 6 pgs.
Google, The Facts About Google Book Search, Jun. 15, 2006, 5 pgs.
International Search Report and Written Opinion for PCT/US2009/034771, Aug. 21, 2008, 11 pgs.
International Search Report and Written Opinion for PCT/US2009/038786, Nov. 4, 2009, 8 pgs.
International Search Report and Written Opinion for PCT/US2010/056469, Jun. 28, 2011, 9 pgs.
Marchal, Tip: Convert from HTML to XML with HTML Tidy, Sep. 18, 2003, 7 pgs.
Marshall, Cooliris Introduces Easier Browsing with "Previews" and "Stacks", Jun. 28, 2007, 7 pgs.
Viewpoint Toolbar, Jul. 3, 2005, 6 pgs, web.archive.org/web/20050703013723/http://search.viewpoint.com/toolbar/v2_features.html.
W3C, XML Path Language (XPath) Version 1.0, Nov. 16, 1999, 33 pgs.
Wikipedia, Cooliris, Feb. 13, 2007, 6 pgs, http://en.wikipedia.org/wiki/Cooliris.
Wikipedia, Kilauea, Jul. 4, 2005, 3 pgs.
Dexter, Office Action, U.S. Appl. No. 13/085,652, Jul. 11, 2011, 7 pgs.
Dexter, Office Action, U.S. Appl. No. 13/085,652, Dec. 21, 2011, 9 pgs.
Dexter, Notice of Allowance, U.S. Appl. No. 13/085,652, May 17, 2012, 5 pgs.
Dexter, Office Action, U.S. Appl. No. 12/944,034, Aug. 1, 2012, 35 pgs.

* cited by examiner

```
<html>
 <body>
  <div align="center">
960 <center>
     <table>
962  <tr>
964   <td>
966    <div align="right">
        <table>
968     <tr>
970      <td>
          <table border="0" cellpadding="0">
           <tbody>
972        <tr>
974         <td>
             <p align="left">One of the best sites to search for CAD jobs
             is<a shape="rect" href="http://www.cadtalent.com/">CadTalent</a>.
             CadTalent specializes in CAD jobs and only CAD jobs. You can
976          search CAD jobs by platform and location.
             </p>
978          <p align="left"><span lang="en-us">W</span>ondering where you
             can find the most job listings?
             <a>Monster.com</a>, true to it's name, leads the pack with
980          a million job listings and almost 100,000 internship listings.
982         </td>
           </tr>
          </tbody>
         </table>
        </td>
       </tr>
      </table>
     </div>
    </td>
   </tr>
  </table>
 </center>
 </div>
 </body>
</html>
```

Figure 9B

```
<bib>
{
        for $b in doc('bib.xml')//book
        where $b/publisher = "Addison-Wesley"
        and    $b/@year > 1991
        return
                <book year="{ $b/@year }">
                { $b/title }
                </book>
}
</bib>
```

Figure 11B

| Input Sequence | Path Filter | Mode | Parent |
|---|---|---|---|
| Node Sub-Stream (0) | bib/book | Context | N/A |
| Node Sub-Stream (1) | bib/book/publisher | Content | Node Sub-Stream (0) |
| Node Sub-Stream (2) | bib/book/@year | Context | Node Sub-Stream (0) |
| Node Sub-Stream (3) | bib/book/@year | Context | Node Sub-Stream (0) |
| Node Sub-Stream (4) | bib/book/title | All | Node Sub-Stream (0) |

TigerLogic | einstein bohr debate |

○ Best Match  ◉ Match All  ○ "Exact" Match  ○ Match Any

Chunkit!

1  2  3  4  5  6  7  8  9  10

Bohr-Einstein debates - Wikipedia, the free encyclopedia
The second phase of *Einstein's* "*debate*" with *Bohr* and the orthodox interpretation is characterized by an acceptance of the fact that it is, as a practical ...
http://en.wikipedia.org   Chunk Rage Links   Hide Chunks

1257-A

Bohr v Einstein
The *debate* between *Bohr* and *Einstein* over the interpretation of quantum theory .....
The *debate* between *Einstein* and *Bohr* was conducted with the two talking
http://homepaces.paradise.net.nz   Chunk Rage Links   Hide Chunks

1257-B

Einstein/Bohr Debate and Quantum Computing
(PDF)
http://www.nanohub.org   Chunk Rage Links   Hide Chunks
▲ Location skipped: content can not be chunked.

nanoHUB - Einstein?Bohr Debate and Quantum Computing
nanoHUB.org: online simulation and more... Our mission: To be the place where experiment, theory and simulation meet and move nanoscience to nanotechnology ..
http://www.nanohub.org   Chunk Rage Links   Hide Chunks
▲ No relevant content found at this location, Re-Chunk with match any keyword.

Einstein Exhibit – The Quantum and The Cosmo
At the Solvay Conferences of 1927 and 1930 the *debate* between *Bohr* and *Einstein* went on day and night, neither man conceding defeat. Werner Heisenberg ...

Figure 13F universe the Hubble redshift can be thought of as the Doppler shift corresponding to the recession velocity v. However, the redshift is not a true Doppler shift, but rather the result of the expansion of the universe between the time the light was emitted and the time that it was detected.[1]

That space is undergoing metric expansion is shown by direct observational evidence of the Cosmological Principle and the Copernican Principle, which together with Hubble's law have no other explanation. Astronomical redshifts are extremely isotropic and homogenous,[6] supporting the Cosmological Principle that the universe looks the same in all directions, along with much other evidence. If the redshifts were the result of an explosion from a center distant from us, they would not be so similar in different directions.

Measurements of the effects of the cosmic microwave background radiation on the dynamics of distant astrophysical systems in 2000 proved the Copernican principle, that the Earth is not a central position, on a cosmological scale.[37] Radiation from the Big Bang was demonstrably warmer at earlier times throughout the universe. Uniform cooling of the cosmic microwave background over billions of years is explainable only if the universe is experiencing a metric expansion, and excludes the possibility that we are near the unique center of an explosion.

Cosmic microwave background radiation — 1332

*Main article: Cosmic microwave background radiation*

During the first few days of the universe, the universe was in full thermal equilibrium, with photons being continually emitted and absorbed giving the radiation a blackbody spectrum. A the universe expanded, it cooled to a temperature at which the photons could no longer be created or destroyed. The temperature was still high enough for electrons and nuclei to remain unbound, however, and photons were constantly "reflected" from these free electrons through a process called Thomson scattering. Because of this repeated scattering, the early universe was opaque to light.

When the temperature fell to a few thousand Kelvin, electrons and nuclei began to combine to from atoms, a process known as recombination. Since photons scatter infrequently from neutra atoms, radiation decoupled from matter when nearly all the electrons has recombined, at the epoch of last scattering 380,000 years after the Big bang. These photons make up the CMB that is observed today, and the observed pattern of fluctuations in the CMB is a direct picture of the universe at this

Figure 13G

```
<html>
<body>
<div cid="1">
    <h1 cid="2">An introduction to the Best Match algorithm.</h1>
    <p cid="3">Herein you'll find all of the scintillating bits of the underlying algorithm.</p>
</div>
<div cid="4">
    And some
    <p cid="5">examples of the algorithms</p>
</div>
</body>
</html>
```

SYSTEMS AND METHODS OF DISPLAYING DOCUMENT CHUNKS IN RESPONSE TO A SEARCH REQUEST

RELATED APPLICATIONS

This application is a continuation of U.S. patent application Ser. No. 12/035,546, filed: Feb. 22, 2008, now U.S. Pat. No. 8,078,630 which is hereby incorporated by reference in its entirety.

This application is related to U.S. patent application Ser. No. 12/035,541, "Systems and methods of identifying chunks within multiple documents," filed on Feb. 22, 2008, which is hereby incorporated by reference in its entirety.

This application is related to U.S. patent application Ser. No. 12/035,557, "Systems and methods of searching a document for relevant chunks in response to a search request," filed on Feb. 22, 2008, which is hereby incorporated by reference in its entirety.

This application is related to U.S. patent application Ser. No. 12/035,560, "Systems and methods of refining a search query based on user-specified search keywords," filed on Feb. 22, 2008, now U.S. Pat. No. 8,001,140, which is hereby incorporated by reference in its entirety.

This application is related to U.S. patent application Ser. No. 12/035,566, "Systems and methods of displaying and re-using document chunks in a document development application," filed on Feb. 22, 2008, now U.S. Pat. No. 7,937,395, which is hereby incorporated by reference in its entirety.

This application is related to U.S. patent application Ser. No. 12/035,574, "Systems and methods of performing a text replacement within multiple documents," filed on Feb. 22, 2008, now U.S. Pat. No. 8,001,162, which is hereby incorporated by reference in its entirety.

This application is related to U.S. patent application Ser. No. 12/035,587, "Systems and methods of refining chunks identified within multiple documents," filed on Feb. 22, 2008, which is hereby incorporated by reference in its entirety.

This application is related to U.S. patent application Ser. No. 12/035,592, "Systems and methods of pipelining multiple document node streams through a query processor," filed on Feb. 22, 2008, now U.S. Pat. No. 8,001,162 which is hereby incorporated by reference in its entirety.

This application is related to U.S. patent application Ser. No. 12/035,597, "Systems and methods of semantically annotating documents of different structures," filed on Feb. 22, 2008, which is hereby incorporated by reference in its entirety.

This application is related to U.S. patent application Ser. No. 12/035,600, "Systems and methods of adaptively screening matching chunks within documents," filed on Feb. 22, 2008, which is hereby incorporated by reference in its entirety.

This application is related to U.S. patent application Ser. No. 12/035,607, "Systems and methods of identifying chunks within inter-related documents," filed on Feb. 22, 2008 which is hereby incorporated by reference in its entirety.

FIELD OF THE INVENTION

The present invention relates generally to the field of information retrieval in a computer system, in particular to systems and methods of locating information at different sources.

BACKGROUND OF THE INVENTION

The growth of information technology enables a user of a desktop or laptop computer to easily access information stored within a large number of documents at different locations such as the computer's local hard drive or a remote web server on the Internet. But quickly locating the information sought by the user within one or more documents remains a challenging task with today's information retrieval technologies.

In response to search keywords provided by a user, conventional web and desktop search engines typically return a list of document names with one or two sentences from each document that match the search keywords as search results. From the one or two matching sentences, the user often has trouble understanding the meaning of the search keywords in the context of the document. To determine whether the document has the user sought-after information, the user has no choice but to open the document using its native application (e.g., the Microsoft Office application if the document is a Word document) and repeat the process if the document does not have the information sought by the user.

There are multiple issues with this approach. First, opening a document using its native application is a time-consuming operation. Second, and more importantly, the native application does not highlight any particular portion of the document that may contain the user-provided search keywords. To locate any search keywords within the document, the user has to do a new search of the document using a search tool of the native application. If the search tool can only look for multiple search keywords in exactly the same order (which is often the case), the user may end up finding nothing interesting in the document even if the document has a paragraph that contains the multiple search keywords but in a slightly different order. Alternatively, if the user limits the search to a subset of the multiple search keywords, many instances of the subset of search keywords may be in the document and the user could spend a significant effort before finding the document content of interest.

SUMMARY

The above deficiencies and other problems associated with conventional search tools are reduced or eliminated by the invention disclosed below. In some embodiments, the invention is implemented in a computer system that has a graphical user interface (GUI), one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a computer. The computer displays a portion of a document to a user. Upon receiving a user-specified text string that includes multiple search keywords, the computer identifies a chunk within the document that satisfies the search keywords and displays the identified chunk to the user, wherein terms in the identified chunk that match the search keywords are either ordered differently from the search keywords in the user-specified text string or separated from one another by at least one term not matching any of the search keywords.

Another aspect of the invention involves a computer-implemented method performed by a computer. While a user is browsing a document through the computer, the computer receives multiple user-specified search keywords, wherein the search keywords have a first sequence. The computer identifies within the document at least one chunk that satisfies the search keywords and displays a portion of the document including the identified chunk, wherein the search keywords are highlighted in the identified chunk and have a second sequence that is different from the first sequence.

Another aspect of the invention involves a computer system. The computer system includes memory, one or more processors, and one or more programs stored in the memory and configured for execution by the one or more processors. The one or more programs include: instructions for displaying a portion of a document to a user; instructions for identifying a chunk within the document that satisfies the search keywords upon receiving a user-specified text string that includes multiple search keywords; and instructions for displaying the identified chunk to the user, wherein terms in the identified chunk that match the search keywords are either ordered differently from the search keywords in the user-specified text string or separated from one another by at least one term not matching any of the search keywords.

Another aspect of the invention involves a computer readable storage medium having stored therein instructions, which when executed by a computer system cause the computer system to: display a portion of a document to a user; identify a chunk within the document that satisfies the search keywords upon receiving a user-specified text string that includes multiple search keywords; and display the identified chunk to the user, wherein terms in the identified chunk that match the search keywords are either ordered differently from the search keywords in the user-specified text string or separated from one another by at least one term not matching any of the search keywords.

Some embodiments may be implemented on either the client side or the server side of a client-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

FIG. 9B is an exemplary HTML document to be processed by the stream engine as shown in FIG. 9A in accordance with some embodiments.

FIG. 11B is an exemplary XQuery to be applied to the XML document in accordance with some embodiments.

FIG. 11C is a table of input sequences defined by the query engine in accordance with some embodiments.

FIGS. 12C through 12J are screenshots of a graphical user interface on a computer display illustrative of features associated with the processes as shown in FIGS. 12A and 12B in accordance with some embodiments.

FIGS. 13C through 13G are screenshots of a graphical user interface on a computer display illustrative of features associated with the processes as shown in FIGS. 13A and 13B in accordance with some embodiments.

FIG. 21B is an exemplary HTML document illustrative of the process as shown in FIG. 21A in accordance with some embodiments.

FIGS. 22B through 22D are screenshots of a graphical user interface on a computer display illustrative of features associated with the process as shown in FIG. 22A in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
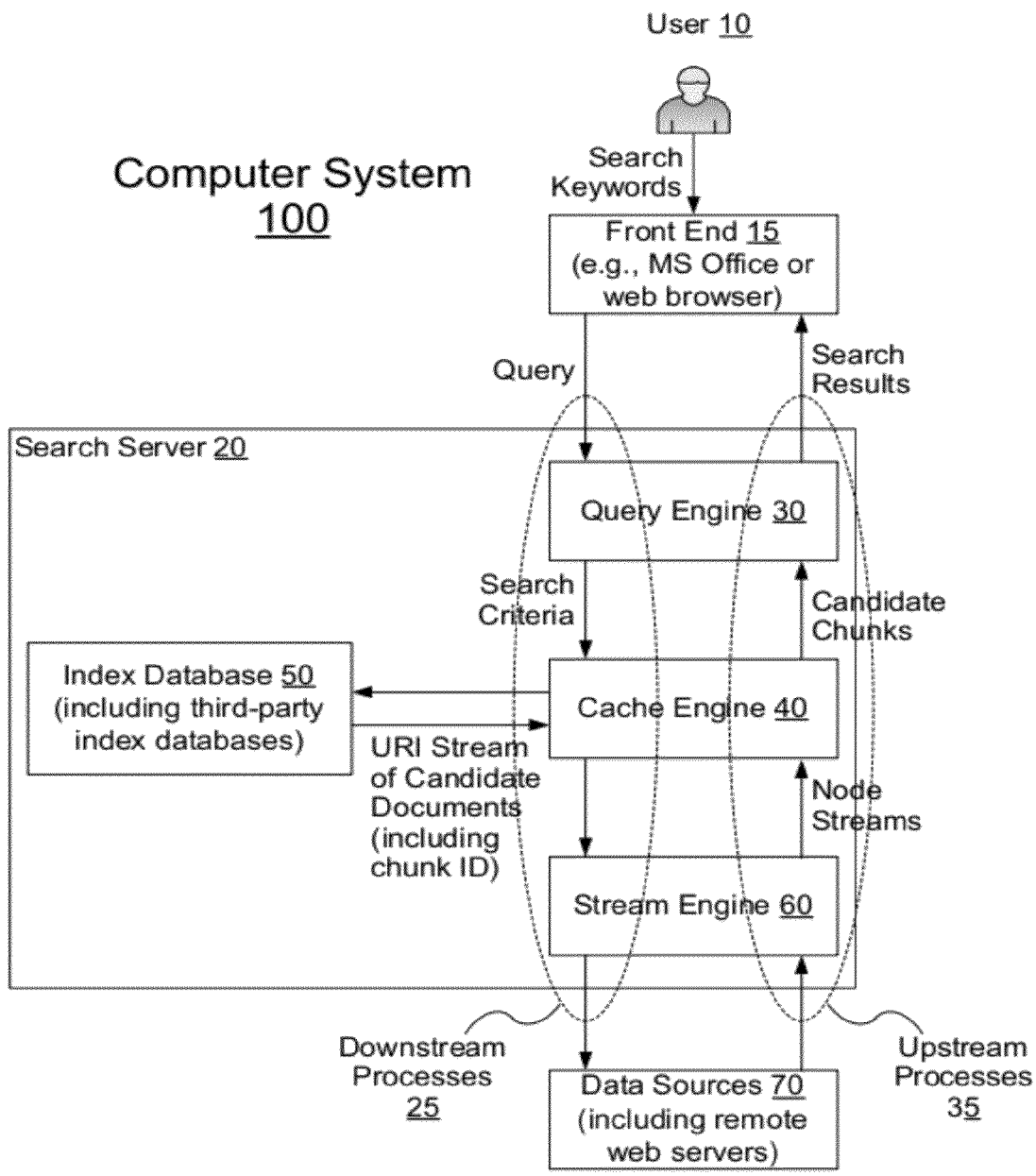
FIG. 1 is a block diagram of an exemplary computer system that includes a front end, a search server including a query engine, a cache engine, an index database, and a stream engine, and one or more data sources in accordance with some embodiments.

FIG. 1 is a block diagram of an exemplary computer system 100 that includes a front end 15, a search server 20, and one or more data sources 70 in accordance with some embodiments. The front end 15 is a software application configured to receive and process input from a user 10 such as search keywords and present search results to the user 10. The search server 20 further includes a query engine 30, a cache engine 40, an index database 50, and a stream engine 60. The data sources 70 include storage devices such as file systems on hard drives accessible to the computer system 100 and remote web servers on the Internet.

At runtime, the front end 15 forwards the user-provided search keywords to the search server 20 in the form of a search query. In response, different components within the search server 20 work in concert to identify a set of candidate documents that matches the search keywords and retrieve the contents of the candidate documents from their respective locations at local and/or remote data sources 70. The different components within the search server 20 then search within the retrieved document contents for chunks that match the search keywords and return the identified chunks to the front end 15 in the form of search results.

In this application, a document is generally referred to as a data entity that has textual content, such as a Microsoft Office document, a plain-text document, a PDF document, an email or text message, a web page, etc. A "candidate chunk" within a document is a portion of the document that is semantically and contextually regarded as a unit of textual content by one skilled in the relevant art. For example, within a Word document, a sentence, a paragraph, a table, a figure's caption, the document's title, header, and footer are candidate chunks. Similarly, a slide within a PowerPoint document, a bullet point within the slide, and a cell or a row within an Excel spreadsheet are also candidate chunks. A "chunk" or more specifically a "relevant chunk" served as part of the search results is a candidate chunk that satisfies the search keywords in accordance with predefined search criteria, e.g., if the candidate chunk includes at least one instance of one of the search keywords.

Figure 2:
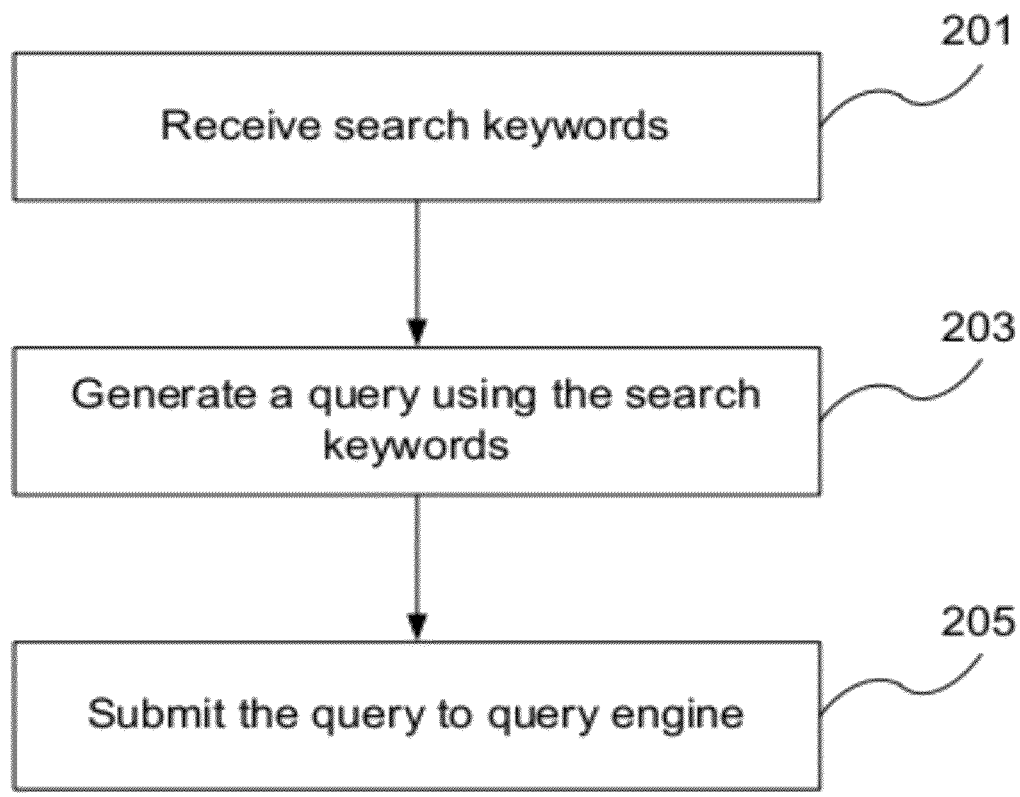
FIG. 2 is a flowchart illustrative of how the front end processes user-provided search keywords in accordance with some embodiments.

FIG. 2 is a flowchart illustrative of how the front end 15 processes user-provided search keywords in accordance with some embodiments. After receiving the search keywords (201), the front end 15 generates a search query using the search keywords (203). Depending on the type of data to be processed by the search server 20, the search query can be written in different query languages such as structured query language (SQL) for relational databases or XQuery for XML data sources. The front end 15 then submits the search query to the query engine 30 within the search server 20 (205) for further processing.

Figure 3:
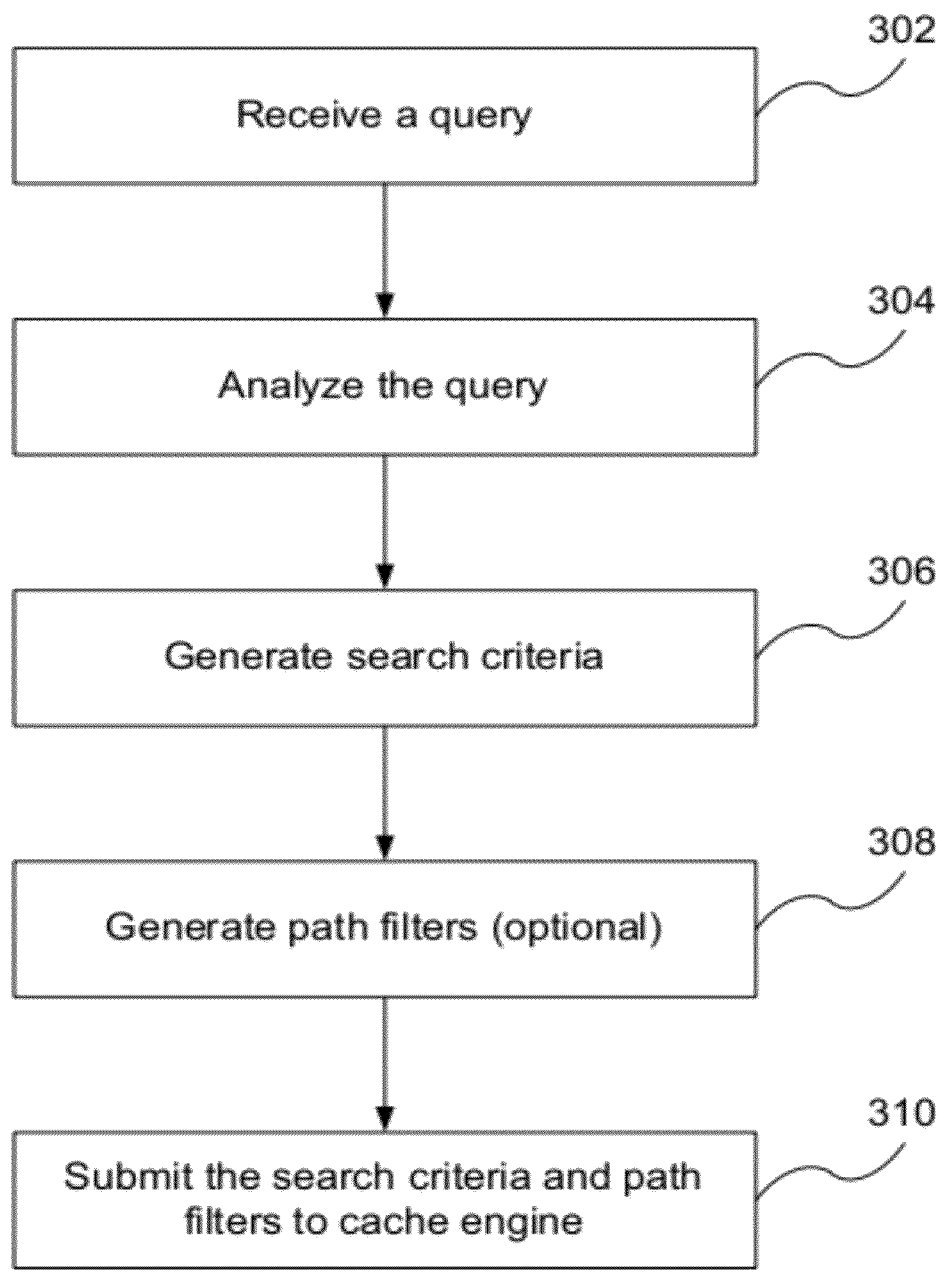
FIG. 3 is a flowchart illustrative of how the query engine generates search criteria for the user-provided search keywords in accordance with some embodiments.

FIG. 3 is a flowchart illustrative of how the query engine 30 generates search criteria for the user-provided search keywords in accordance with some embodiments. After receiving the search query (302), the query engine 30 analyzes the query (304) and generates optimized search criteria (306). In some embodiments, the query engine 30 also generates one or more path filters from the search query (308). The path filters are derived from the user-provided search keywords and search options. The stream engine 60 employs the path filters to exclude document content that is not part of any candidate chunks. A more detailed description is provided below in connection with FIGS. 10 and 11. The query engine 30 submits both the search criteria and the path filters to the cache engine 40 (310).

In some embodiments, the query engine 30 generates an optimized execution plan for the query according to the capabilities of other components within the search server 20. For example, if the search query contains a predicate limiting the search to documents at the local hard drive that have been updated within the last two days, the query engine 30 has two options. One option is that the query engine 30 keeps the predicate to itself and waits to apply the predicate to the candidate chunks. In this case, the search server 20 (especially the stream engine 60) may have processed more candidate documents than necessary. The other option is that the query engine 30 pushes the predicate down to the file system managing the local hard drive through the index database 50. In this case, only candidate documents that have been updated within the last two days are processed and the stream engine 60 is relieved from additional, unnecessary workload.

Figure 4:
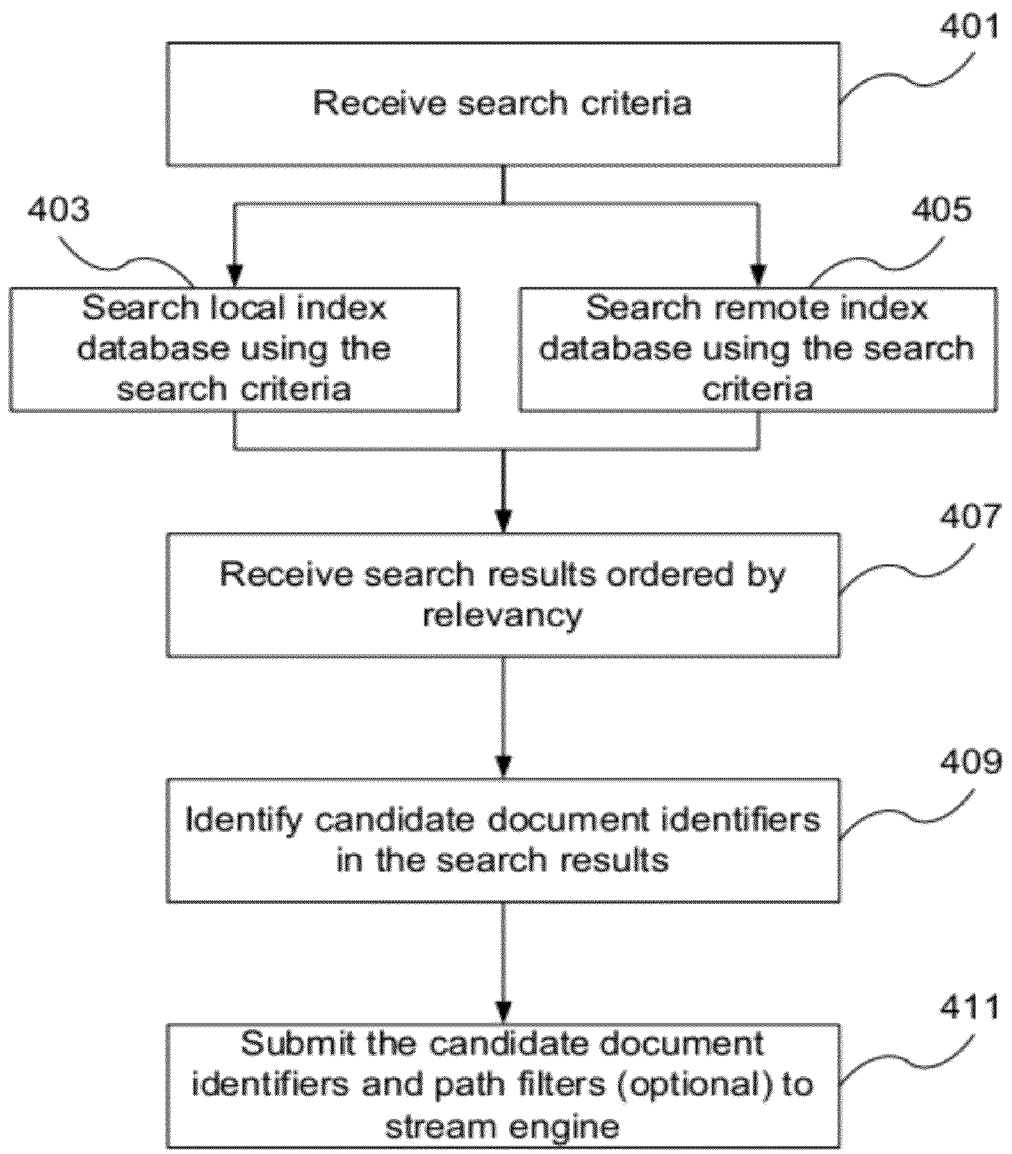
FIG. 4 is a flowchart illustrative of how the cache engine produces a set of candidate document identifiers for the user-provided search keywords in accordance with some embodiments.

FIG. 4 is a flowchart illustrative of how the cache engine 40 produces a set of candidate document identifiers for the user-provided search keywords in accordance with some embodiments. After receiving the search criteria from the query engine (401), the cache engine 40 submits the search criteria to the index databases 50. In some embodiments, the index databases include both a local index database and a remote index database. The local index database manages index information of documents at the local hard drive and the remote index database manages index information of documents at a remote document server. In some embodiments, the remote index database refers to the index database of a third-party search engine.

For given user search criteria, the cache engine 40 may search the local index database (403) if the user is looking for documents at the local hard drive or the remote index database (405) if the user is submitting a search request to a third-party search engine or both. From these index databases 50, the cache engine 40 receives respective search results (407), e.g., in the form of a set of document references such as URIs, and identifies a candidate document identifier within each search result (409). Note that a candidate document is a document that matches the search query at the document level, but may or may not at the chunk level. For example, a PowerPoint document that has slide A matching one search keyword and slide B matching another search keyword is a candidate document, but does not have any chunk matching the search query. In some embodiments, a universal resource identifier (URI) is used as a document identifier. Thus, documents at the local hard drive and remote web servers can be referenced in the same manner.

In some embodiments, the search results returned by the index databases 50 are ordered by the corresponding candidate documents' relevancy to the search query. Many well-known algorithms for determining a document's relevancy to a search query can be found in the classic book entitled "Automatic Information Organization and Retrieval" by G. Salton, McGraw-Hill, New York, 1968, which is incorporated here by reference in its entirety.

In some embodiments, a candidate document's relevancy is at least in part ranked by the past user activities on the candidate document. For example, a candidate document that has been recently accessed by the user, such as browsing, copying and updating, is given a higher rank than another candidate document that has never been accessed by the user before. In one embodiment, a candidate document's ranking score is determined by combining the following two pieces of information:

The frequency of a search keyword in the document—For each keyword, the index database 50 may keep information such as a total count of occurrences of the keyword in a number of documents and a per-document count of the occurrences of the keyword. By combining the frequencies of different search keywords within the same document, a basic ranking score of the document is computed using a generic inverse frequency algorithm.

The personalized usage weight of the document—A respective number of points are assigned to each operation the user applies to the document. For example, the preview operation of a particular document is given two points, the re-use of content from the previewed document is given three points, and the re-use of a specific chunk within the document is given four points. The total points assigned to the document, when compared against the total points allocated for the corresponding document type, yields a personalized ranking score for the document, which may be combined with the aforementioned basic ranking score to generate a customized ranking score for the document.

In some embodiments, a document's relevancy to a search query is not solely determined at the document level but is, at least in part, determined at the chunk level. For example, the index database 50 may maintain information about the locations of candidate chunks within each document as well as the distinct ranking information of different candidate chunks within the same document relative to different search keywords, thereby making it possible to return the relevant chunks within the same document in an order consistent with their respective chunk-level ranking scores.

The cache engine 40 submits a set of candidate document identifiers and path filters, if any, generated by the query engine 30 to the stream engine 60 for further processing (411).

For illustration, the aforementioned processes in connection with FIGS. 2 through 4 are collectively referred to as the "downstream processes 25" as shown in FIG. 1. The input to the downstream processes is a search request including one or more search keywords and its output is a set of candidate document identifiers that identify candidate documents satisfying the search keywords. For example, a document is deemed to be a candidate document if it includes at least one instance of each search keyword. But the fact that each search keyword has a match in a candidate document does not guarantee that the candidate document has a chunk relevant to the search request.

As noted above, identifying a chunk within a document requires semantic information about the document. Such information is not available in the index database 50. To find out whether a candidate document has any relevant chunk, the search server 20 needs to retrieve the document and analyze the document's structure and content to understand the relationship between the document's structure and the document's content. The processes of retrieving a document, determining whether the document has any relevant chunks, and identifying and returning these relevant chunks to the requesting user are collectively referred to as the "upstream processes 35" as shown in FIG. 1.

Figure 5:
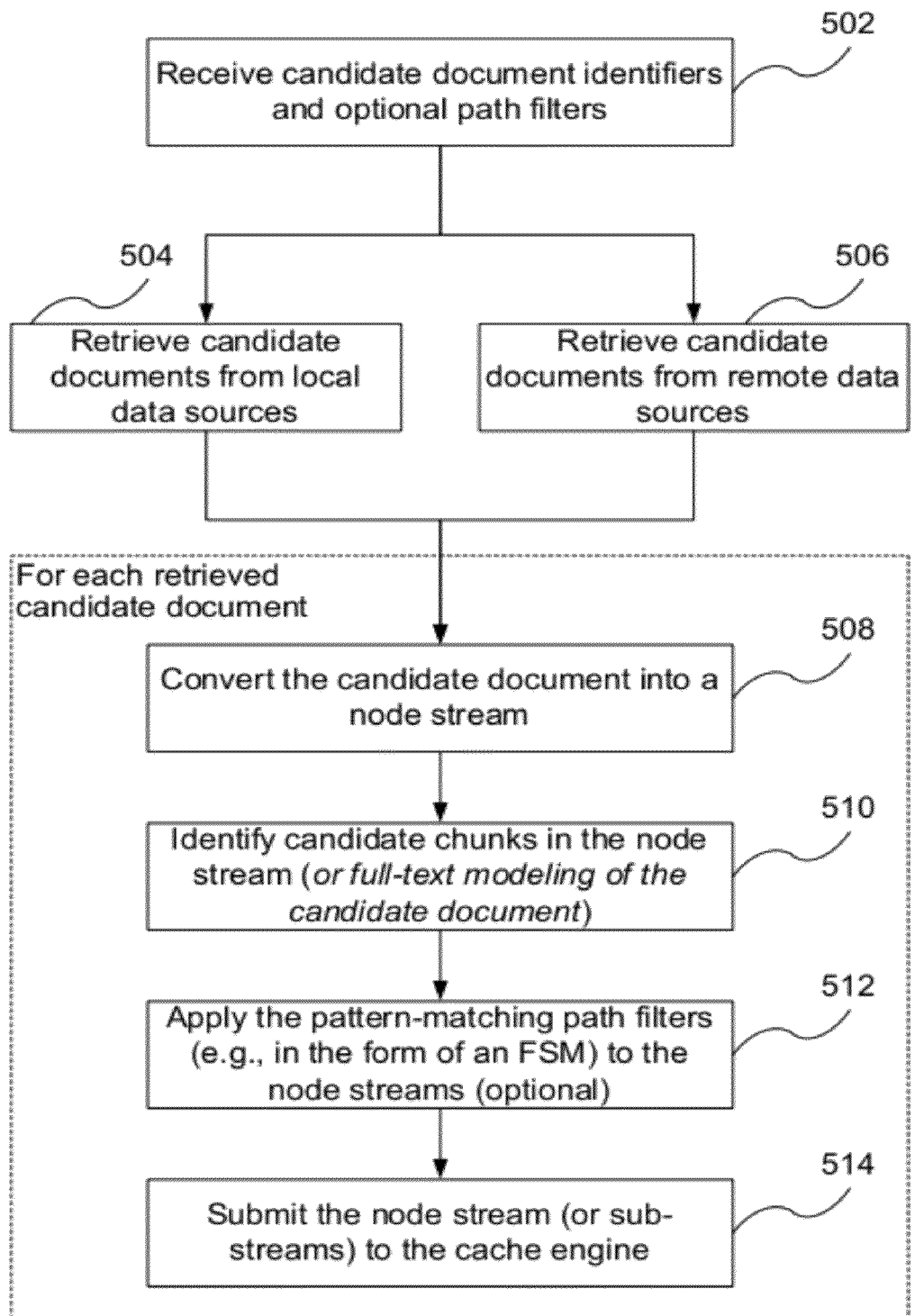
FIG. 5 is a flowchart illustrative of how the stream engine processes candidate documents retrieved from different data sources in accordance with some embodiments.

FIG. 5 is a flowchart illustrative of how the stream engine 60 processes candidate documents retrieved from data sources 70 in accordance with some embodiments.

After receiving the candidate document identifiers and optional path filters from the cache engine (502), the stream engine 60 starts retrieving the candidate documents identified by the document identifiers from respective data sources, including retrieving some candidate documents from local data sources (504) and/or retrieving some candidate documents from remote data sources (506). In some embodiments, local data sources include any storage devices affiliated with the computer system 100, such as hard disk and CD/DVD drives, and remote data sources include any storage devices that can be accessed by the computer system 100 through wired and/or wireless network, such as a web server on the Internet and/or a network storage device on the Intranet.

In some embodiments, a specific user instruction may limit the document search to local or remote data sources. As shown in FIG. 16B, if the user specifies that the type of the documents to be searched are Word documents, the stream engine 60 will retrieve only Word candidate documents from the local data source such as the local file system. For each candidate document identifier, the stream engine 60 submits a request for the corresponding candidate document to the file system and waits for the file system to return the candidate document. But if the user clicks the checkbox next to a web source such as "Source A," the stream engine 60 will retrieve the candidate documents identified by Source A from their respective remote web hosts. For example, if the candidate document is an HTML document hosted by a web server, the stream engine 60 submits an HTTP request to the web server for the HTML document and waits for an HTTP response including the HTML document from the web server. In some embodiments, the user instruction may explicitly or implicitly request that candidate documents be retrieved from both local and remote data sources.

In some embodiments, the stream engine 60 submits multiple requests for different candidate documents in parallel or sequentially to the respective targeted data source(s). The candidate documents are then retrieved from the respective data sources and processed by the stream engine 60 in parallel or sequentially. For illustration, the following description in connection with FIG. 5 focuses on a single candidate document. But this by no means limits the present application to processing documents one by one sequentially. As will become more apparent in connection with FIGS. 9A through 9B below, it is more efficient to process multiple candidate documents from different data sources in parallel in some embodiments.

Referring again to FIG. 5, the stream engine 60 performs the following operations on each candidate document retrieved from a data source:

1. Convert the Candidate Document into a Node Stream (508);

To reduce the computer system 100's response latency, the stream engine 60 starts converting immediately after receiving a portion of the candidate document, without waiting for the entire candidate document to be retrieved. A more detailed description of the conversion is provided below in connection with FIG. 8A.

2. Identify Candidate Chunks in the Node Stream (510);

As noted above, a candidate document includes one or more candidate chunks. A candidate chunk within the document, if identified as satisfying the user-specified search keywords, is usually more relevant to the user's search interest and therefore more useful to the user. A more detailed description of this operation is provided below in connection with FIGS. 8A and 9A.

3. Apply the Optional Path Filters to the Node Stream (512); and

For a user-specified search query, certain portions of the node stream are potentially relevant and other portions are completely irrelevant. It could be an efficiency gain if these irrelevant portions are excluded from further consideration. The path filters generated by the query engine (operation 308 in FIG. 3) can be used to divide the node stream into multiple node sub-streams, thereby eliminating the irrelevant portions of the node stream. In some embodiments, this procedure is optional if the query engine 30 generates no path filter. A more detailed description of the conversion is provided below in connection with FIGS. 10A-10B and 11A-11G.

4. Submit the Node Stream (or Sub-Streams) to the Cache Engine (514).

After performing the operations above, the stream engine 60 submits the node stream or sub-streams to the cache engine 40. As will be explained below in connection with FIG. 6, the cache engine 40 may or may not do anything depending on whether it needs to index the document represented by the node stream. If it does, the cache engine 40 invokes the index database 50 to generate new indexes or update existing indexes for the document. Otherwise, the cache engine 40 simply forwards the node stream or sub-streams to the query engine 30 for further processing, which is provided below in detail in connection with FIGS. 8A-8C and 11A-11G.

Figure 6:
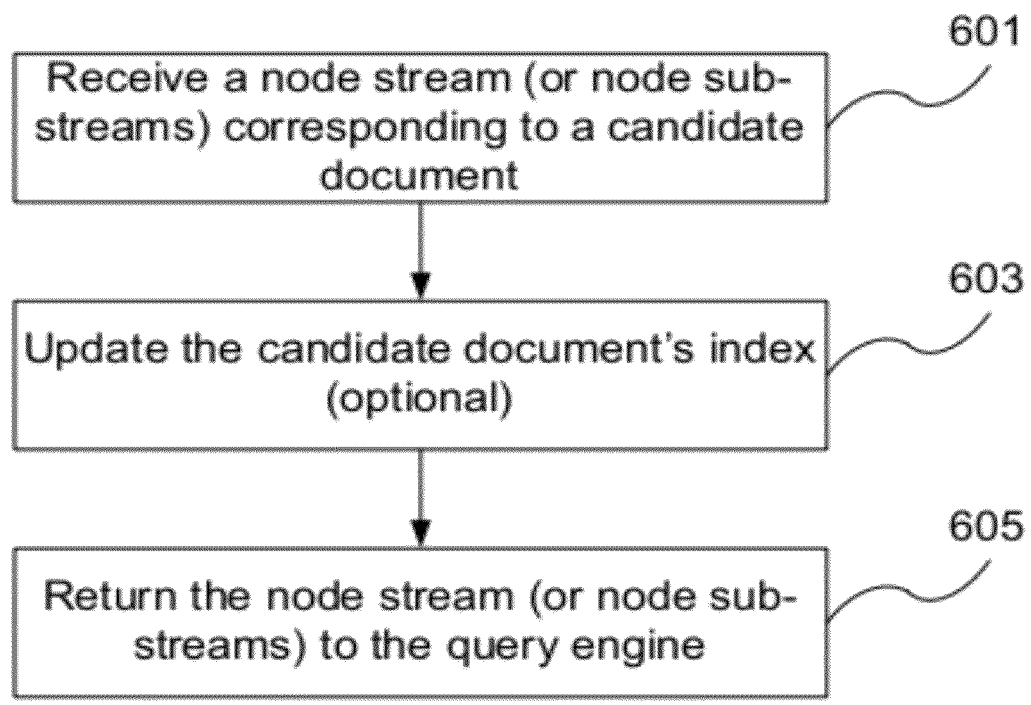
FIG. 6 is a flowchart illustrative of how the cache engine processes the candidate documents coming out of the stream engine in accordance with some embodiments.

FIG. 6 is a flowchart illustrative of how the cache engine 40 processes the candidate documents coming out of the stream engine 60 in accordance with some embodiments.

After receiving the node stream or sub-streams corresponding to a candidate document (601), the cache engine 40 performs different operations based on the type and status of the candidate document as well as its destination. For example, if the candidate document is a Word document found in the local hard drive of the computer system 100 and has not been indexed or its indexes are deemed stale, the cache engine 40 will request that the index database 50 generate new indexes or update existing indexes for the candidate document (603). Depending on whether the document is requested by an end user through the front end 15 or a software agent monitoring the index database 50, the cache engine 40 may or may not return the node stream to the query engine 30 for further processing (605).

If the candidate document is an HTML document at a remote web server, which is identified through a third-party document source, it may be optional to index the HTML document. If so, the node stream or sub-streams will be returned to and further processed by the query engine 30 to determine whether it has any relevant chunk (605).

In sum, in some embodiments the cache engine 40 plays a relatively lightweight role in the upstream processes 35 especially if the candidate document is retrieved from a remote data source to satisfy an end user's search request and the computer system 100 does not intend to index the document. Therefore, some of the embodiments below assume that the stream engine 60 directly communicates with the query engine 30 for clarity.

Figure 7:
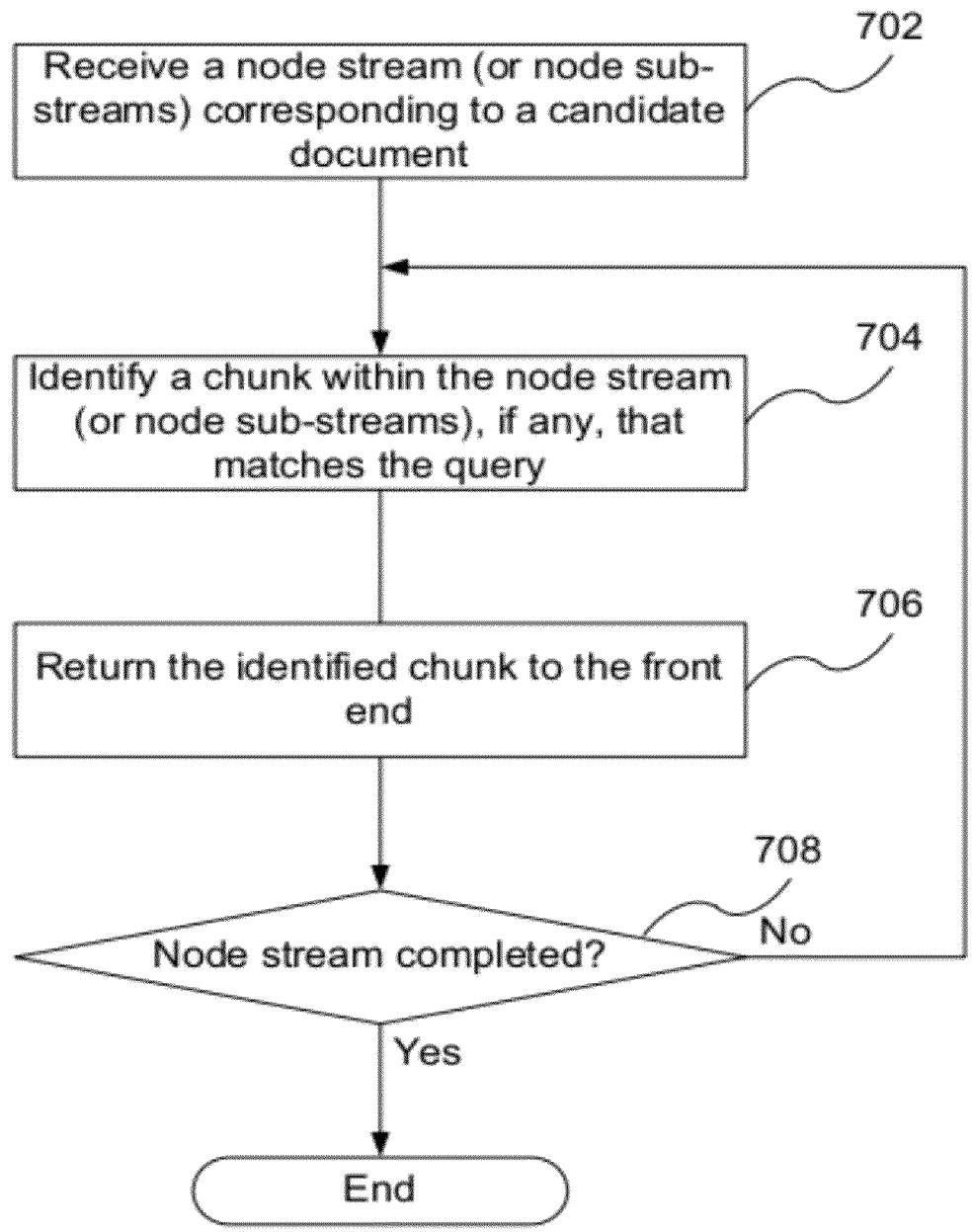
FIG. 7 is a flowchart illustrative of how the query engine identifies relevant chunks within the candidate documents in accordance with some embodiments.

FIG. 7 is a flowchart illustrative of how the query engine 30 identifies relevant chunks within the candidate documents in accordance with some embodiments.

Upon receipt of the node stream or sub-streams (e.g., path filtering at the stream engine 60) (702), the query engine 30 traverses the node stream and compares the candidate document's content with the user-specified search keywords. If a match is found, the query engine 30 identifies the candidate chunk within the document corresponding to the match as one relevant chunk (704) and returns the identified chunk to the front end 15 to be displayed to the end user (706).

In some embodiments (as shown FIG. 7), the query engine 30 returns any relevant chunk to the front end 15 as soon as the chunks are identified and this process repeats until the query engine 30 completely traverses the candidate document (708). In some other embodiments, the query engine 30 defers returning any chunk to the front end 15 until a more specific relevant chunk is found in the node stream. A more detailed description of these two approaches is provided below in connection with FIGS. 8B and 8C, respectively.

As noted above, candidate documents arriving at the stream engine 60 are each converted into a node stream. The node stream is an instance of a data model of the corresponding candidate document. For example, the XQuery data model of an XML document is a tree of nodes. The types of the nodes that appear at different hierarchical levels of the tree include: document, element, attribute, text, namespace, processing instruction, and comment. Any node in the tree has a unique node identity. The data model not only preserves the XML document's entire content but also has metadata derived from sources such as XML tags for identifying candidate chunks subsequently.

Unfortunately, not all candidate documents are structured like an XML document. For example, a plain-text document is completely unstructured such that it does not have any metadata embedded therein defining a hierarchical structure for the document. Without any pre-processing, a node stream corresponding to the plain-text document loses the semantic information intrinsic in the content distribution of the document such that it is difficult to identify any chunk such as paragraph, headline, or title, within the node stream to satisfy a search query. PDF documents have similar problems that make it challenging to find relevant chunks within a PDF document.

Between the structured XML documents and the unstructured plain-text documents are semi-structured documents such as HTML documents. Unlike the plain-text document, an HTML document has a hierarchical structure defined by metadata embedded in the HTML document. But the metadata in the HTML document usually does not have a deterministic relationship with the content data as the metadata in an XML document has. The same HTML tag can be used purely for web page layout purpose at one location while carrying a semantic connotation at another location within the same document.

To expedite the upstream processes and accommodate more types of documents in the future, it is desired to have a unified approach such that different types of documents are processed in the same manner.

Figure 8A:
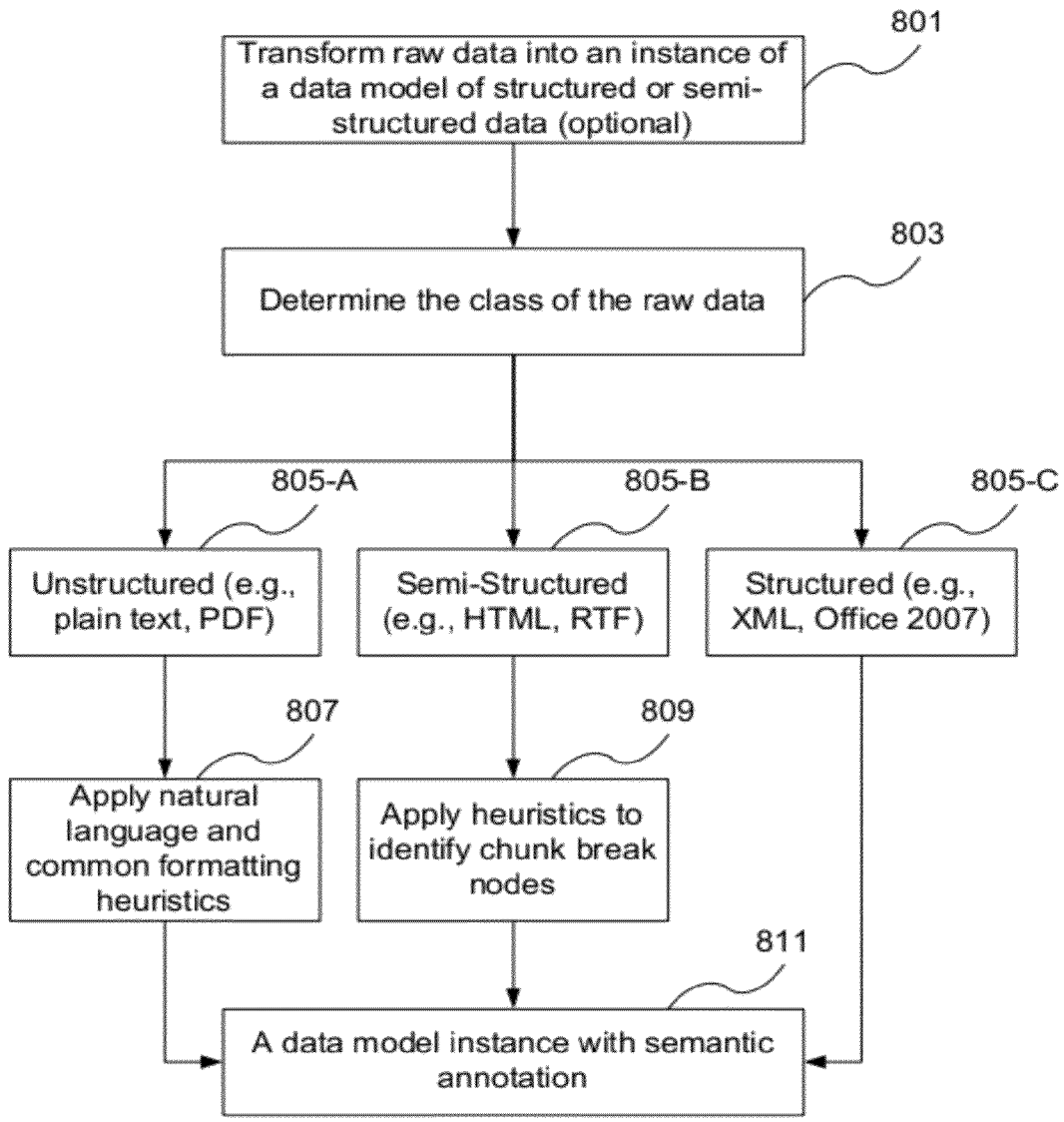
FIG. 8A is a flowchart illustrative of how the stream engine generates semantic data models for different types of documents in accordance with some embodiments.

FIG. 8A is a flowchart illustrative of how the stream engine 60 generates semantic data models for different types of documents in accordance with some embodiments.

After receiving the raw data of a candidate document, the stream engine 60 transforms the raw data into an instance of a data model of structured or semi-structured data (801). In some embodiments, this operation is straightforward if the candidate document is already a structured document like a Microsoft Office 2007 document. In some other embodiments, this operation is necessary if the candidate is a plain-text document without any structure-related metadata. In this case, the stream engine 60 may insert metadata into the document that defines a hierarchical structure for the document's content.

Based on the class of the raw data (803), the stream engine 60 then performs different sets of operations to the data model instance generated previously. For example, as noted above, the candidate document may be classified into one of three categories:

unstructured documents (805-A) such as plain-text and PDF;

semi-structured documents (805-B) such as HTML and RTF; and structured documents (805-C) such as XML and Office 2007.

For an unstructured document, the stream engine 60 applies a set of natural language and common formatting based heuristic rules to separate text within the document into separate candidate chunks (807). For example, one heuristic rule for identifying paragraphs stipulates that any two text segments separated by symbols such as an end-of-line (EOL) character or a blank line correspond to at least two separate paragraphs. Another heuristic rule stipulates that a text segment matching a predefined text pattern is deemed to be a candidate chunk. Consider the following text segment that has two hyphens, one at the start of a new line:

This is a bullet list.

What about a page number?

In this case, each line by itself may be a candidate chunk (although it may or may not be deemed to be a paragraph). The fact that the two lines have the same text pattern, i.e., a hyphen at the start of a new line followed by a text string, may indicate that the entire text segment is a candidate chunk at one level of the document's hierarchical structure and each line is also a candidate chunk at a lower level of the hierarchical structure.

Similarly, for a semi-structured document, the stream engine 60 has another set of heuristic rules based on the type of the semi-structured document (809). For a node stream corresponding to an HTML document, the stream engine 60 identifies candidate chunk break nodes within the node stream both dynamically and statically.

For example, the <p> tag defines a paragraph within the HTML document and it is deemed to be a candidate chunk break node. Whenever the <p> tag appears in an HTML document, the subsequent document segment following this <p> tag and before another <p> tag is identified as a candidate chunk.

Note that there are many ways of identifying chunk break nodes within a semi-structured document known to one skilled in the art. In some embodiments, the stream engine 60 applies different sets of customized heuristic rules to different types of documents. For a structured document or a semi-structured document for which there is no customized solution, the stream engine 60 assumes that there is a strongly-deterministic relationship between the document's content and the document's metadata and a generic set of rules is applied to the data model instance to identify possible candidate chunks in the candidate document.

By traversing the node stream, the stream engine 60 generates a data model instance for the candidate document that includes semantic annotation (811). Subsequently, the semantically-annotated node stream is fed into the query engine 30. The query engine 30 then applies a search query to the node stream to identify among the candidate chunks any that satisfy the search query.

As noted above in connection with FIG. 7, the query engine 30 does not have to wait until it traverses the entire node stream before returning any relevant chunk to the front end 15. Below are two embodiments of how the query engine 30 returns identified chunks after a respective condition is met and before the entire node stream is traversed.

Assume that the search query has two keywords, "raining" and "data," and the exemplary candidate document is as follows:

```
<c0>
    It's raining outside ...
    <c1>
        For XML-based data management,
        Raining Data is your choice.
    </c1>
</c0>
```

Figure 8B:
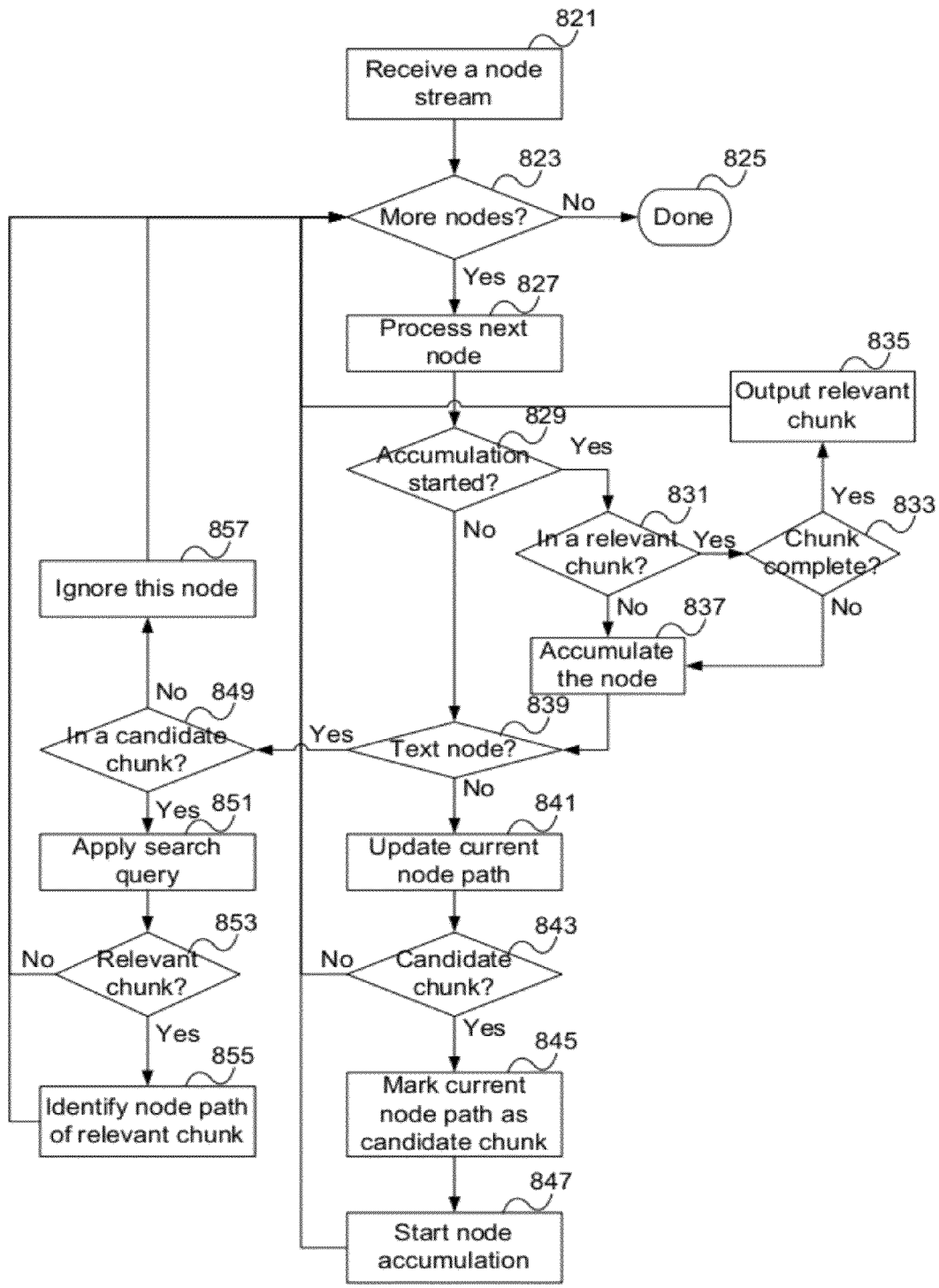
FIG. 8B is a flowchart illustrating a first embodiment of how the query engine identifies a relevant chunk within a node stream representing a candidate document.

FIG. 8B is a flowchart illustrating a first embodiment of how the query engine identifies a relevant chunk within a node stream representing a candidate document.

The query engine 30 starts the search after receiving a node stream corresponding to the candidate document above (821). If no more nodes are in the node stream (823, no), the query engine 30 assumes that it has completely traversed the node stream and the search stops (825). Otherwise, the query engine 30 processes the next node in the stream (827).

Before any further processing, the query engine 30 checks whether it is in the middle of accumulating nodes (829). In some embodiments, the query engine 30 begins accumulating nodes after it encounters the chunk break node of the first candidate chunk in the node stream. In this example, the chunk break node of the first candidate chunk is the <c0> tag, which is the first node in the stream, and the accumulation has not started yet (829, no).

Next, the query engine 30 checks whether the node is a text node (839). Since the <c0> tag is not a text node (839, the query engine 30 updates the current node path to be "/c0" (841) and checks whether the current node is part of a candidate chunk (843). Because the <c0> tag is the chunk break node of the first candidate chunk (843, yes), the query engine 30 marks the current node path as corresponding to a candidate chunk (845) and then starts node accumulation immediately (847).

Following the <c0> tag node, the next node to be processed by the query engine 30 is a text node including "It's raining outside . . . ." In this case, because the accumulation has already started (829, yes), the query engine checks if the text node is part of a relevant chunk (831). But since no search keyword has been matched so far (831, no), the query engine 30 accumulates the text node (837). Because this is a text node (839, yes), the query engine 30 then checks whether it is in a candidate chunk (849).

In this case, the text node is in a candidate chunk (849, yes). The query engine applies the search query to the text node (851). But because only the keyword "raining" finds a match in the text string, which is a partial match of the search query, no relevant chunk has been found yet (853, no) and the query engine 30 returns to process the next node in the sub-stream (823). In some embodiments, the query engine 30 records the partial match result for subsequent use.

When the query engine 30 receives the second text node including the text string "For XML-based data management," it repeats the same processing steps 827 through 853 described above. In this case, because the two text nodes in combination match both keywords, a relevant chunk and its associated node path "/c0/c1" are identified (855). Next, the query engine 30 processes the third text node including the text string "Raining Data is your choice." Because the third node is already in a relevant chunk (831, yes), the query engine 30 checks whether the relevant chunk is completed (833). In some embodiments, a chunk is completed if the query engine encounters a node including the end tag of a candidate chunk, e.g., </c0> or </c1>.

In this case, because the query engine 30 has not seen any end tag yet (833, no), the process continues and the second and third text nodes in combination also match the two keywords because both the second and third text nodes are within the second candidate chunk (<c1>, </c1>), which is a descendent of the first candidate chunk (<c0>, </c0>). In some embodiments, if there is a hierarchical relationship between multiple relevant chunks, the query engine 30 first completes the relevant chunk at the lowest level, which is also referred to as the more specific relevant chunk, and then outputs this more specific relevant chunk to the front end 15 (835). In this example, the more specific relevant chunk is

```
<c1>
    For XML-based data management,
    Raining Data is your choice.
</c1>
```

Note that the query engine 30 does not necessarily stop after outputting the more specific relevant chunk (835). Rather, the query engine 30 proceeds to the next node that includes the </c0> tag. As a result, the less specific relevant chunk (as will be described below in connection with FIG. 8C) is the next relevant chunk to be output.

In some embodiments, the query engine 30 outputs this relevant chunk to the front end 15. As a result, the front end 15 may ultimately display two relevant chunks to the end user. Alternatively, the front end 15 may compare the two relevant chunks before displaying them and choose only one of them, e.g., the more specific one above or the second broader one, to be displayed. In some other embodiments, the query engine 30 may choose not to output the second relevant chunk to the front end 15 if it determines that the first one is sufficient to satisfy the end user's search interest.

Figure 8C:
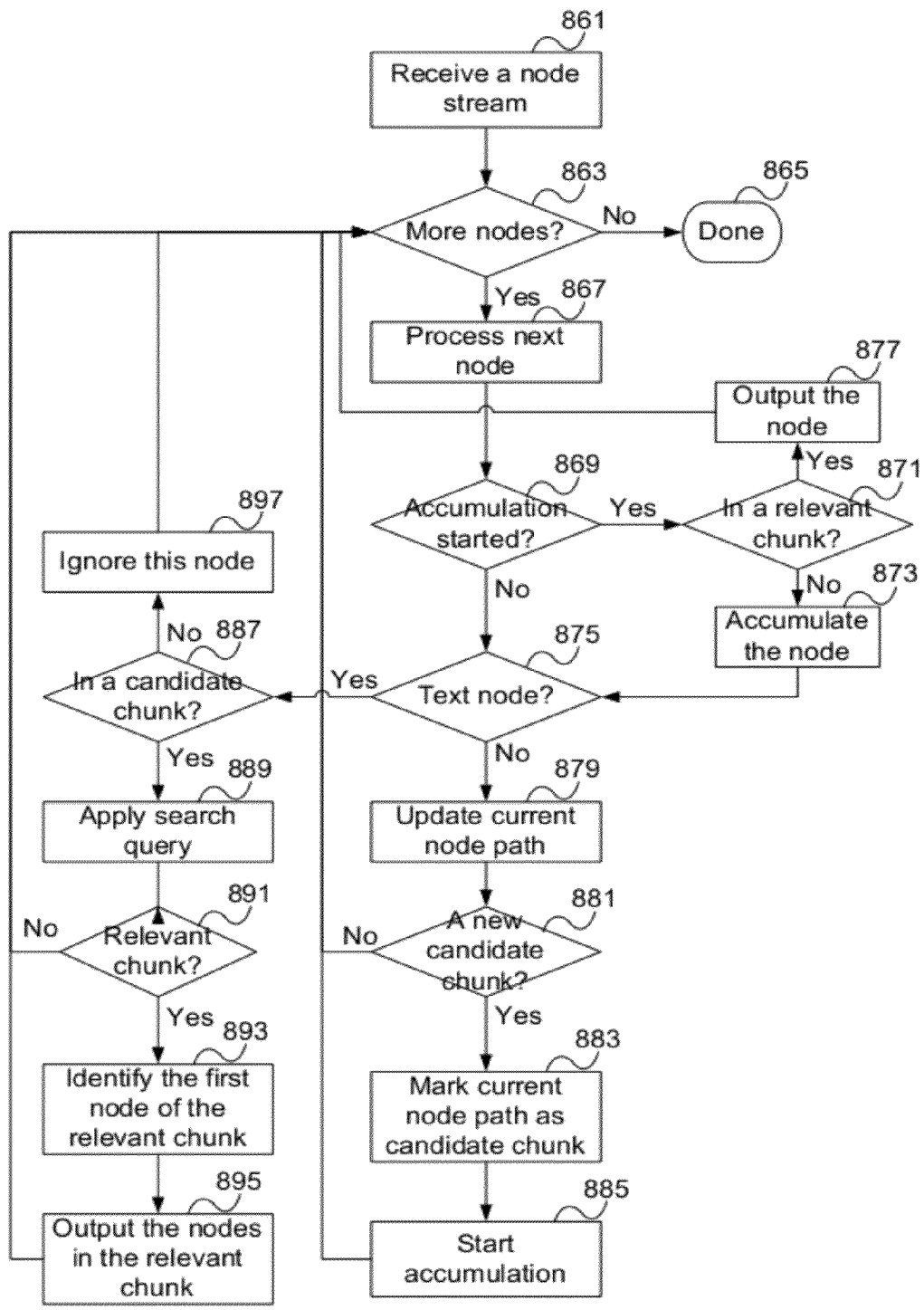
FIG. 8C is a flowchart illustrating a second embodiment of how the query engine identifies a relevant chunk within a node stream representing a candidate document.

FIG. 8C is a flowchart illustrating a second embodiment of how the query engine 30 identifies a relevant chunk within a node stream representing a candidate document. This embodiment is similar to the embodiment described above in connection with FIG. 8C except that, after a relevant chunk is identified, the query engine 30 immediately starts outputting nodes in the identified chunk (895) without waiting for the completion of the relevant chunk (835 in FIG. 8B). Moreover, the query engine 30 also outputs subsequent nodes within the same relevant chunk (877), if there are any, without waiting for the completion of the relevant chunk (835 in FIG. 8B).

Using the same exemplary candidate document above, the query engine 30 outputs the relevant query when it encounters the second text node including the text string "For XML-based data management" because both search keywords have matches in the relevant chunk. Although this relevant chunk might not be as satisfactory as the more specific one, the response latency of this second embodiment is usually shorter than the response latency of the first embodiment.

As described above in connection with FIG. 5, the stream engine 60 receives one or more candidate document identifiers such as URIs from the cache engine 40. For each URI, the stream engine 60 submits a request to a respective data source to retrieve the corresponding candidate document hosted by the data source. If multiple requests are submitted to different data sources within a short time period or even in parallel, the requested candidate documents may arrive at the stream engine 60 simultaneously or nearly so.

In some embodiments, a candidate document such as a web page at a remote web server is divided into multiple data packets at the respective data source and transmitted back to the stream engine 60 one packet at a time. But due to network traffic jams, the data packets from a single data source may arrive at the stream engine 60 out of their original transmission order and the data packets from different data sources may arrive at the stream engine 60 at different rates. The query engine 30, however, usually requires that the data packets of a particular candidate document be analyzed sequentially to identify relevant chunks therein and present them to the end user. This is especially true if a text node that satisfies a search query is larger than the maximum size of a packet and therefore has to be allocated into multiple data packets for network transmission.

As a result, such a deadlock situation often occurs: on the one hand, the stream engine 60 is waiting for a data packet from a first data source to support the query engine 30's operation; on the other hand, the data packet cannot arrive at the stream engine 60 on time due to network delay. At the same time, multiple data packets from a second data source may have arrived at the stream engine 60, but they are postponed from further processing although they might contain a relevant chunk. If this issue is not appropriately resolved, it would significantly increase the computer system's response latency, causing a less satisfactory user experience to the end user.

Figure 9A:
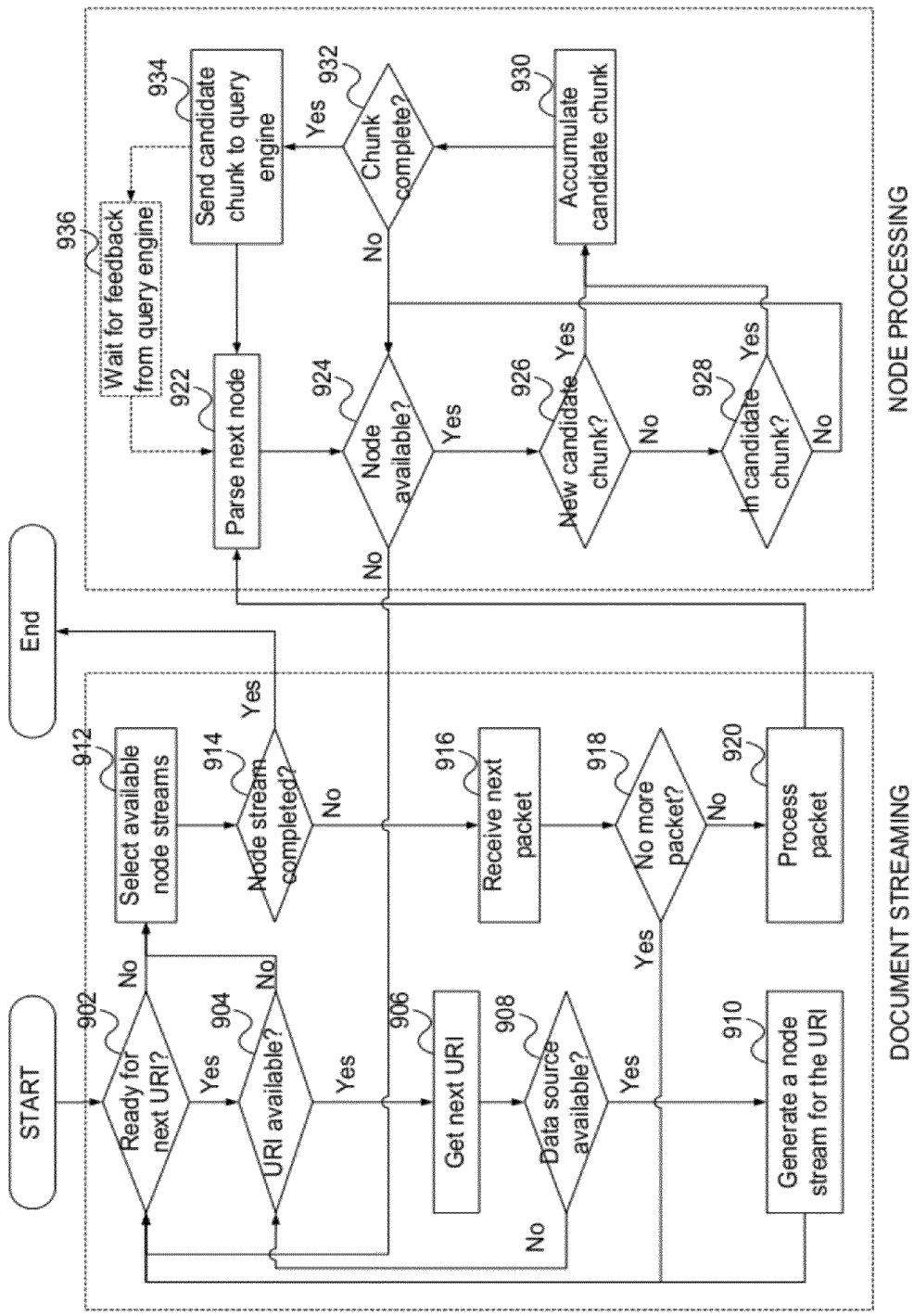
FIG. 9A is a flowchart illustrative of how the stream engine processes multiple candidate documents to identify candidate chunks in accordance with some embodiments.

FIG. 9A is a flowchart illustrative of how the stream engine 60 processes multiple candidate documents to identify candidate chunks in accordance with some embodiments. For illustration, assume that the stream engine 60 receives two URIs, UA and UB, from the cache engine 40, each identifying a candidate document at a respective data source. In reality, the stream engine 60 may receive N URIs and therefore process N node streams at the same time, N being an integer number varying from a few to a few hundred.

Initially, whenever it has bandwidth for processing more URIs (902, yes), the stream engine 60 checks whether there are any URI available for processing (904). If not (904, no), the stream engine 60 processes existing node streams (912). In this example, both UA and UB are available (904, yes). The stream engine 60 chooses one of them (906), e.g., UA, and checks the availability of the corresponding data source (908). If the data source is not available (908, no), the stream engine 60 then returns to process the next URI (902). Otherwise (908, yes), the stream engine 60 generates a node stream for UA (910) and then returns to process the next URI (902). At the end, for each candidate document, the stream engine 60 generates a node stream to manage incoming data packets corresponding to the document.

In some embodiments, the stream engine 60 checks the availability of a data source repeatedly until a predefined condition is met, e.g., the time elapsed from the first check to the last check is beyond a threshold level. If no, the stream engine 60 assumes that the corresponding document is not available and devotes its resources to processing other available candidate documents. Note that the stream engine 60 may perform the same or similar exercise repeatedly for each data source from which it has already received data packets. If the stream engine 60 fails to receive any data packet from a data source for a predefined time period, the stream engine 60 may assume that this data source is no longer available and free any resources allocated for this data source and the corresponding node stream. By doing so, the overall response latency is below a level of reasonable tolerance.

In this example, assume that the stream engine 60 chooses to work on one of the two available node streams (902), e.g., the UA node stream, and the first data packet has arrived (916). The stream engine 60 processes the data packet (920), such as verifying its accuracy, extracting the raw data of the candidate document from the data packet, and converting the raw data into one or more nodes in the UA node stream. Next, the stream engine 60 parses the next node in the UA node stream (922) to identify candidate chunks within the node stream.

For each node in the UA node stream, the stream engine 60 determines if it corresponds to a new candidate chunk (926) or is within an existing candidate chunk (928) until finishing the last one in the node stream (924). In either case (926, yes) (928, yes), the stream engine 60 accumulates the node into the candidate chunk (930) and then determines whether it has reached the end of the corresponding candidate chunk. If so (932, yes), the stream engine 60 sends the candidate chunk to the query engine 30 for further processing (934), e.g., determining whether the candidate chunk is a chunk relevant to the user-specified search keywords.

In some embodiments, after sending the candidate chunk to the query engine 30, the stream engine 60 returns to parse the next one in the node stream (922) and repeats the aforementioned operations until it exhausts the last one in the node stream. In other words, the stream engine 60 and the query engine 30 may proceed in parallel and independently. This mechanism or the like can be very efficient if the computer system 100 has enough resources, e.g., multiple processors (including co-processors) and/or a large amount of memory, or if different components within the computer system 100, e.g., the stream engine 60 and the query engine 30, operate on separate threads and there is a carefully-maintained thread boundary between the two.

In some other embodiments, the stream engine 60 pauses after passing one candidate chunk to the query engine 30 (934) and resumes processing the node stream after it receives feedback from the query engine 30 (936). This mechanism or the like may be more feasible if the computer system 100 has limited resources, e.g., a single processor and/or limited memory. In this case, the stream engine 60 and the query engine 30 share the same thread. As a result, the computer system 100 may only need a small amount of memory to have a reasonably efficient performance. A more detailed description of this feedback-based scheme is provided below in connection with FIGS. 10A-10B and 11A-11G.

As noted above, a candidate chunk is semantically and contextually a unit within a candidate document. The process described above in connection with FIG. 8A may annotate multiple nodes in a node stream, each annotated node corresponding to a candidate chunk. These candidate documents may be associated with different levels of a hierarchical data model of the candidate document. In other words, a small candidate chunk can be a descendant of a large candidate chunk.

FIG. 9B is an exemplary HTML document to be processed by the stream engine as shown in FIG. 9A in accordance with some embodiments. From applying the corresponding heuristic rules to this HTML document, the stream engine 60 identifies nine candidate chunks 942 through 958. Note that the first node within each candidate chunk is highlighted in FIG. 9B. For example, the first node of the candidate chunk 942 is the <table> tag 960 and the first node of the candidate chunk 956 is the <p> tag 974. The candidate chunk 956 and the candidate chunk 958 are at the same level in the hierarchical data model, both of which are descendants of the larger candidate chunks such as the candidate chunk 954.

When applying the process in FIG. 9A to the HTML candidate document in FIG. 9B, the stream engine 60 receives the node including the <table> tag 960 and a new candidate chunk 942 is found (924, yes). Subsequently, the stream engine 60 receives the node including the <td> tag 962 and another new candidate chunk 944 is found (924, yes). When the stream engine 60 receives the </p> tag 976, the first complete candidate chunk 956 is found (930, yes) and the stream engine 60 sends the candidate chunk 956 to the query engine 30 (932). Similarly, when the stream engine 60 reaches the </p> tag 980, the second complete candidate chunk 958 is found (930, yes) and sent to the query engine 30 (932). When the stream engine 60 reaches the </td> tag 982, the third complete candidate chunk 954 is found (930, yes) and sent to the query engine 30 (932). Note that the candidate chunk 954 is the parent of the two candidate chunks 956 and 958 and the candidate chunk 954 does not have any content outside the two descendant candidate chunks 956 and 958. As will be explained below, the query engine 30 identifies the candidate chunk 954 as the relevant chunk if the two descendant candidate chunks 956 and 958 in combination satisfy the user-specified search keywords.

Assume that the stream engine 60 has processed the last node in the UA node stream, which is one of multiple data packets occupied by a large paragraph in the corresponding candidate document, and the stream engine 60 has not received the last of the multiple data packets yet. In this case, because there are no more nodes in the UA node stream (922, no), the stream engine 60 returns to process the next URI (902). But as noted above, there are no more URIs available (904, no) because the stream engine 60 receives only two URIs from the cache engine 40 and it has already generated a node stream for each URI. The stream engine 60 then has to choose between the UA node stream and the UB node stream (912).

If the stream engine 60 chooses one of the two node streams, e.g., the UA node stream, and for some reason the next data packet associated with the UA node stream has not arrived at the stream engine 60 after a certain time (918, no), the stream engine 60 then returns to perform operation 902. In some embodiments, the stream engine 60 does not randomly choose the next available node stream. Rather, it compares the available node streams and selects one node stream that has one or more data packets waiting to be processed (912). By doing so, the stream engine 60 effectively reduces the risk of running into the deadlock situation described above, which blocks the query engine 30 from identifying and serving relevant chunks from a different node stream.

For example, after finishing the last node in the UA node stream, the stream engine 60 may choose the UB node stream (912) and start searching for candidate chunks within the UB node stream until (i) the UB node stream is completed (914, no) or (ii) there is a network traffic jam with the UB node stream (924, no). In either case, the stream engine 60 repeats the same process described above to work on the UA node stream if it has newly received data packets and there is still time for processing the node stream for a given response latency threshold.

In some embodiments, as noted above, a feedback mechanism (936, FIG. 9A) is established between the stream engine 60 and the query engine 30. The description above illustrates the activities on the stream engine side. The description below in connection with FIGS. 10 and 11 focuses on the query engine side, in particular, how the query engine 30 works in concert with the stream engine 60 to identify relevant chunks in response to a search request.

Figure 10A:
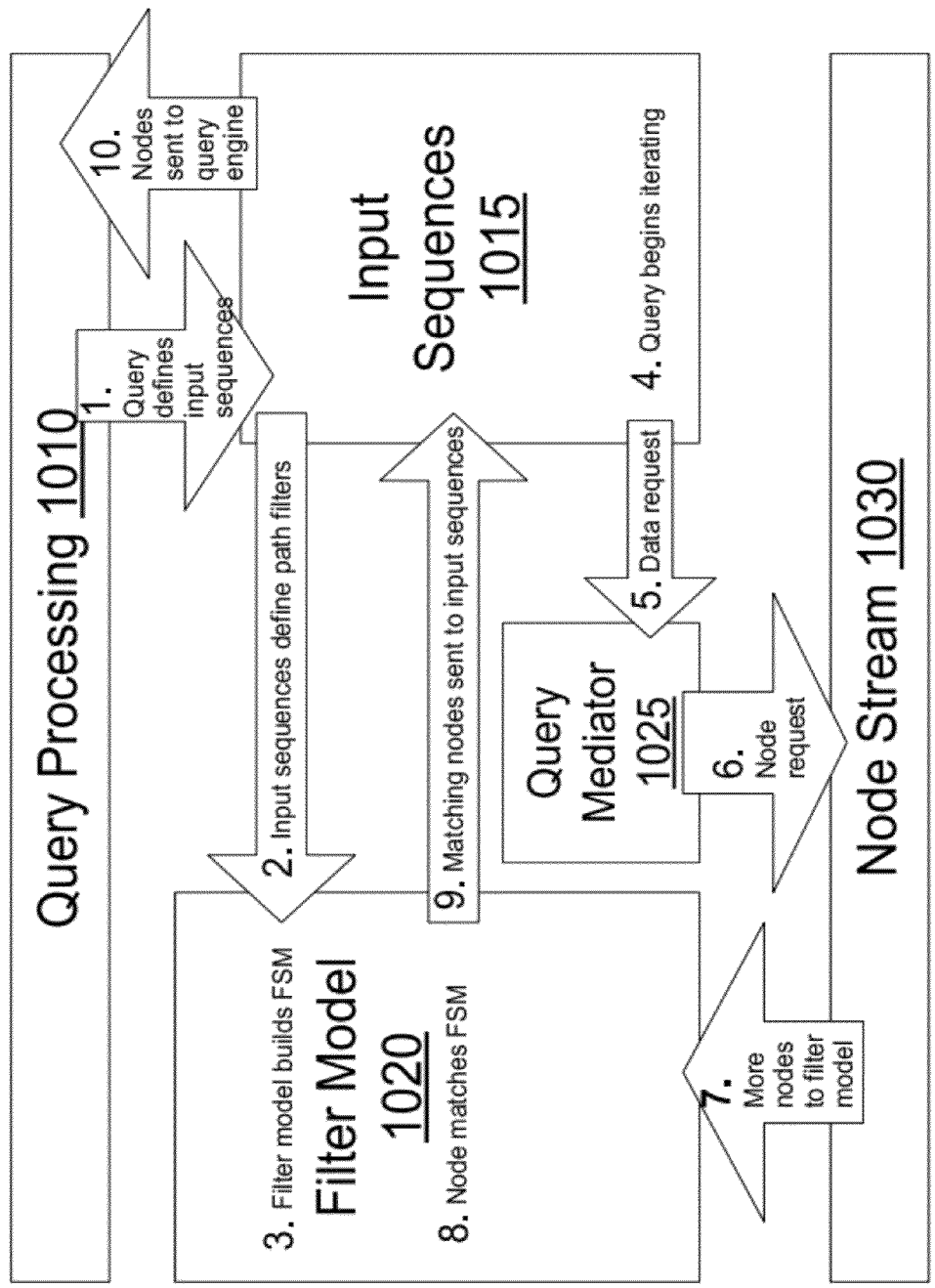
FIG. 10A is a block diagram illustrative of how a query mediator coordinates the query engine and the stream engine to identify chunks within a node stream representing a candidate document in accordance with some embodiments.

FIG. 10A is a block diagram illustrative of how a query mediator coordinates the query engine 30 and the stream engine 60 to identify chunks within a node stream representing a candidate document in accordance with some embodiments.

As described above, upon receiving a search query, the query engine 30 may generate one or more path filters (308, FIG. 3), the path filters are passed down to the stream engine 60 by the cache engine 40 (411, FIG. 4), and the stream engine 60 then applies the path filters to a node stream (512, FIG. 5). FIG. 10A depicts these processing steps in a slightly different manner.

Upon receiving the search query, the query engine 30 performs query processing 1010 to define a set of input sequences 1015 for the search query. The set of input sequences 1015 further defines one or more path filters, which are used to build a filter model 1020. In some embodiments, as described below in connection with FIG. 10B, the filter model 1020 is the same or similar to a deterministic finite state machine (FSM).

In addition to defining the path filters, the query engine 30 iterates the input sequences 1015 and their associated node sub-streams to identify relevant chunks. Initially, because the query engine 30 has not received anything from the stream engine 60, a data request is submitted to the query mediator 1025. The query mediator 1025 is a user-configurable tool through which the user can, e.g., specify the maximum number of nodes in memory at any given time and control the rate of node stream consumption by the query engine 30.

In some embodiments, as the query engine 30 iterates each input sequence 1015 and its associated node sub-stream, it determines whether a desired node is currently in memory. If not, the query engine 30 asks the query mediator 1025 for the desired node until one of the predefined conditions is met. These conditions include: (i) another context node for the input sequence is available; (ii) another fragment or content node of the current context node is available; and (iii) the current context node is complete. A more detailed description of context nodes is provided below in connection with FIGS. 11A through 11G.

In response to the data request, the query mediator 1025 triggers the stream engine 60 for further conversion of raw data into the node stream 1030. As a result, more nodes are submitted to the filter model 1020. The filter model 1020 feeds these nodes into the finite state machine it builds using the path filters to accumulate those nodes matching the path filters in their respective sub-streams until one of the predefined conditions is satisfied. By then, the query mediator 1025 passes the control back to the input sequences 1015 and therefore the query engine 30, which analyzes the node sub-streams to identify relevant chunks.

In sum, this feedback mechanism between the stream engine 60 and the query engine 30 ensures that a minimum number of nodes are stored in the computer system 100's memory and processed by the query engine 30 to fulfill the search query, and that this process is accomplished without loss of any raw data.

Figure 10B:
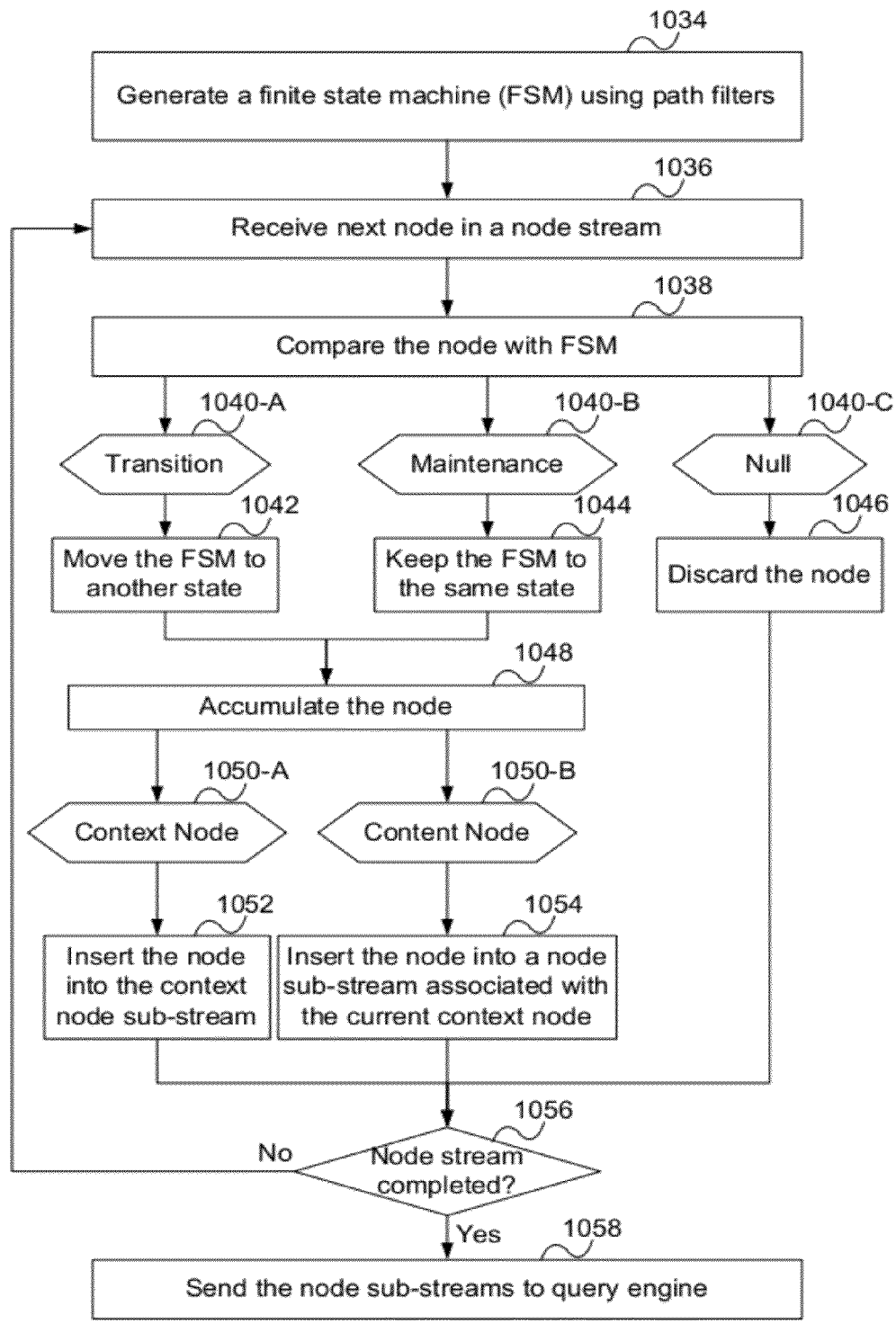
FIG. 10B is a flowchart illustrative of how the stream engine divides the node stream into multiple sub-streams using a filter model in accordance with some embodiments.

FIG. 10B is a flowchart illustrative of how the stream engine 60 divides the node stream into multiple sub-streams using a filter model in accordance with some embodiments.

Using the path filters provided by the query engine 30, the stream engine 60 generates a finite state machine (1034). The input to the finite state machine is a node stream corresponding to the raw data of a candidate document and the output is one or more node sub-streams, each node sub-stream including a set of nodes that may be potentially relevant to the search query. Thus, the finite state machine effectively filters out nodes that are deemed to be completely irrelevant to the search query and reduces the amount of data to be handled by the query engine 30. Next, the stream engine 60 receives the next node in the node stream (1036) and compares the node with the finite state machine (1038) to determine if the node belongs to one or more node sub-streams associated with the path filters.

In some embodiments, the finite state machine performs different operations in accordance with different comparison results. For example, the finite state machine may: (i) perform a transition operation (1040-A) and move itself from the current state to a different one that is associated with the node (1042); (ii) perform a maintenance operation (1040-B) and stay at the current state (1044); or (iii) perform a null operation (1040-C) and discard the node as irrelevant to the search query (1046). In the last case, the finite state machine may also stay at the current state.

After performing a transition/maintenance operation, the stream engine 60 accumulates the node into a respective node sub-stream (1048). Depending on whether the node is a context node (1050-A) or a content node (1050-B), the stream engine 60 may insert the node into the context node sub-stream (1052) or insert the node into a node sub-stream that is associated with the current context node (1054). A more detailed description of this accumulation operation is provided below in connection with FIG. 11E. Next, the stream engine 60 determines whether the node stream is completed (1056). If so (1056, yes), the stream engine 60 sends the node sub-streams to the query engine 30 for further process (1058). Otherwise (1056, no), the stream engine 60 returns to process the next node in the node stream (1036).

To further explain the feedback mechanism between the stream engine 60 and the query engine 30, FIGS. 11A through 11G illustrate in detail how a candidate document is processed using the feedback mechanism.

Figure 11A:
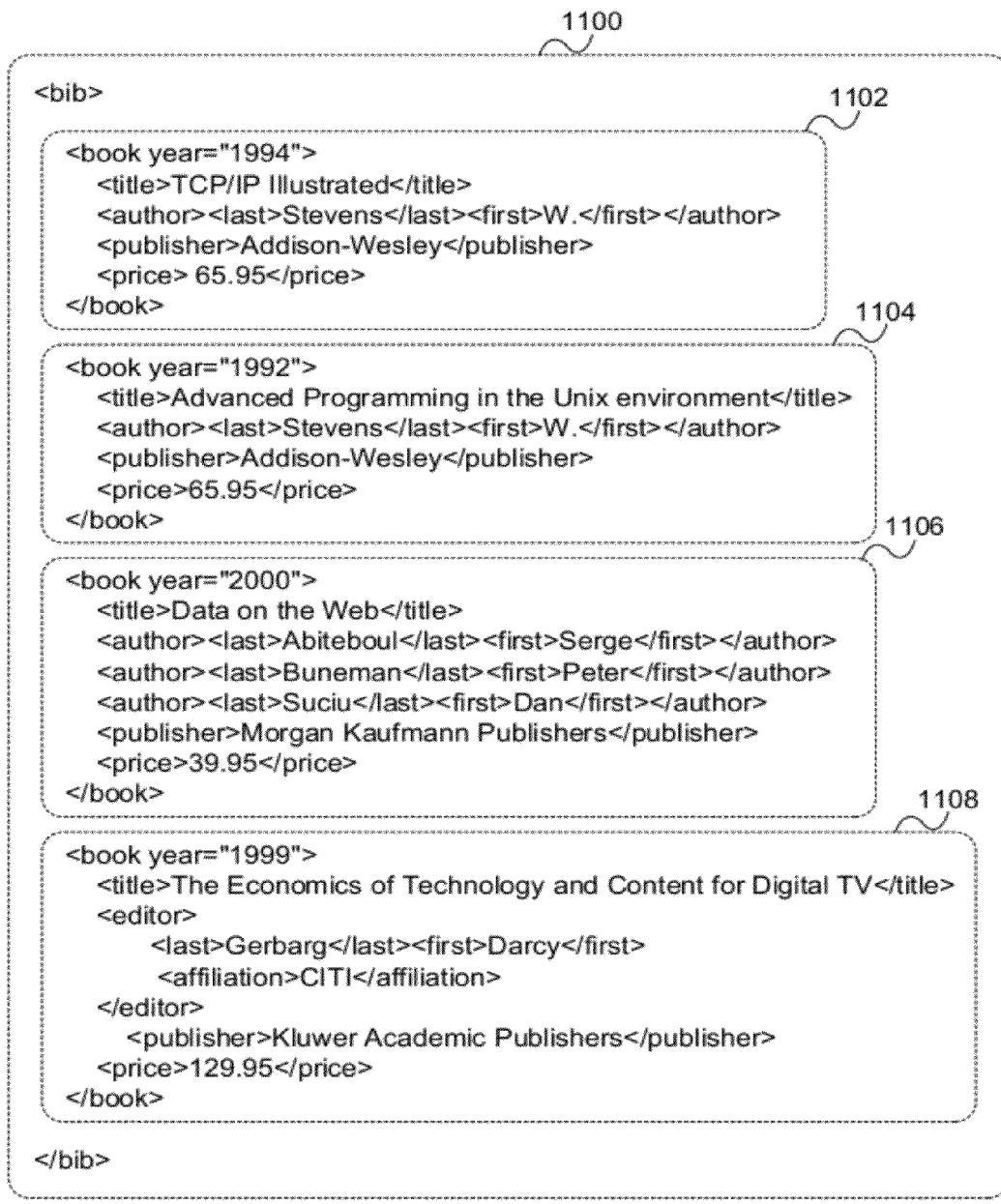
FIG. 11A is an exemplary XML document to be processed by the stream engine and the query engine in accordance with some embodiments.

FIG. 11A is an exemplary XML document 1100 to be processed by the stream engine 60 and the query engine 30 in accordance with some embodiments. The XML document 1100 includes a list of books 1102 through 1108, each book being identified by its publication year (the "year" attribute in the <book> tag), its title (the pair of <title> and </title> tags), its author (the pair of <author> and </author> tags) including first name (the pair of <first> and </first> tags) and last name (the pair of <last> and </last> tags), its publisher (the pair of <publisher> and </publisher> tags), and price (the pair of <price> and </price> tags).

FIG. 11B is an exemplary XQuery 1110 to be applied to the XML document 1100 in accordance with some embodiments. The XQuery 1110 searches for any book in the XML document "bib.xml" whose publisher is Addison-Wesley and whose publication year is later than 1991. The XQuery 1110 requires that the search results be returned in the form of a new XML document including a new list of the books matching the two search criteria, each book in the new XML document only including the book's title and its publication year as an attribute in the <book> tag.

FIG. 11C is a table 1115 of the five input sequences defined by the query engine 30 in accordance with some embodiments. Based on the XQuery 1110, the query engine 30 defines five input sequences, each input sequence corresponding to one tag or tag attribute within the XML document 1100. Note that the publication year attribute "@year" appears twice in the XQuery 1110, one in the where clause and the other in the return clause, and corresponds to two separate input sequences. The five input sequences each have an associated node sub-stream labeled "Node Sub-Stream (0)" through "Node Sub-Stream (4)" and correspond to a respective path filter as shown in the table 1115.

Different input sequences are associated with different portions of the XQuery 1110 and therefore have different modes. For example, the <book> tag associated with the input sequence "Node Sub-Stream (0)" appears in the for-in clause, but not the return clause. Thus, the input sequence "Node Sub-Stream (0)" is presumed to provide context for the search process and serve in the "Context" mode, and the nodes in the corresponding node sub-stream are referred to as "context node sub-stream."

Similarly, the content of the <publisher> tag associated with the input sequence "Node Sub-Stream (1)" is compared with "Addison-Wesley" in the where clause of the XQuery 1110. Thus, the input sequence "Node Sub-Stream (1)" is presumed to provide content for the search process and serve in the "Content" mode, and the nodes in the corresponding node sub-stream are therefore referred to as "content node sub-stream." The <title> tag associated with the input sequence "Node Sub-Stream (4)" appears in the return clause. Thus, the input sequence "Node Sub-Stream (4)" is presumed to provide both context and content for the search process and serve in the "All" mode. In some embodiments, an input sequence in the "All" mode has two node sub-streams.

The "Parent" column in the table 1115 indicates whether an input sequence is a child of another input sequence. In this example, the input sequence associated with the for-in clause provides basis for the other input sequences associated with the other parts of the XQuery 1110. Any node in one of the other four input sequences corresponds to a specific node in the input sequence "Node Sub-Stream (0)," which is therefore deemed to be the parent input sequence of the other four input sequences.

Figure 11D:
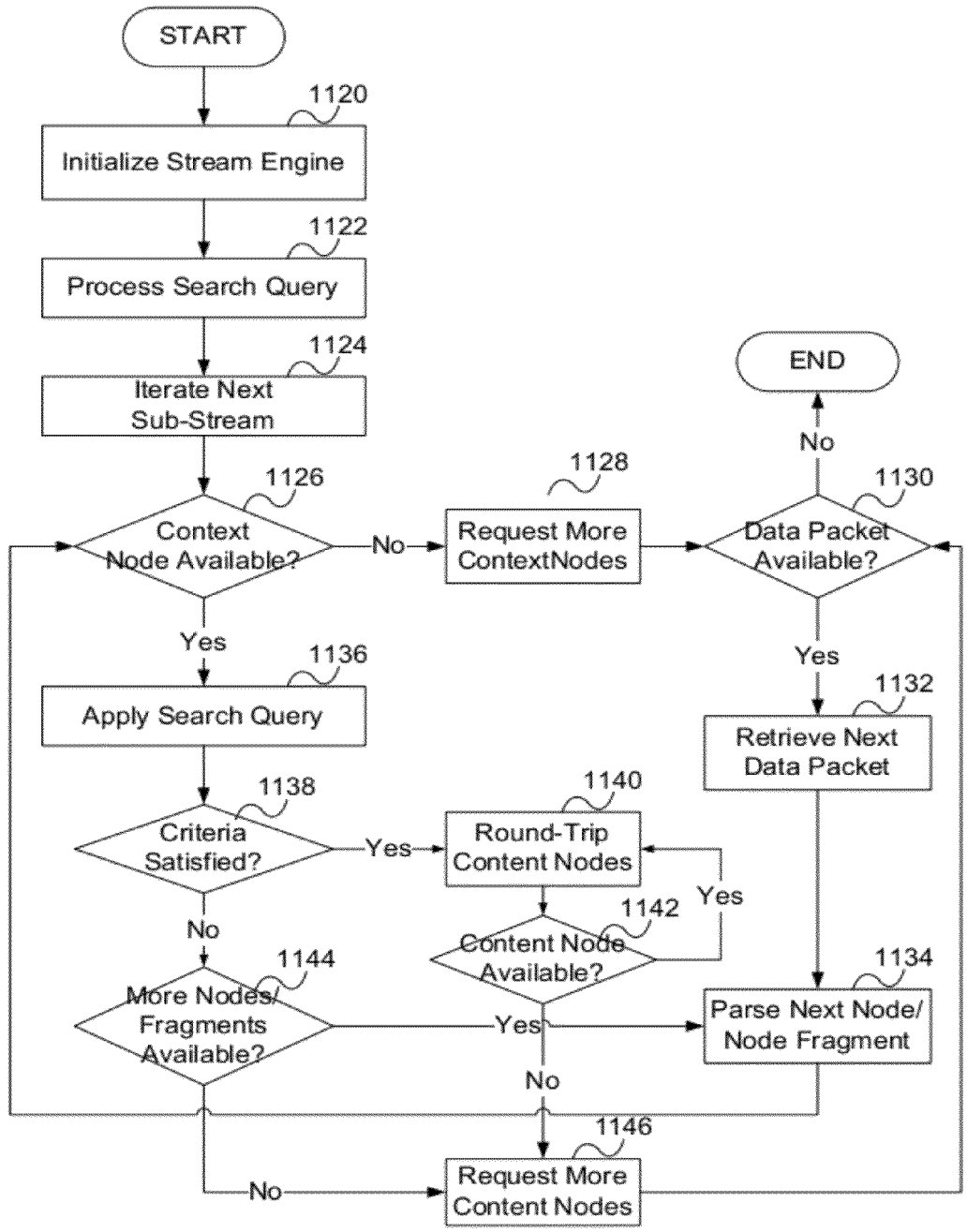
FIG. 11D is a flowchart illustrative of how the query engine processes node sub-streams at different input sequences in accordance with some embodiments.

FIG. 11D is a flowchart illustrative of how the query engine 30 processes node sub-streams at different input sequences in accordance with some embodiments. This flowchart provides more details of the information flow shown in the block diagram of FIG. 10A.

The query engine 30 initializes the stream engine 60 (1120) and processes the search query (1122) to define input sequences, path filters, and a finite state machine that is used for generating one or more node sub-streams. The query engine 30 then starts iterating the next node sub-stream (1124). In this example, the query engine 30 begins with the context node sub-stream of Node Sub-Stream (0).

If the context node sub-stream has no context node (1126, no), the query engine 30 then requests more context nodes from the stream engine 60 (1128, 1130). Consequently, more data packets are retrieved (1132) and parsed (1134) to provide more nodes, including context nodes and content nodes, to the query engine 30.

Once a new context node is present in the node sub-stream of Node Sub-Stream (0) (1126, yes), the query engine 30 applies the search query to the context node and its associated nodes in other node sub-streams (1136). If the search criteria are satisfied (1138, yes), a relevant chunk has been identified and there is no need to apply the search query to the remaining portion of the relevant chunk. Thus, the query engine 30 needs to quickly reach the end of the relevant chunk through round-tripping the content nodes in different node streams (1140). After finishing the content nodes, if the end of the chunk has not been reached (1142, no), the query engine 30 may request the stream engine 60 to process more data packets (1146).

If the search criteria are not met (1138, no), a relevant chunk has not been identified, and the query engine 30 sends a request to the query mediator to retrieve one or more content nodes and re-apply the search query. If the stream engine 60 has more nodes or node fragments (1144, yes), they will be parsed and submitted to the query engine 30 (1134). Otherwise (1144, no), the query engine 30 may request the stream engine 60 to process more data packets (1146).

As shown in FIG. 11C, the XQuery 1110 defines five input sequences and therefore five path filters. The stream engine 60 uses these path filters to build a finite state machine, which, as shown in FIG. 10B, is to divide the original node stream corresponding to the XML document 1100 into five node sub-streams. The finite state machine has an initial state, which can be any one of the five input sequences.

Figure 11E:
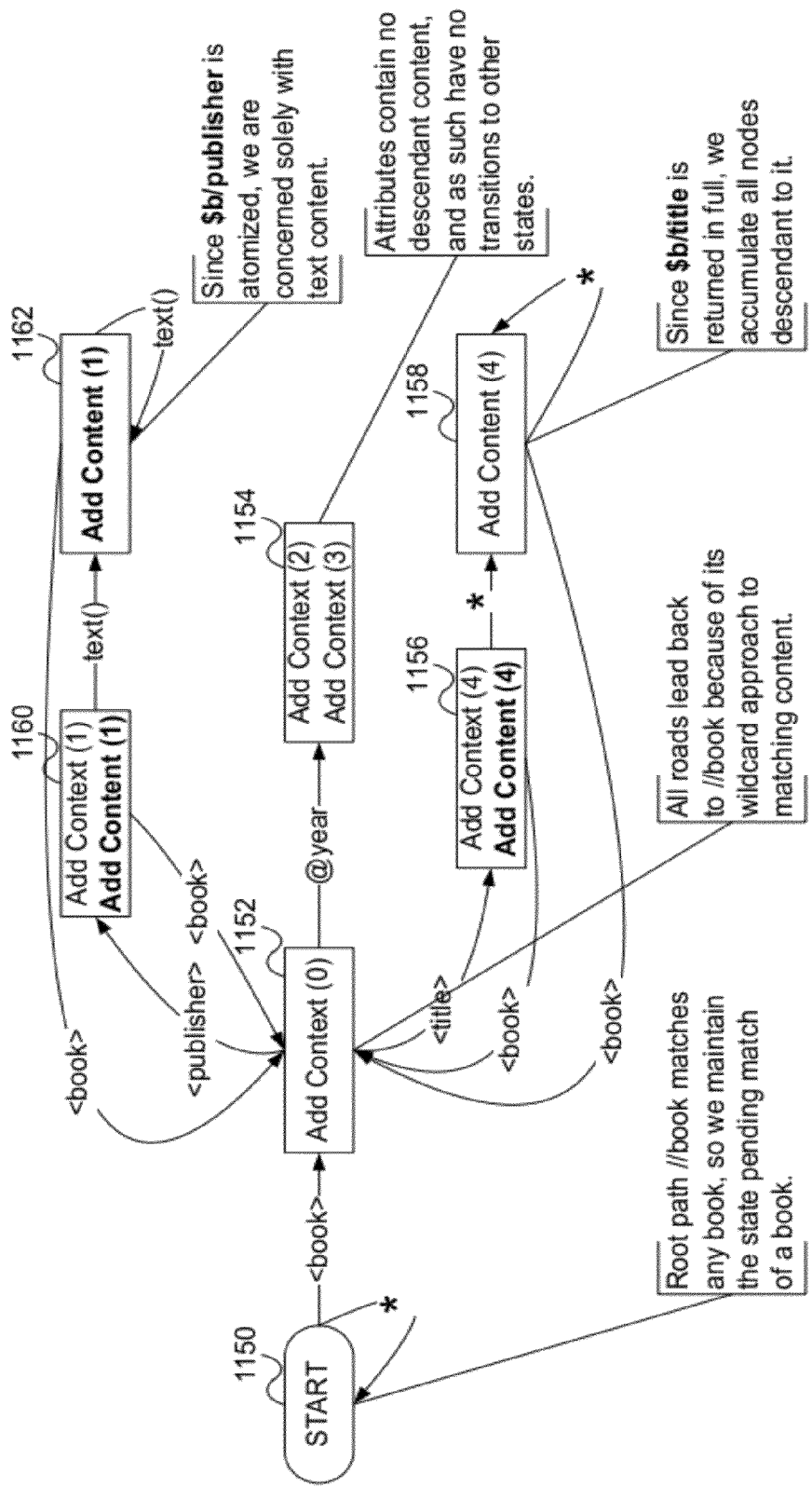
FIG. 11E is a block diagram illustrative of how a node stream corresponding to the XML document is divided into multiple node sub-streams by a finite state machine in accordance with some embodiments.

FIG. 11E is a block diagram illustrative of how the node stream is divided into multiple node sub-streams by the finite state machine in accordance with some embodiments. From the start state (1150), the finite state machine receives a node including the <bib> tag. Because this tag is not relevant to any input sequence, the finite state machine discards the node. After receiving a node including the <book> tag, the finite state machine makes a transition to the state corresponding to Node Sub-Stream (0) and adds the node into the corresponding context node stream (1152). Next, the node including the publication year attribute is processed and added into the two respective node sub-streams corresponding to Node Sub-Stream (2) and Node Sub-Stream (3) (1154).

Upon receiving a node including the <title> tag, the finite state machine makes another transition to the state corresponding to Node Sub-Stream (4). As noted above in connection with FIG. 11C, the input sequence Node Sub-Stream (4) serves in the "All" mode. Thus, besides adding the node including the <title> tag into the corresponding node sub-stream (1156), the finite state machine adds everything enclosed by the pair of (<title>, </title>) tags into the same node sub-stream or a separate node sub-stream (1158). For example, if there is a pair of (<subtitle>, </subtitle>) tags within the pair of (<title>, </title>) tags, they will be added into the respective node sub-stream because, as explained above, the XQuery 1110 requires the return of each matching book's title, including its subtitle, if present.

Similarly, the node including the <publisher> tag is added into the node sub-stream corresponding to Node Sub-Stream (1) (1160) and the textual portion within the pair of (<publisher>, </publisher>) tags is extracted by a text( ) function and added into the same or a separate node sub-stream (1162). This textual portion is required by the XQuery 1110 to check whether the book is published by the publisher Addison-Wesley.

Figure 11F:
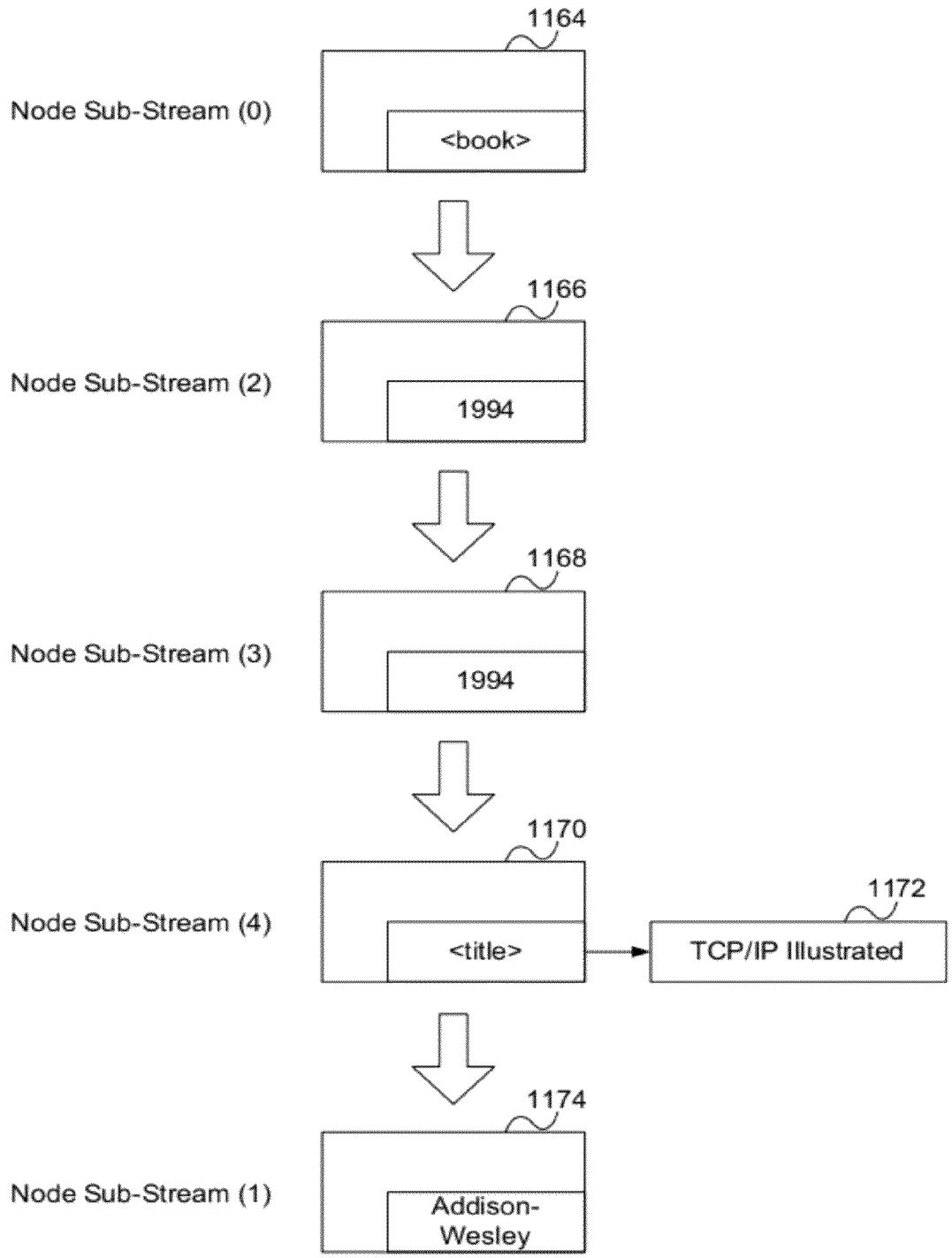
FIG. 11F is a block diagram illustrative of the input sequences and their associated node sub-streams after the first candidate chunk in the XML document is processed in accordance with some embodiments.

FIG. 11F is a block diagram illustrative of the input sequences and their associated node sub-streams after the first candidate chunk in the XML document is processed in accordance with some embodiments.

The node sub-stream "Node Sub-Stream (0)" is first populated with a context node "<book>" (1164). Next, the node sub-streams "Node Sub-Stream (2)" and "Node Sub-Stream (3)" are each populated with a content node "1994" (1166, 1168). For the node including the <title> tag, the stream engine 60 inserts into the node sub-stream "Node Sub-Stream (4)" both the <title> tag (1170) and the data descending from the <title> tag (1172). For the node including the <publisher> tag, the stream engine 60 is only interested in its content and therefore populates the node sub-stream "Node Sub-Stream (1)" with the textual portion of the <publisher> tag (1174).

Figure 11G:
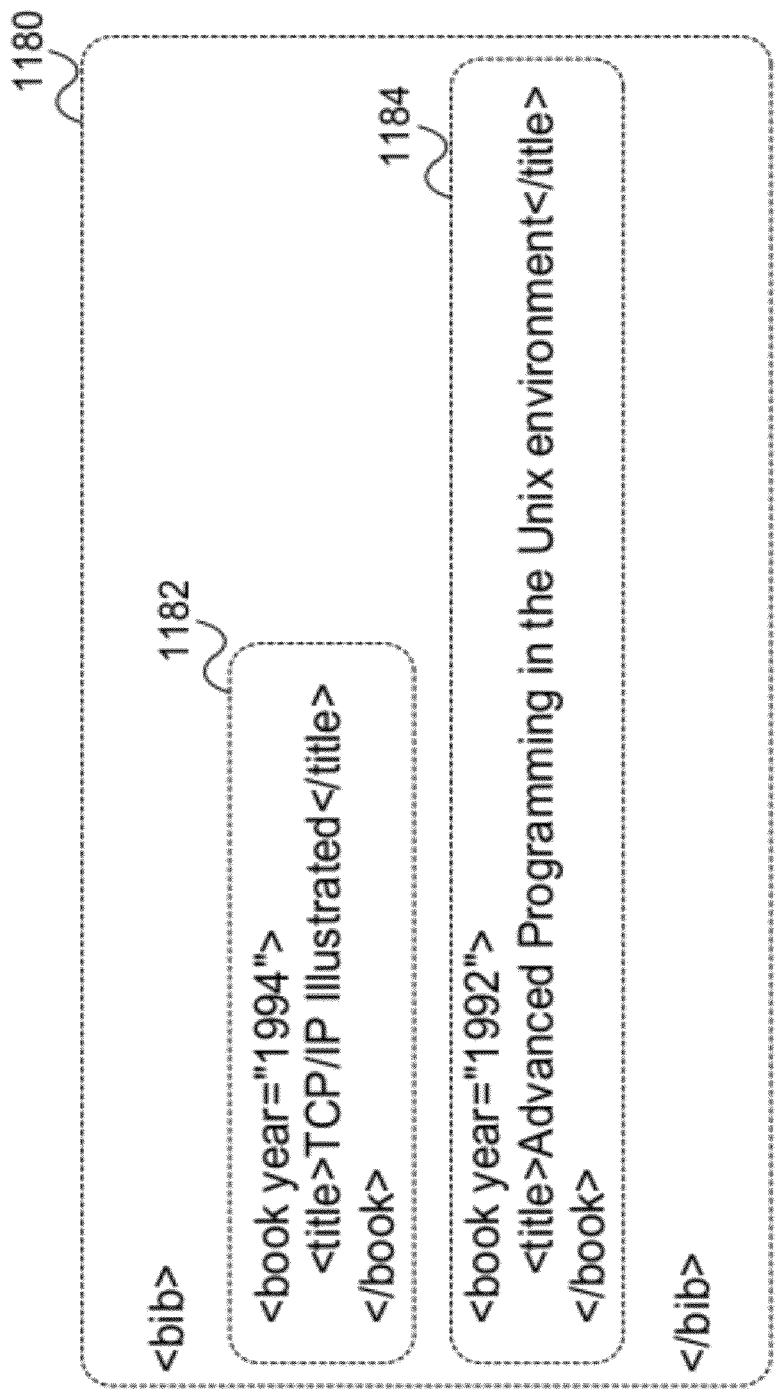
FIG. 11G is the search result of applying the XQuery to the node sub-streams derived from XML document in accordance with some embodiments.

FIG. 11G is the search result of applying the XQuery 1110 to the node sub-streams derived from XML document 1100 in accordance with some embodiments. The search result is also an XML document 1180 that includes two books 1182 and 1184 that satisfy the XQuery 1110. As shown in FIG. 11F, the node sub-streams corresponding to the five input sequences include all information necessary for generating this resulting XML document 1180.

Thus far, detailed descriptions of document-processing schemes in response to a search request, including the downstream processes 25 and the upstream processes 35, are provided above. These document-processing schemes can be used to implement various applications to satisfy different user needs. For illustration, embodiments of representative applications are provided below.

One application of the invention is to improve a user's experience with the search results generated by search engines. Although a document identified by the search results is relevant to the search keywords, the document may not include any relevant chunks because the search engines treat the entire document, not a chunk within the document, as the basic unit to be compared with the search keywords. Thus, one aspect of the invention is to identify and display relevant chunks within a document in response to a search request.

Figure 12A:
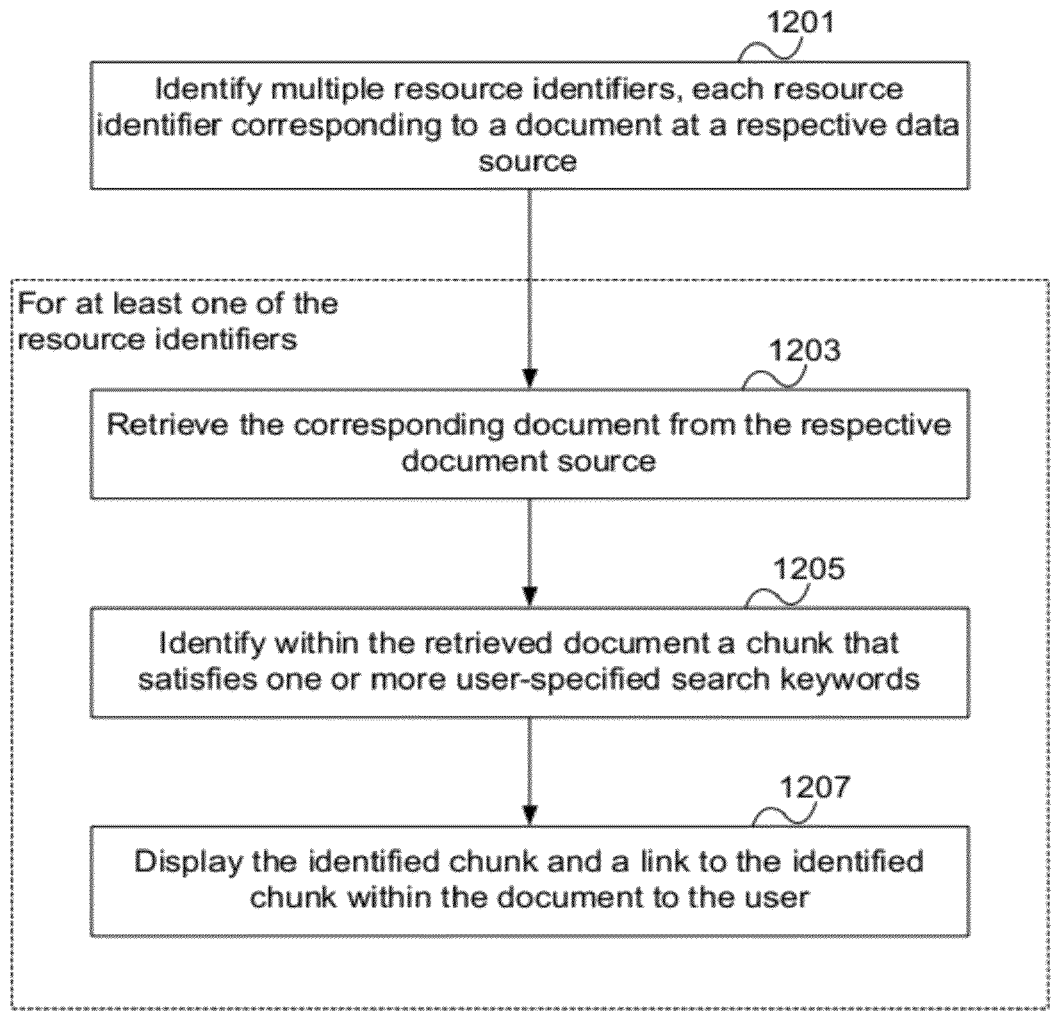
FIG. 12A is a flowchart illustrative of a first process of identifying one or more documents, each document having one or more chunks that satisfy user-specified search keywords, in accordance with some embodiments.

FIG. 12A is a flowchart illustrative of a first process of identifying one or more documents, each document having one or more chunks that satisfy user-specified search keywords, in accordance with some embodiments.

A computer identifies multiple resource identifiers (1201), each resource identifier corresponding to a document at a respective data source. In some embodiments, a resource identifier is a URL, which identifies a web page at a remote web server. In some embodiments, the resource identifiers are part of search results produced by a server computer such as a search engine in response to one or more search keywords provided by an end user from a client computer.

For at least one of the resource identifiers, the computer retrieves the corresponding document from the respective document source (1203). If the document is a web page hosted by a web server, the computer submits an HTTP request to the web server and the web server returns the document in an HTTP response. Within the retrieved document, the computer identifies a chunk that satisfies the user-specified search keywords (1205) and displays the identified chunk and a link to the identified chunk within the document to the user (1207).

Figure 12B:
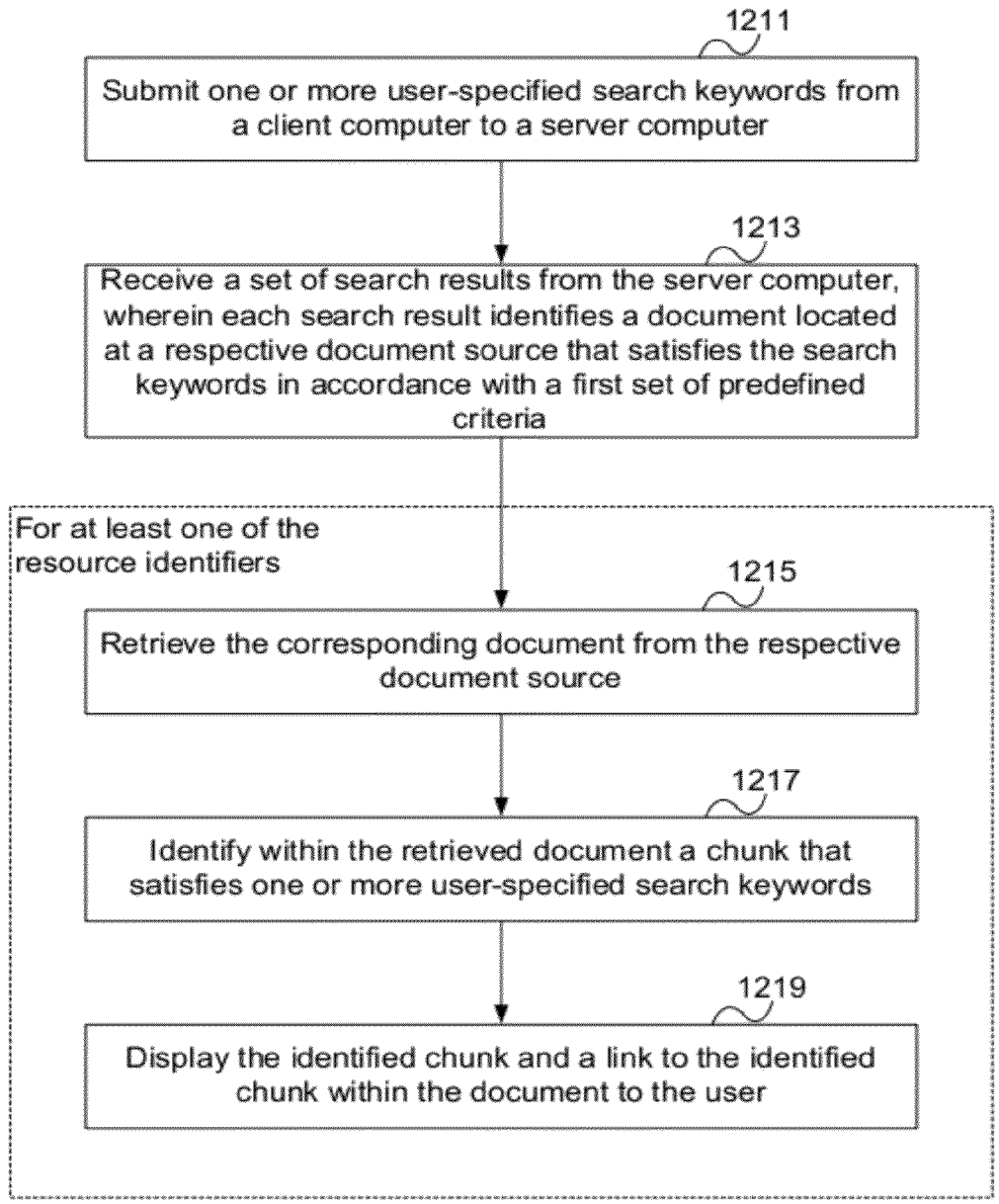
FIG. 12B is a flowchart illustrative of a second process of identifying one or more document, each document having one or more chunks that satisfy user-specified search keywords, in accordance with some embodiments.

FIG. 12B is a flowchart illustrative of a second process of identifying one or more document, each document having one or more chunks that satisfy user-specified search keywords, in accordance with some embodiments.

A client computer submits one or more user-specified search keywords to a server computer (1211). In some embodiments, the server computer is one or more third-party search engines. The client computer receives a set of search results from the server computer (1213), each search result identifying a document located at a respective document source that satisfies the search keywords in accordance with a first set of predefined criteria.

For each identified document, the client computer retrieves the document from the corresponding document source (1215), identifies a chunk within the document that satisfies the search query in accordance with a second set of predefined criteria (1217), and displays the identified chunk and a link to the identified chunk within the document (1219). In some embodiments, the two sets of predefined criteria are different. For example, the first set of criteria requires that all the search keywords be found within a document, but not necessarily within a chunk. In contrast, the second set of criteria is satisfied only if all the search keywords are found within a chunk.

FIGS. 12C through 12J are screenshots of a graphical user interface on a computer display illustrative of features associated with the processes as shown in FIGS. 12A and 12B in accordance with some embodiments.

The graphical user interface includes one or more document links, each document link having one or more associated chunks identified within the corresponding document as satisfying one or more user-specified search keywords. In some embodiments, each chunk has an associated chunk link and includes terms matching each of the user-specified search keywords. The matching terms may also be highlighted in the chunk in a visually distinguishable manner (such as in different colors, font types or combination thereof). In response to a user selection of a chunk's chunk link, the corresponding document is displayed in a window on the computer display and at least a portion of the chunk is highlighted in the window.

In some embodiments, each document link has an associated chunk page-link icon for searching chunks within documents that are referenced by the corresponding document. In response to a user selection of a document link's associated chunk page-link icon, one or more referenced document links are displayed on the computer display, with each referenced document link having one or more associated chunks identified within a corresponding referenced document as satisfying the user-specified search keywords.

In some embodiments, each document link has an associated hide-chunk icon. In response to a user selection of a document link's associated hide-chunk icon, the chunks associated with the document link and their associated chunk links disappear from the computer display.

In some embodiments, chunks associated with a respective document link are displayed in an order consistent with their relative relevancy to the user-specified search keywords. In some other embodiments, chunks associated with a respective document link are displayed in an order consistent with their relative locations within the corresponding document.

Figure 12C:
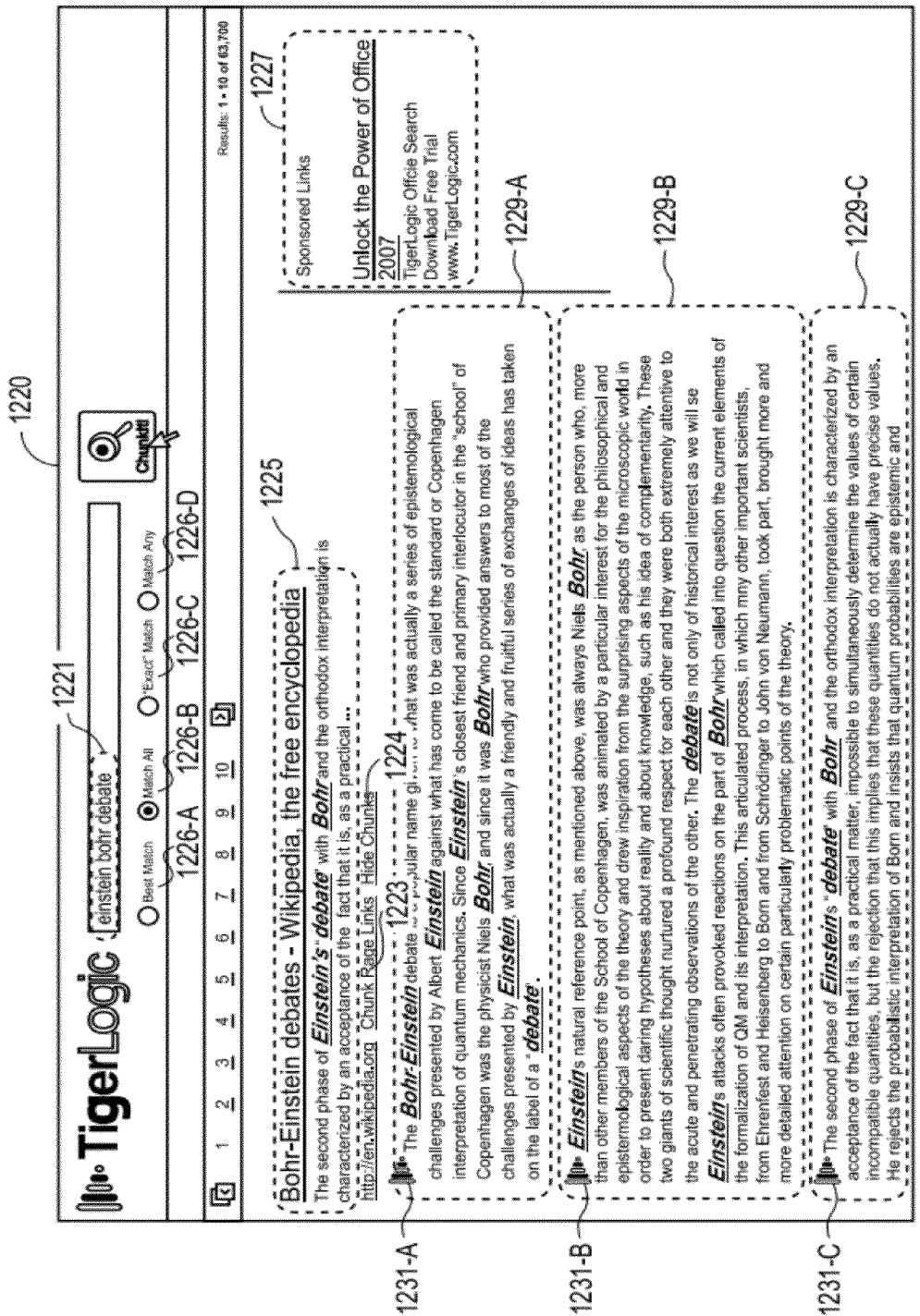

As shown in FIG. 12C, through an application 1220 (e.g., a web browser window), a user submits three search keywords 1221 from a client computer to a content provider such as a search engine. In this example, the application 1220 provides four different search options for the user to choose. They are:

"Best Match" option 1226-A—This search option allows the application 1220 to adaptively select one or more chunks satisfying one or more of the user-specified search keywords according to predefined criteria. In some embodiments, the "Best Match" option is the default option if the user does not expressly choose a different one. A more detailed description of this search option is provided below in connection with FIGS. 21A through 21D.

"Match All" option 1226-B—This search option limits the search results to relevant chunks that satisfy each of three user-specified search keywords. Thus, a candidate chunk that only includes "einstein" and "bohr," but not "debate," should not be in the search results responsive to the "Match All" option, but may be in the search results responsive to the "Best Match" option. As shown in FIG. 12C, the user expressly chooses the "Match All" option.

"'Exact' Match" option 1226-C—This search option further limits the search results to relevant chunks that not only satisfy each of three user-specified search keywords, but also include an exact match of the search keywords as a string. Examples of "exact"-matching chunks are shown in FIGS. 12F and 12G, respectively. Note that this option is different from the string-match approach, which is variant-sensitive. Under the string-match approach, "einstein bohr debates" does not match "Einstein-Bohr debate." But according to the "'Exact' Match" option, the two sets of terms do match each other as this search option ignores any non-word characters such as white space, punctuation, etc., and only requires that the three terms appear in the same order and have no intervening terms.

Figure 12D:
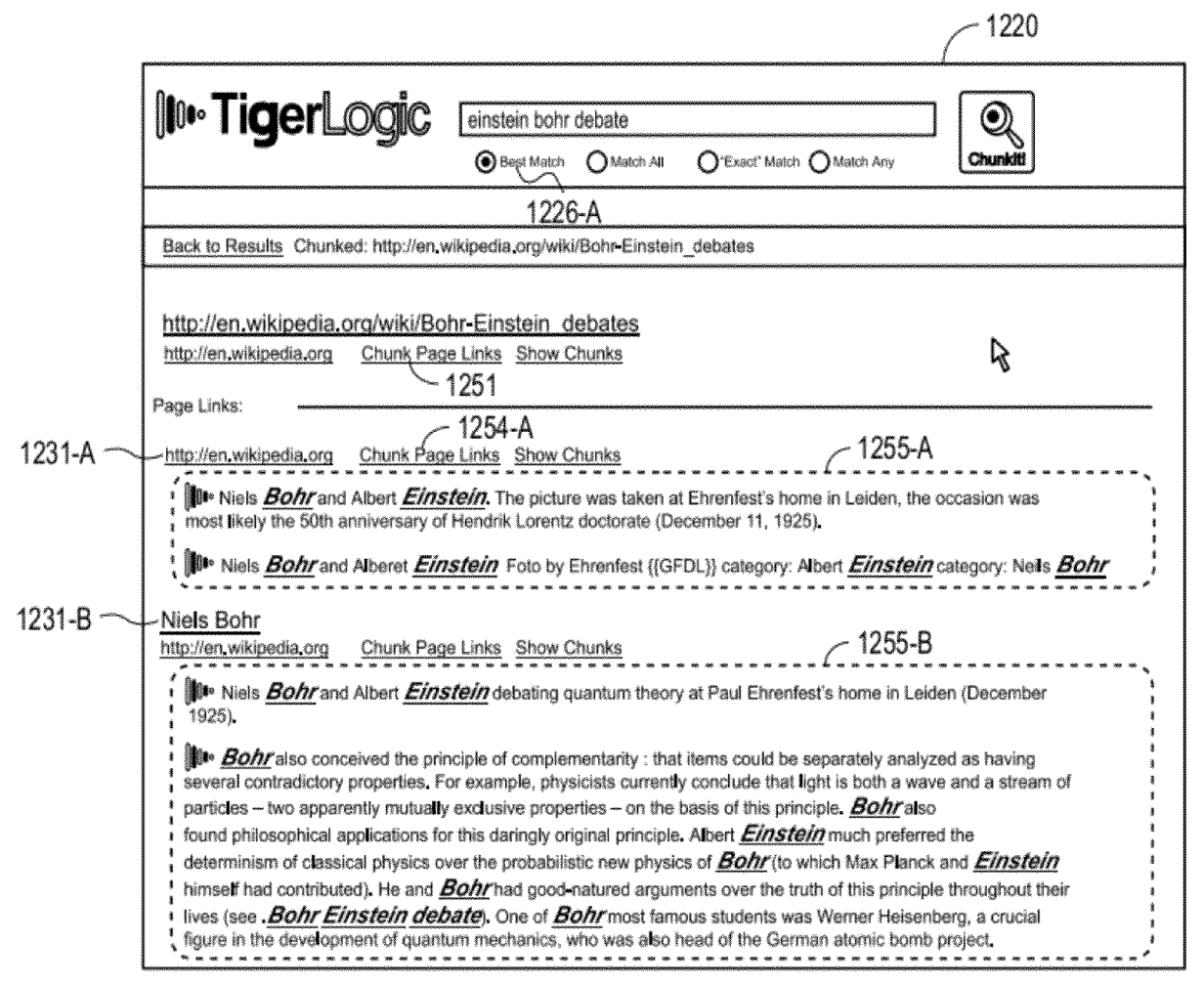
Figure 12F:
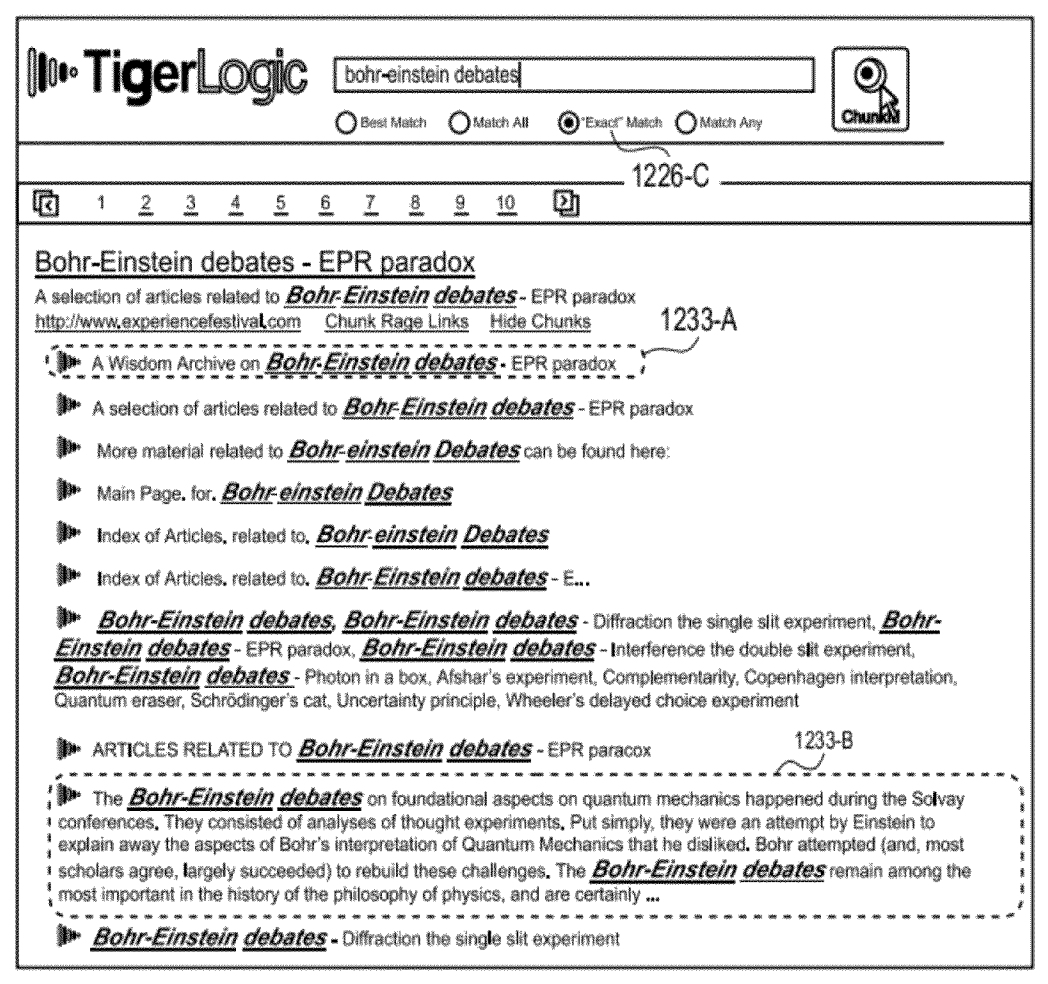
Figure 12G:
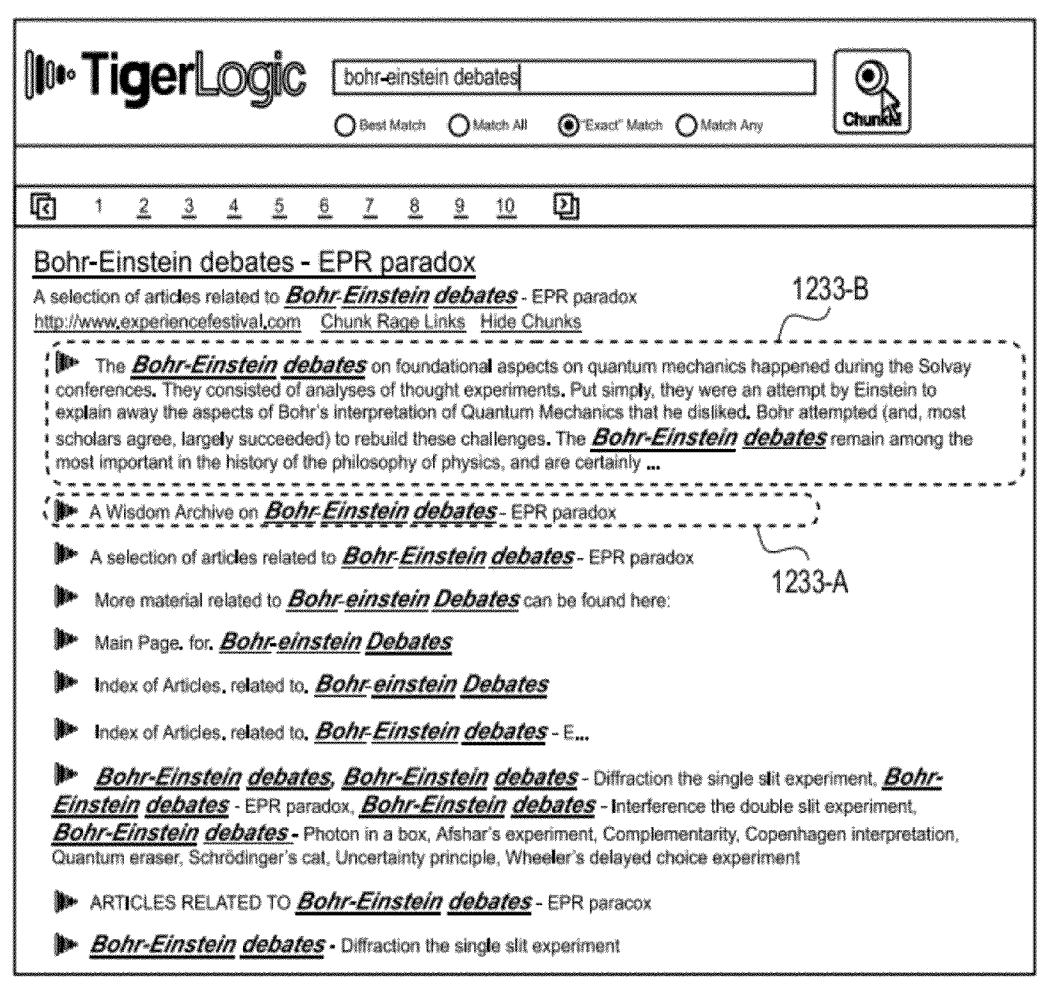
Figure 12H:
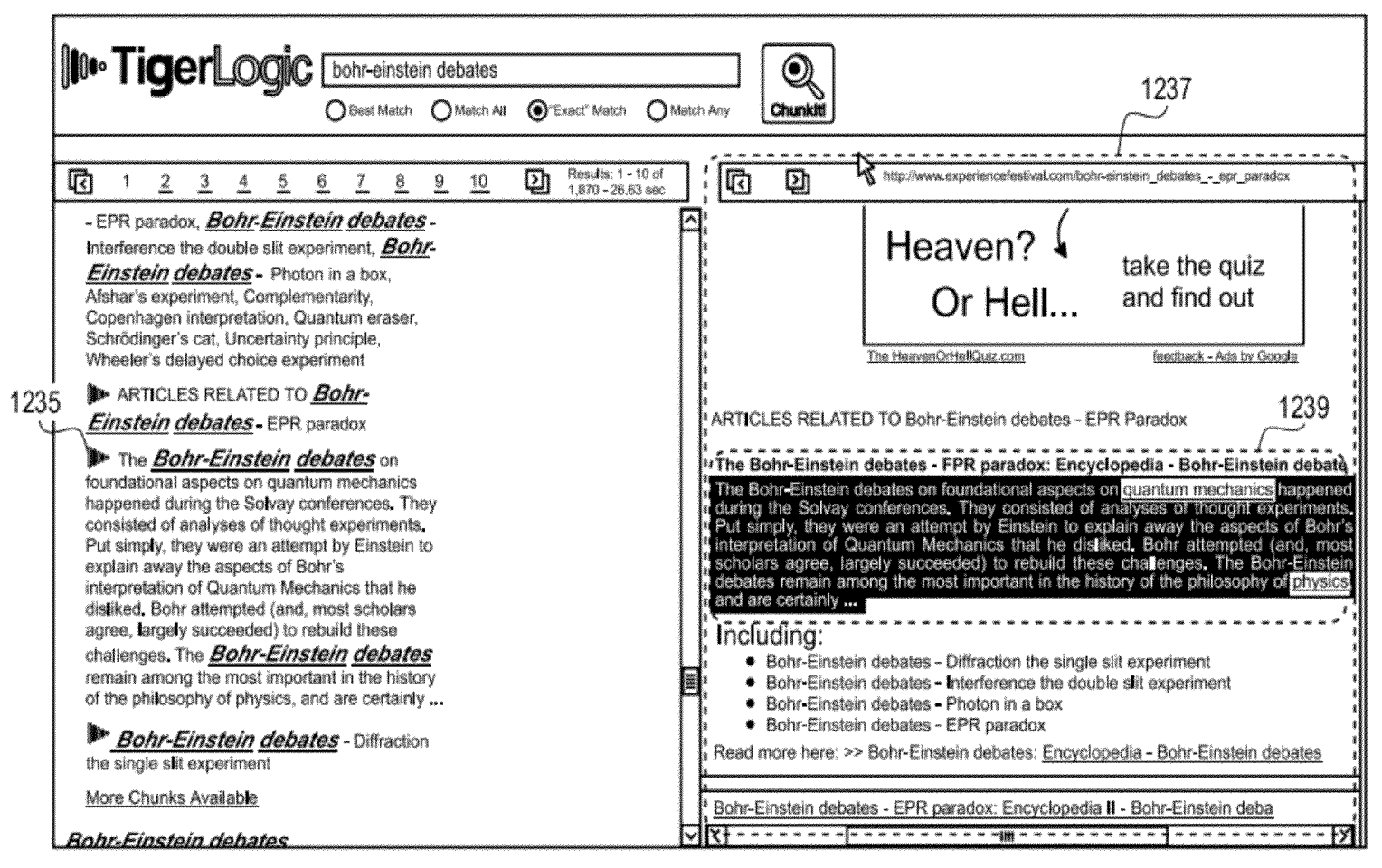
Figure 12I:
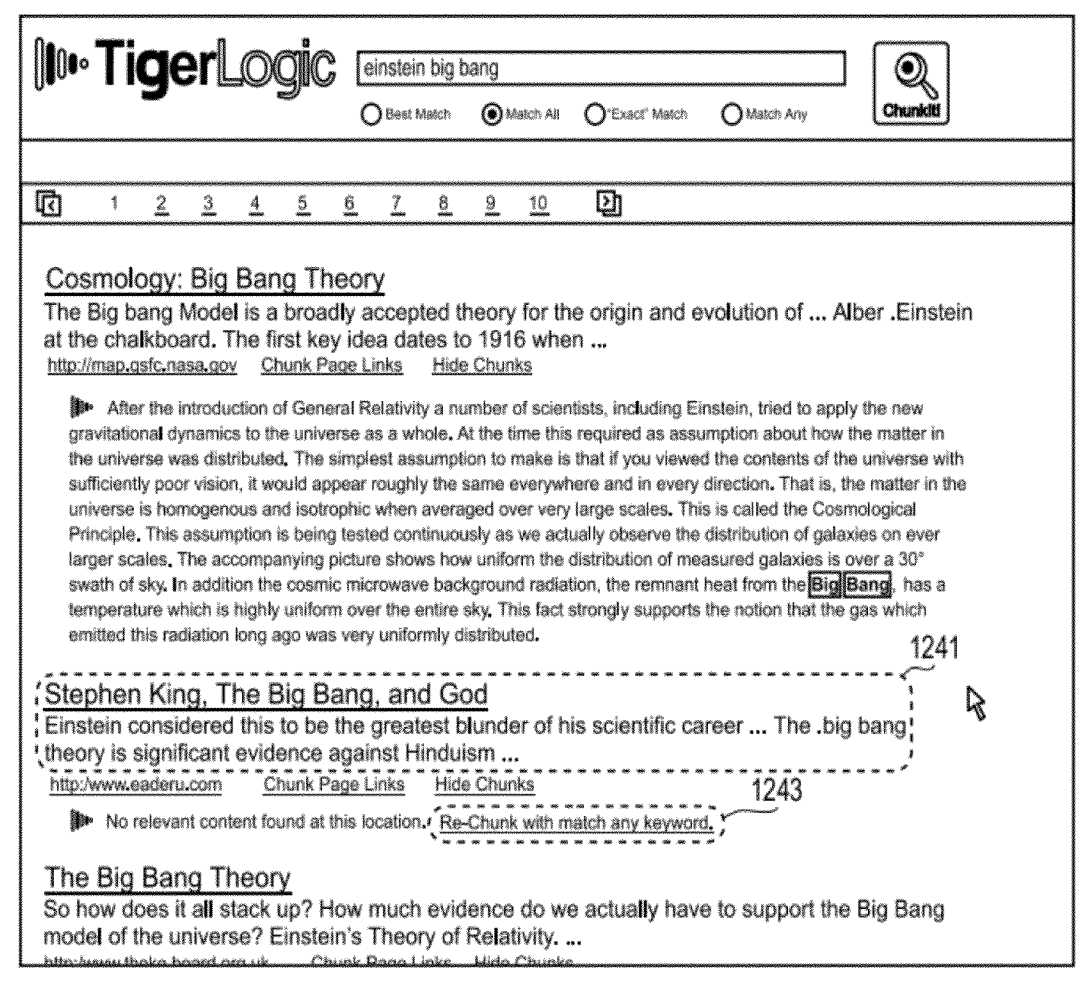
Figure 12J:

"Match Any" option 1226-D—This search option allows the application 1220 to identify and display any chunk that satisfies at least one of the user-specified search keywords. Thus, the search results responsive to any of the three options above are a subset of the search results responsive to the "Match Any" option, an example of which is depicted in FIGS. 12I and 12J.

The content provider returns a search result 1225 to the client computer and the search result 1225 includes an abbreviated document segment identified by the search engine as satisfying the search keywords. The client computer retrieves a document identified in the search result 1225 (an HTML web page in this example) from a web server and identifies one or more chunks 1229-A through 1229-C therein that satisfy the search keywords 1221, each chunk having an associated link 1231 to the chunk in the original web page. In some embodiments, each of the chunks 1229-A through 1229-C are different from the abbreviated document segment because it is a semantically and contextually consistent unit within the document without abbreviation.

In some embodiments, after retrieving a candidate document, the application 1220 generates a search query using the search keywords and applies the search query to the retrieved document to identify relevant chunks within the document.

In some embodiments, the terms that match the search keywords in the identified chunk are ordered differently from the user-specified search keywords. For example, the term "debate" appears between "Bohr" and "Einstein" in the chunk 1229-B of FIG. 12C.

In some embodiments, the terms that match the search keywords in the identified chunk are separated from one another by at least one term not matching any of the search keywords. For example, the three terms appearing in the last sentence of the chunk 1229-A are separated from one another by many other words. Unlike the conventional string search, an identified chunk may or may not include an exact match of the search keywords as a string. Rather, the search process according to some embodiments of the invention includes tokenization of the search keywords in a text string into atoms and subsequent search in the token space according to the atoms, which is variant-agnostic by, e.g., ignoring things like grammatical tense, punctuation, white space, casing, diacritics, etc. in the search keywords. For example, in the screenshot of FIG. 12C, "Einstein Bohr debate" and "einstein bohr debating" are deemed to be identical according to some embodiments of the invention.

In some embodiments, an identified chunk includes an identical instance of the search keywords appearing as a phrase. But, as noted above, although the instance is the same as the result of a string search, the search keywords are not identified collectively as a text string within the chunk.

In some embodiments, different terms matching different search keywords in the identified chunk are highlighted in different manners such as different colors, different foreground/background patterns, different font types/sizes, or a combination thereof. In FIG. 12C, the three terms appearing in each chunk are highlighted using large, italic, and underlined font. In some embodiments, the three terms are further distinguished from one another using a unique style for each term. For example, the three terms may have three completely different styles such as Courier New for "Einstein," Arial for "Bohr," and Monotype Corsiva for "debate" In some other embodiments, the three terms may have different background colors, such as gray for "Einstein," green for "Bohr," and yellow for "debate." In yet some other embodiments, the different manners may be combined to further distinguish different search keywords appearing in the same chunk.

In some embodiments, one or more sponsored links (1227, FIG. 12C) are identified to be associated with at least one of the search keywords and displayed adjacent the identified chunk.

As shown in FIG. 12C, there are a chunk page-link icon 1223 and a hide-chunk icon 1224 below the search result 1225. In response to a user selection of the chunk page-link icon 1223, the computer retrieves documents that are referenced by the document identified by the search result 1225 and therefore have page links in the document. For each retrieved document, the computer identifies chunks within the document that satisfy the search keywords 1221 by apply the same "chunking" process that has been applied to the document identified by the search result 1225.

FIG. 12D is a screenshot illustrative of the search results after a user selection of the chunk page-link icon 1251, including a link 1253-A, 1253-B to a respective document and a set of relevant chunks 1255-A, 1255-B identified within the corresponding document. The terms that match the search keywords are similarly highlighted in the relevant chunks. Note that a user can repeat this process by clicking the chunk page-link icons 1254-A, 1254-B associated with the respective documents. In some embodiments, the application 1220 applies its default search option, e.g., "Best Match" option 1226-A, for performing the task associated with the chunk page-link icon 1251. In some other embodiments, the user can override the default search option by expressly selecting another option.

FIG. 12E is a screenshot illustrative of the search results after the user clicks the hide-chunk icons (1224, FIG. 12C) associated with the respective search results. In this example, the relevant chunks associated with a search result disappear from the web browser window and the hide-chunk icons become show-chunk icons 1257A, 1257B. The relevant chunks are displayed again in the web browser window after a user selection of the show-chunk icons.

In some embodiments, multiple relevant chunks are identified within a candidate document and these chunks are displayed in an order consistent with their relative locations within the document. FIG. 12F is a screenshot that includes multiple relevant chunks, each one satisfying the two search keywords "Bohr-Einstein" and "debates." These chunks are listed in the web browser window in accordance with their relative locations in the web page such that the first chunk 1233-A that appears first in the web page is displayed above the other ones and the last chunk 1233-B that appears below the other chunks is displayed at the bottom of the web browser window.

In some embodiments, multiple relevant chunks are identified within a candidate document and these chunks are displayed in an order consistent with their relative relevancy to the search keywords. FIG. 12G is another screenshot that includes the same set of relevant chunks. Assume that the chunk 1233-B is more relevant than the chunk 1233-A. The more relevant chunk 1233-B is displayed above the other less relevant chunks including the chunk 1233-A. For illustrative purposes, the two screenshots in FIGS. 12F and 12G are generated using the "'Exact' Match" option 1226-C. Each chunk 1233-A, 1233-B includes at least one instance of the two search keywords as a string (ignoring the casing differ-ence). The aforementioned chunk-ordering schemes or the like are equally applicable to the other search options.

In some embodiments, in response to a user selection of the link to an identified chunk, at least a portion of the identified document is displayed in a document view window and the displayed portion includes, at least partially, the identified chunk. FIG. 12H is a screenshot of the web browser window after a user click of the chunk link 1235. A document view window 1237 is displayed next to the search results. The document view window 1237 displays a portion of the document that includes the relevant chunk and the displayed portion includes at least part of the relevant chunk 1239 within the document. In this example, the relevant chunk 1239 is highlighted in the document view window. Sometimes, the terms matching the search keywords in the relevant chunk 1239 are processed such that they are visually distinguishable over the rest of the identified chunk, e.g., using different colors or font types.

In some embodiments, for each relevant chunk in the identified document, the computer inserts a pair of unique chunk virtual delimiters into the identified document. This pair of chunk virtual delimiters uniquely defines the scope of the relevant chunk within the identified document, but is invisible to the user when the identified document is being rendered by an application. In response to a user request to view the relevant chunk 1239 in the document view window 1237, the computer can quickly locate the scope of the relevant chunk 1239 within the document by looking for the corresponding pair of chunk virtual delimiters and then highlight the chunk in the document view window appropriately.

In some embodiments, the HTML tag <span> can be introduced into a candidate document for forming chunk virtual delimiters. For example, the following chunk in an HTML document <p>This is a candidate chunk.</p> can be re-defined as:

<span id="chunk-1"><p>This is a candidate chunk.</p></span>

The HTML tag <span> has no effect on the appearance of the chunk in a web browser window because it has no associated style information. But the pair of chunk virtual delimiters (<span id="chunk-1">, </span>) uniquely identifies the chunk's location in the document, which a web browser application can rely upon to highlight the chunk's existence by, e.g., altering its background color. Note that the HTML tag <span> is not the only choice of a suitable invisible anchor element. In some other embodiments, it is possible to use one or more document-unique, chunk-unique identifiers or the like within the document as chunk virtual delimiters to achieve the same or similar effect.

In some embodiments, for at least one of the resource identifiers, after the corresponding document is retrieved from the respective document source, no relevant chunk that satisfies each of the search keywords is identified therein. This scenario happens if the terms matching the search keywords are distributed in different chunks within the document. In this case, the web browser window displays a link to search for chunks that satisfy any of the search keywords within the document. In response to a user selection of the link to search for chunks that satisfy any of the search keywords within the document, the retrieved document is re-processed, and as a result, one or more chunks that satisfy at least one of the search keywords is identified in the document. Accordingly, these chunks are displayed to the end user.

FIG. 12I is a screenshot that includes a search result 1241 that satisfies all the search keywords "Einstein" and "big bang." Because no relevant chunk is found in the web page, the web browser window provides a link 1243 to "re-chunk" the web page to search for any chunk matching any search keywords. FIG. 12J is another screenshot after the user click of the link 1243. Note that at least five chunks are identified in the document, three chunks 1245 including the keyword "Einstein" and two other chunks 1247 including the keywords "big bang." But no chunk satisfies all the search keywords. In some embodiments, the same set of chunks can be identified in the document through a user selection of the "Match Any" option 1226-D.

Another application of the invention is to identify and display within a document relevant chunks satisfying user-specified search keywords while the user is browsing the document. Conventionally, a user visiting a web page may be only interested in the content of a particular paragraph therein. To find the paragraph, the user-specified text string has to exactly match the one in the paragraph. Otherwise, the paragraph can not be easily located in the document if the user can provide a few search keywords but is mistaken about their exact sequence in the paragraph. Such issues with the conventional approach have been solved by the application described below.

Figure 13A:
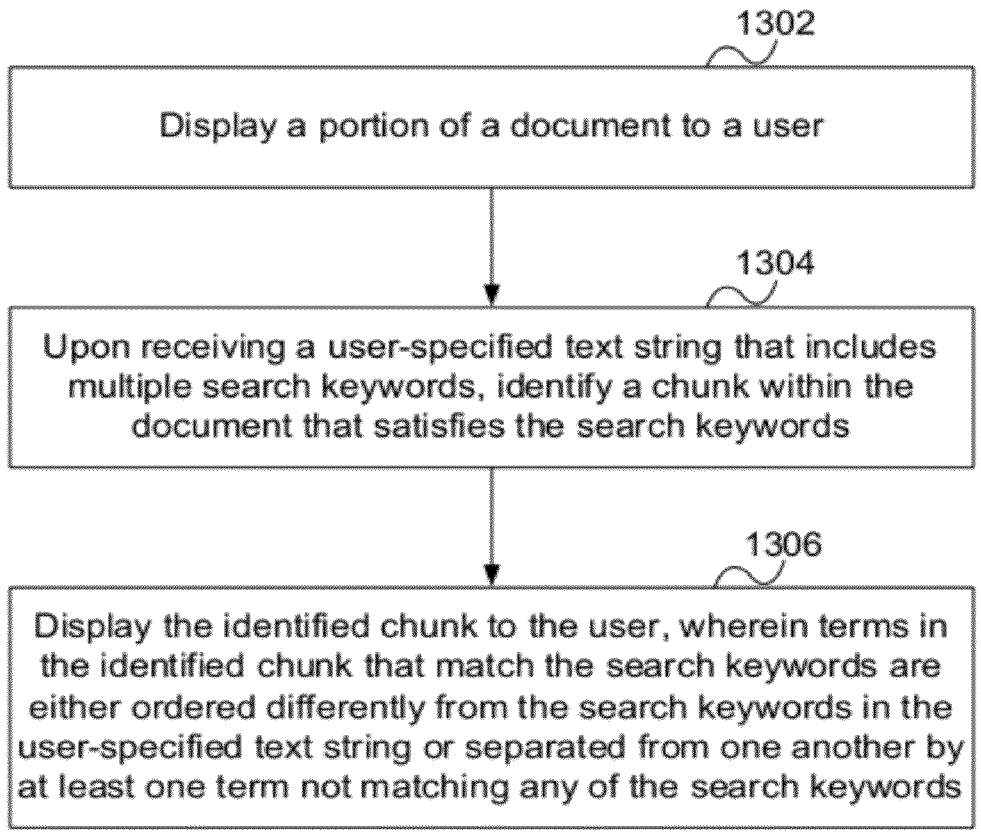
FIG. 13A is a flowchart illustrative of a first process of identifying within a document one or more chunks that satisfy user-specified search keywords in accordance with some embodiments.

FIG. 13A is a flowchart illustrative of a first process of identifying within a document one or more chunks that satisfy user-specified search keywords in accordance with some embodiments.

A computer displays a portion of a document to a user (1302). Upon receiving a user-specified text string that includes multiple search keywords, the computer identifies a chunk within the document that satisfies the search keywords (1304) and displays the identified chunk to the user (1306). In some embodiments, the identified chunk is not within the initially displayed portion of the document. To locate the chunk, the computer generates a search query using the search keywords and applies the search query to the document to identify the chunk. In some embodiments, the terms that match the search keywords are either ordered differently from the search keywords in the user-specified text string or separated from one another by at least one term not matching any of the search keywords.

Figure 13B:
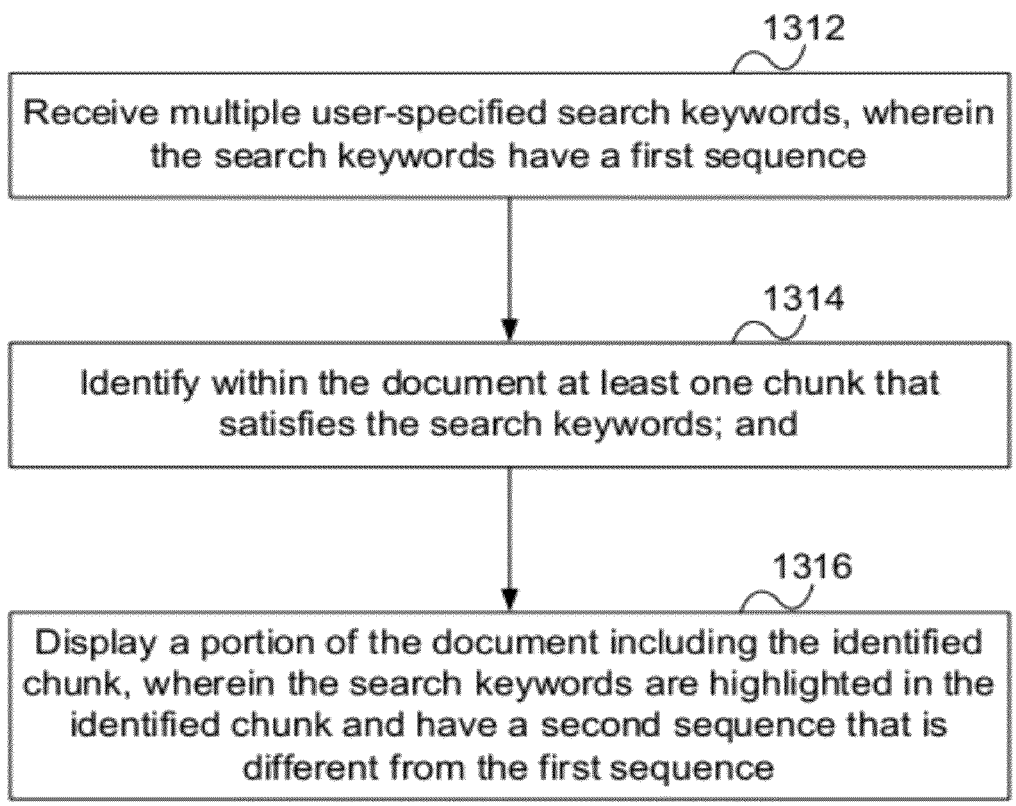
FIG. 13B is a flowchart illustrative of a second process of identifying within a document one or more chunks that satisfy user-specified search keywords in accordance with some embodiments.

FIG. 13B is a flowchart illustrative of a second process of identifying within a document one or more chunks that satisfy user-specified search keywords in accordance with some embodiments.

While a user is browsing a document through a computer, the computer receives multiple user-specified search keywords (1312). The search keywords have a first sequence. Within the document, the computer identifies at least one chunk that satisfies the search keywords (1314) and displays a portion of the document including the identified chunk (1316). In some embodiments, the search keywords are highlighted in the identified chunk and have a second sequence that is different from the first sequence.

FIGS. 13C through 13G are screenshots of a graphical user interface on a computer display illustrative of features associated with the second process as shown in FIGS. 13A and 13B in accordance with some embodiments.

Figure 13C:
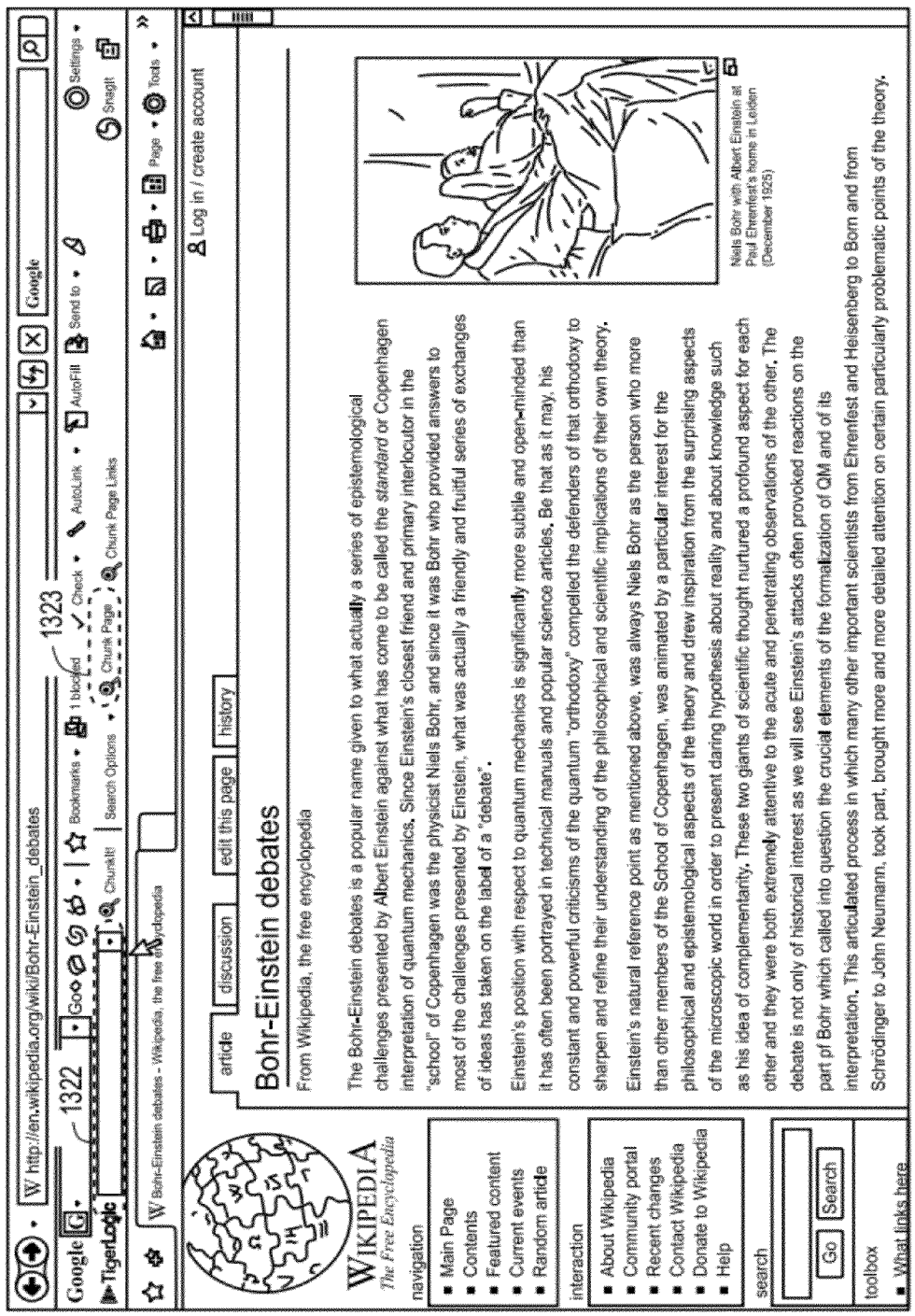

FIG. 13C is a screenshot of a web page covering Bohr-Einstein debates at www.wikipedia.org. Assuming that a visitor of this web page is interested in learning about the experimental apparatus developed by George Gamow, the visitor can enter a few search keywords relating to this topic in the input field 1322 and then click the "Chunk Page" icon 1323.

Figure 13D:
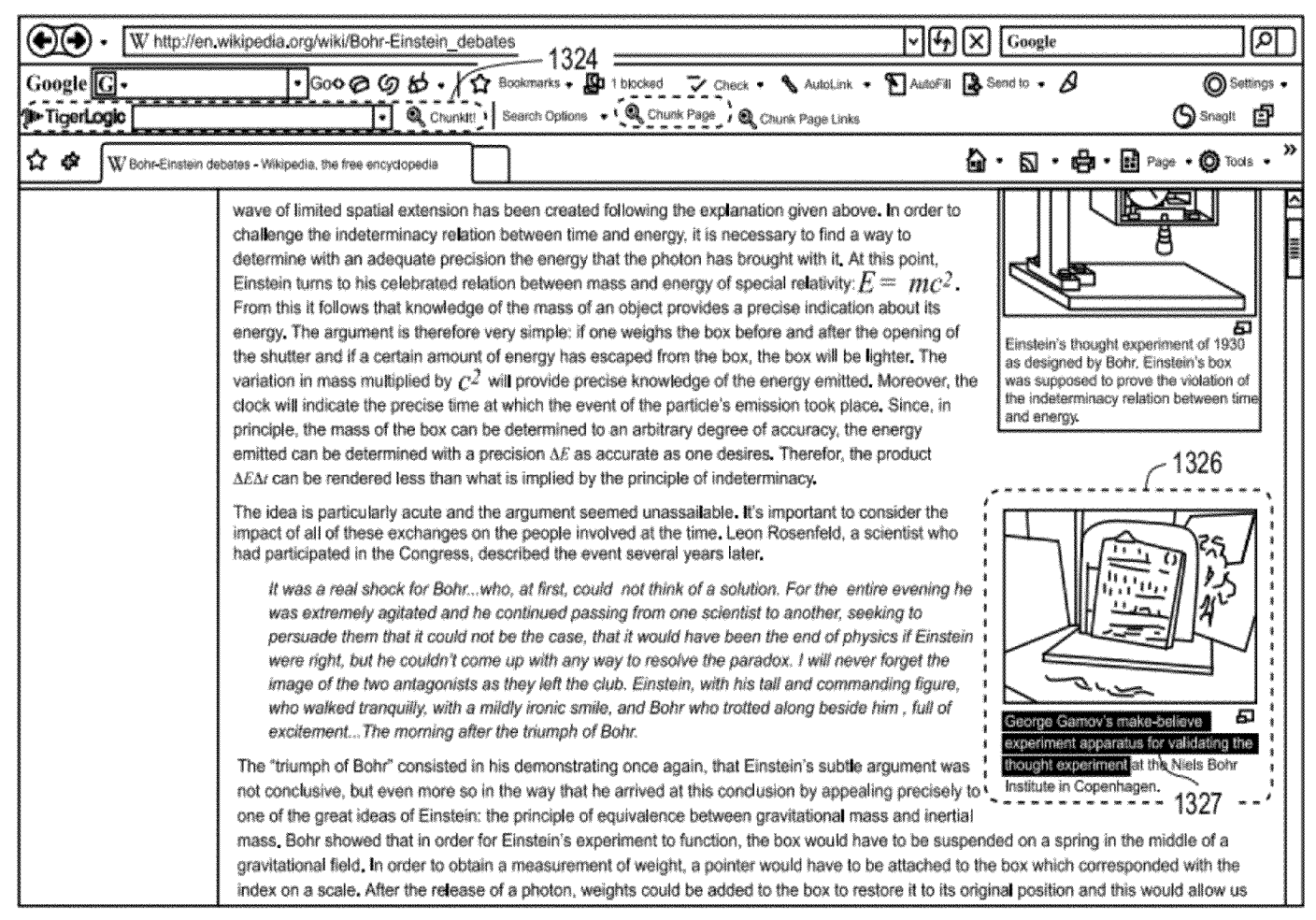

FIG. 13D is a screenshot of the web page including the identified chunk 1326 that satisfies the user-specified search keywords 1324, i.e., "gamow" and "experiment." In this example, the relevant chunk 1326 is actually not a paragraph, but a caption of a figure in the document. The sentence 1327 including the two keywords is read as follows: "George Gamow's make-believe experimental apparatus for validating the thought experiment . . . ." Although the two keywords are separated from each other by other terms, the figure caption is identified nonetheless because the two keywords happen to be within the same chunk.

Figure 13E:
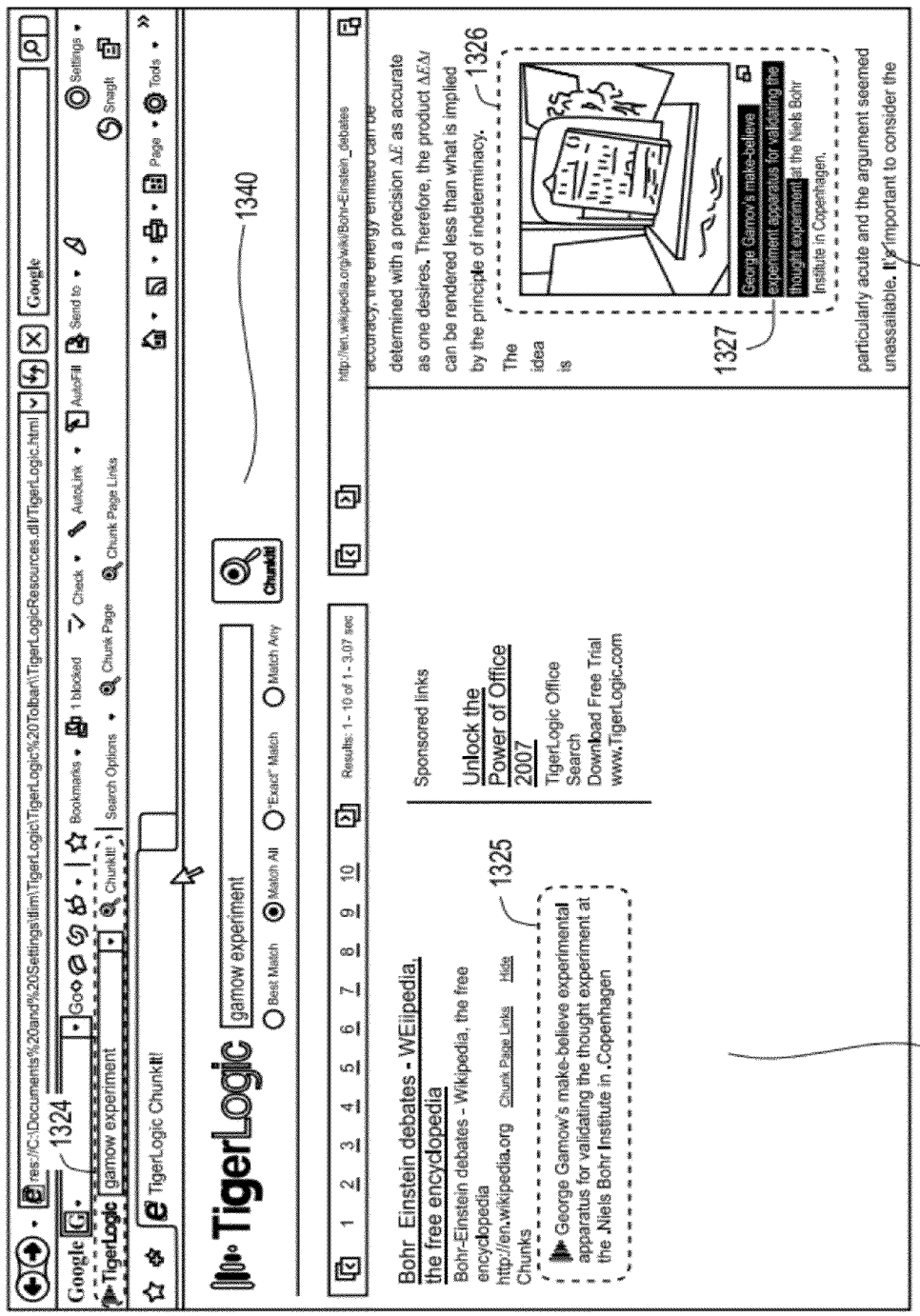

FIG. 13E is a screenshot illustrative of another embodiment of the invention in response to a user selection of the "Chunk Page" icon at the top of the web browser window. In this example, the left side of the web browser window displays the relevant chunks 1325 identified within the web page. If the web page has multiple relevant chunks, the user can easily get an overview of these chunks from the left side of the web browser. The right side of the web browser is a document view window that displays the portion of the document including the relevant chunk 1326. Thus, this document view window provides more contexts for each relevant chunk to the user.

In some embodiments, like the examples described above in connection with FIGS. 12C through 12J, different terms in the identified chunk that match different search keywords are highlighted in different manners such as different colors, different foreground/background styles, different font types, or a combination thereof.

In some embodiments, multiple relevant chunks are identified within a document, each one appearing at a respective location in the document. In this case, the web browser window displays, at least partially, the chunk that appears above the other chunks in the document and its associated context.

Figure 13F:
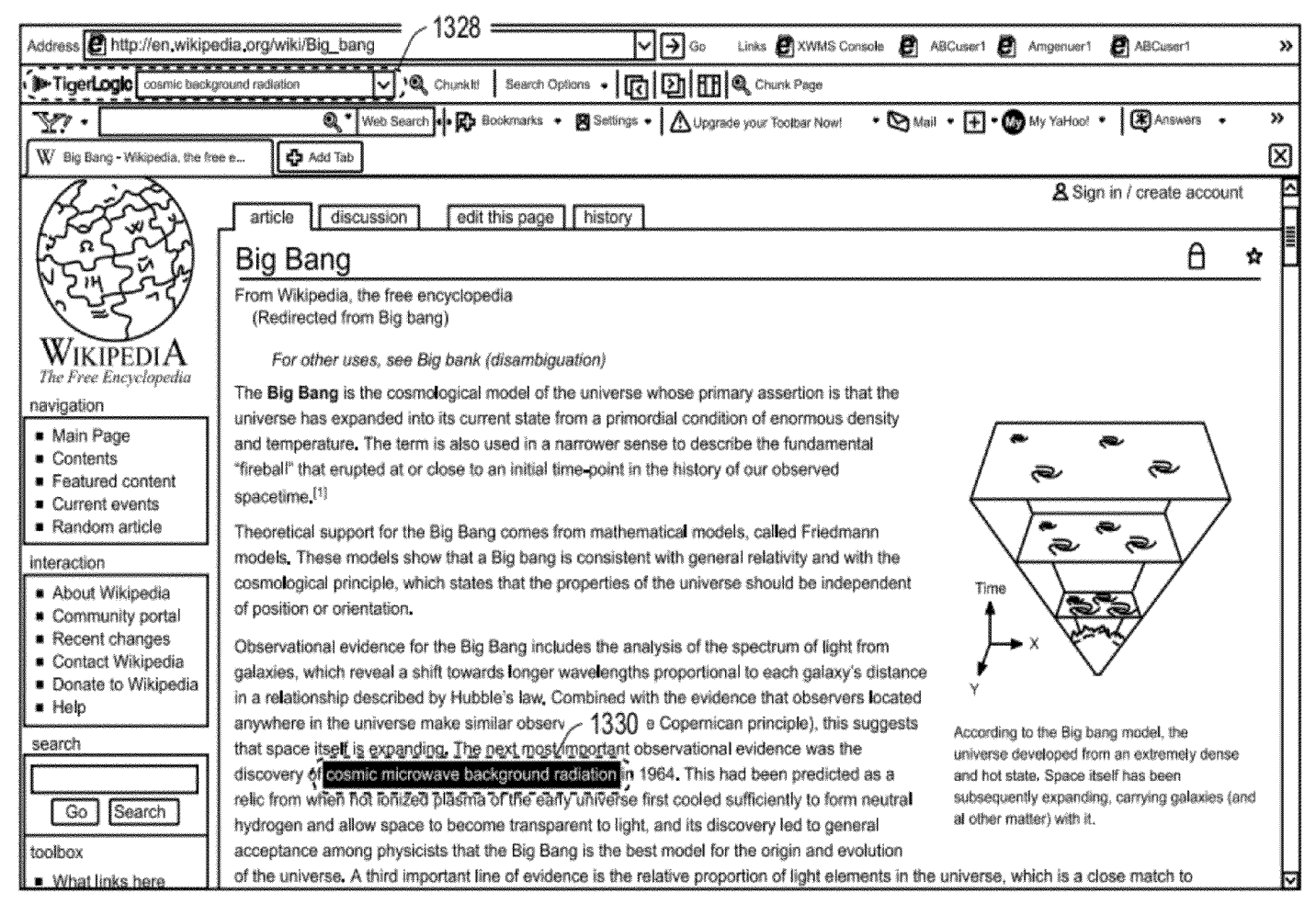

FIG. 13F is a screenshot of another web page at www.wikipedia.org. In response to the user-specified search keywords 1328 "cosmic," "background," and "radiation," the first relevant chunk 1330 in the web page that matches the three search keywords is identified and displayed in a visually distinguishing manner. A scroll down of the web page displays additional relevant chunks identified in the web page.

Sometimes, the first relevant chunk shown in FIG. 13F is not necessarily the most relevant one. In some embodiments, after identifying multiple chunks within the document, the web browser assigns to each chunk a ranking metric indicative of its relevancy to the search keywords and displays in a prominent location, at least partially, the chunk that has the highest ranking metric.

FIG. 13G is a screenshot of the same web page shown in FIG. 13F. But the relevant chunks are now displayed in an order consistent with their relevancy to the search keywords. In this case, the relevant chunk 1332 is a section heading, which is presumably more relevant than the chunk 1330 shown in FIG. 13F.

In some embodiments, if there is no chunk within the document that satisfies each of the search keywords, the web browser, or more specifically, the "Chunk Page" toolbar application, may relax its search criteria to look for any chunks in the document that satisfy any of the search keywords and display them to the user. In other words, this feature is similar to the one described above in connection with FIGS. 12I and 12J.

Another application of the invention is to identify relevant chunks within unstructured or semi-structured documents. It has been a particular challenge to identify chunks within an HTML web page because the HTML syntax allows its user to produce the same or similar web page layout using very different metadata.

Figure 14:
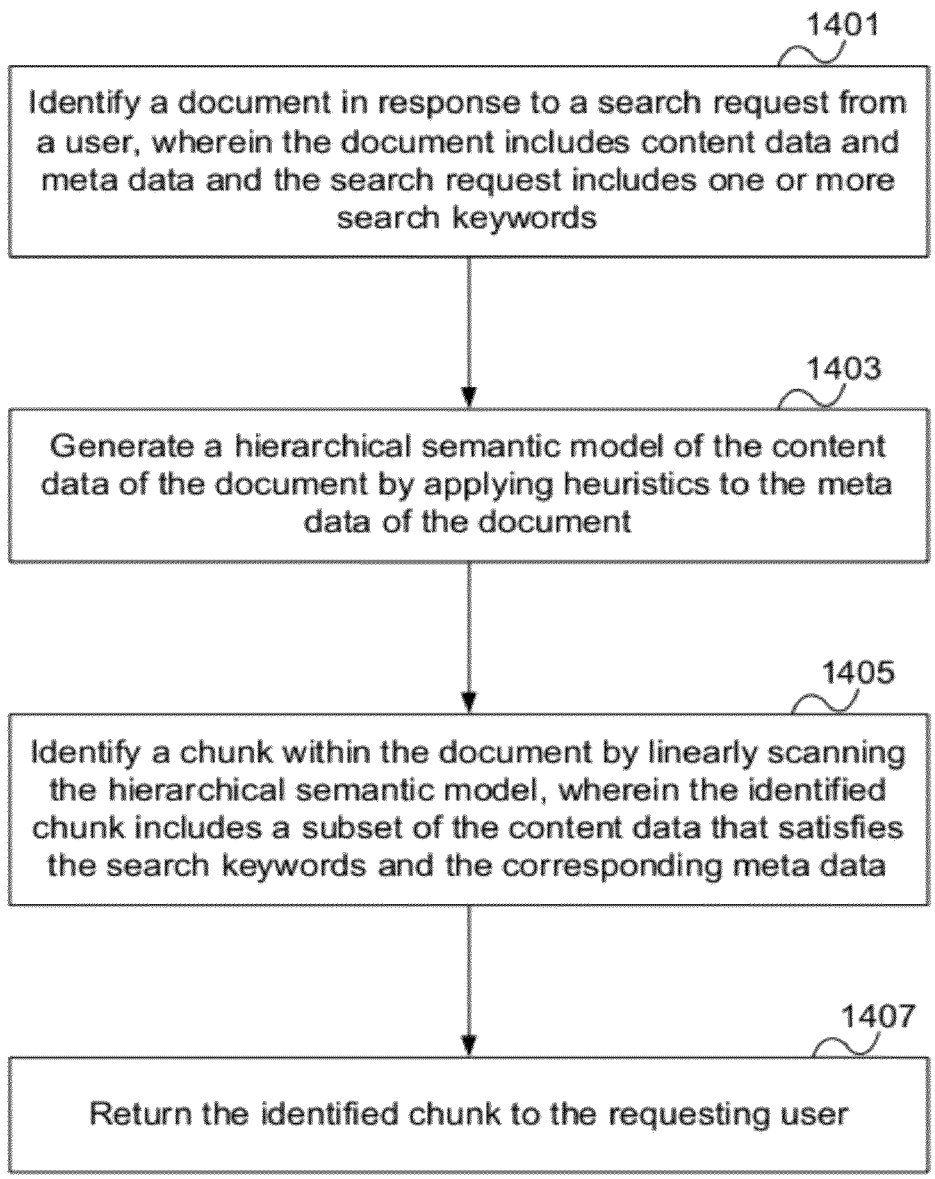
FIG. 14 is a flowchart illustrative of a process of modeling a document and identifying within the document one or more chunks that satisfy user-specified search keywords in accordance with some embodiments.

FIG. 14 is a flowchart illustrative of a process of modeling a document and identifying within the document one or more chunks that satisfy user-specified search keywords in accordance with some embodiments.

A computer identifies a document in response to a search request from a user (1401). The document includes content data and metadata, and the search request includes one or more search keywords. In some embodiments, the document is a semi-structured document, e.g., an HTML web page. The content data refers to the document's content such as a paragraph, a table, or a list of bullet items, etc. The metadata specifies how the content data should be rendered through an application, e.g., a web browser window.

The computer generates a hierarchical semantic model of the content data of the document by applying heuristics to the metadata of the document (1403). In some embodiments, the generation of the hierarchical semantic model includes identifying one or more candidate chunks in the document, each candidate chunk corresponding to a respective subset of the document. As noted above, the HTML web page shown in FIG. 9B has a hierarchical semantic model, which includes a set of HTML tags at different levels.

In some embodiments, a first subset of the document associated with a first candidate chunk encompasses a second subset of the document associated with a second candidate chunk. For example, as shown in FIG. 9B, both the candidate chunks 956 and 958 are within the candidate chunk 954, which is, in turn, within the candidate chunk 952. There is no overlapping between the candidate chunk 956 and the candidate chunk 958.

In some embodiments, the heuristics stipulates that a subset of the document is identified as a candidate chunk if the subset of the document has at least one instance of predefined metadata. For example, the candidate chunks 956 and 958 are identified because each begins with the <p> paragraph tag.

In some embodiments, the heuristics stipulates that a subset of the document is deemed to be a candidate chunk if the subset of the document has at least two instances of predefined metadata. For example, two or more instances of the <li> tag appearing in a web page one after another are collectively identified as a candidate chunk.

The computer identifies a chunk within the document by sequentially scanning the hierarchical semantic model (1405). The identified chunk includes a subset of the content data that satisfies the search keywords and the corresponding metadata. The computer returns the identified chunk to the requesting user (1407).

In some embodiments, assume that there are two search keywords, a first search keyword and a second search keyword. While sequentially scanning the semantic model, the computer first identifies some content data that is in the first candidate chunk and precedes the second candidate chunk as satisfying the first search keyword (e.g., "It's raining outside . . . ") and then identifies content data in the second candidate chunk that satisfies the second search keyword (e.g., "For XML-based data management"). Because both search keywords are matched, the first candidate chunk is chosen to be the identified chunk and returned to the requesting client.

In some embodiments, the computer does not return the first chunk immediately after finding a match for the search keyword. Rather, the computer continues scanning the model until identifying content data in the second candidate chunk that also satisfies the first search keyword (e.g., "Raining Data is your choice"). In this case, the second candidate chunk is returned as the relevant chunk that is more specific than the first one.

In some embodiments, while sequentially scanning the hierarchical semantic model, the computer identifies content data that satisfies the first search keyword in one candidate chunk and content data that satisfies the second search keyword in another candidate chunk. For example, assume that the search keywords are "CAD" and "job listings." As shown in FIG. 9B, the candidate chunk 956 includes the search keyword "CAD" and the candidate chunk 958 includes the search keyword "job listings." In this case, the computer chooses the candidate chunk 954, which is the parent of the chunks 956 and 958 in the hierarchical semantic mode, as the identified chunk. Note that there is no other content data or metadata within the candidate chunk 954 besides the two candidate chunks 956 and 958.

Another application of the invention is to transform the user-specified search keywords into a finely-tuned query. Sometimes, the user-specified search keywords may include a special character (e.g., "%") or sequence of characters (e.g., "Jan. 22, 2008"). This special character or sequence of characters, if interpreted appropriately, can help to find the relevant chunks more efficiently.

Figure 15:
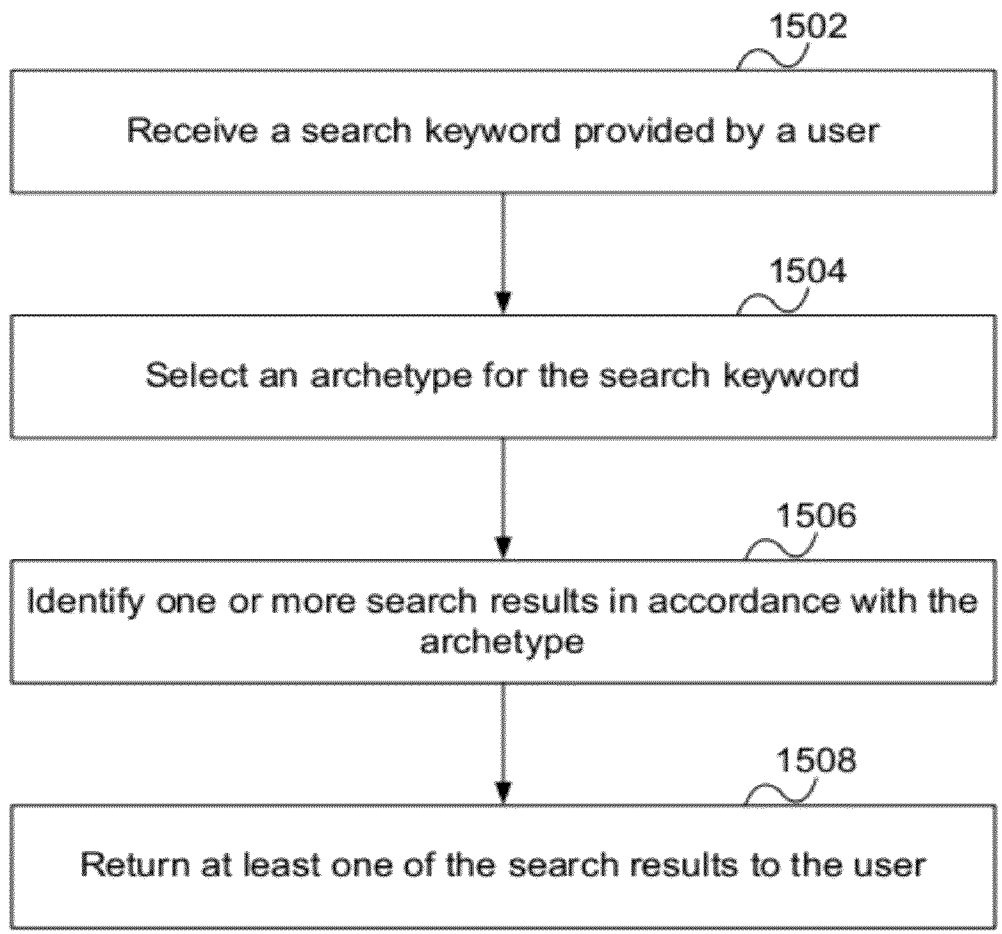
FIG. 15 is a flowchart illustrative of a process of customizing a search query based on user-specified search keywords in accordance with some embodiments.

FIG. 15 is a flowchart illustrative of a process of customizing a search query based on user-specified search keywords in accordance with some embodiments.

After receiving a search keyword provided by a user (1502), the computer selects an archetype for the search keyword (1504). The computer identifies one or more search results in accordance with the archetype (1506) and returns at least one of the search results to the user (1508).

In some embodiments, the archetype has an enumerable set of instances and the search keyword is associated with one of the instances. For example, if the user-specified search keyword is "Tuesday," a possible archetype would be "week," of which "Tuesday" represents one of the seven members in the archetype.

In some embodiments, after selecting the archetype, the computer identifies at least one query operator for the selected archetype, constructs a search query using the query operator, and then executes the search query against one or more data sources. For example, for the "week" archetype, the computer may generate a search query that looks for chunks including not only the keyword "Tuesday," but any of the seven days within a week such as "Sunday," "Monday," etc.

In some embodiments, the query operator has a scope and the search query is constructed to limit search results within the scope. For example, assume that the search phrase is "discount of 10%." It is likely that the user is not only interested in chunks having the phrase "discount of 10%," but also chunks having similar phrases, e.g., "discount of 15%." Alternatively, the user may be mistaken when entering the phrase and the candidate document actually has no chunk including the phrase "discount of 10%," but does have chunks including the phrase "discount of 20%." In this case, the computer may generate a search query for discount within the scope of 0% to 100%. As a result, more relevant chunks are identified.

In some embodiments, the query operator has a pattern and the search query is constructed to limit search results including the pattern. For example, the user-specified phrase "Jan. 22, 2008" indicates a date pattern. If so, the computer may generate a search query accordingly to search for any chunk having the date pattern.

In some embodiments, after selecting the archetype and before identifying the search results, the computer solicits user instructions in connection with the archetype, constructs the search query in accordance with the user instructions, and executes the search query against the data sources. For example, if the user-specified search keyword includes the special character "%," the computer may display a user interface through which the user may specify the scope or range associated with that special character, which is then built into the search query.

In some embodiments, based on the user instructions, the computer may generate feedback to the user instructions and then receive more user instructions in connection with the archetype and the feedback. Note that this process may repeat for multiple loops until the user submits a search query execution request, which suggests that the user is satisfied with the customized search query.

Another application of the invention is not only to display relevant chunks identified within a document but also to re-use them for different purposes. For example, when a user composes a Word document using Microsoft Office, the user may like to view a slide in a PowerPoint document and, if needed, generate a copy of the slide in the Word document. Currently, there is no convenient way to do so other than opening the PowerPoint document in a separate window, manually searching for the slide in the window, and manually copying the slide and pasting it into the Word document.

Figure 16A:
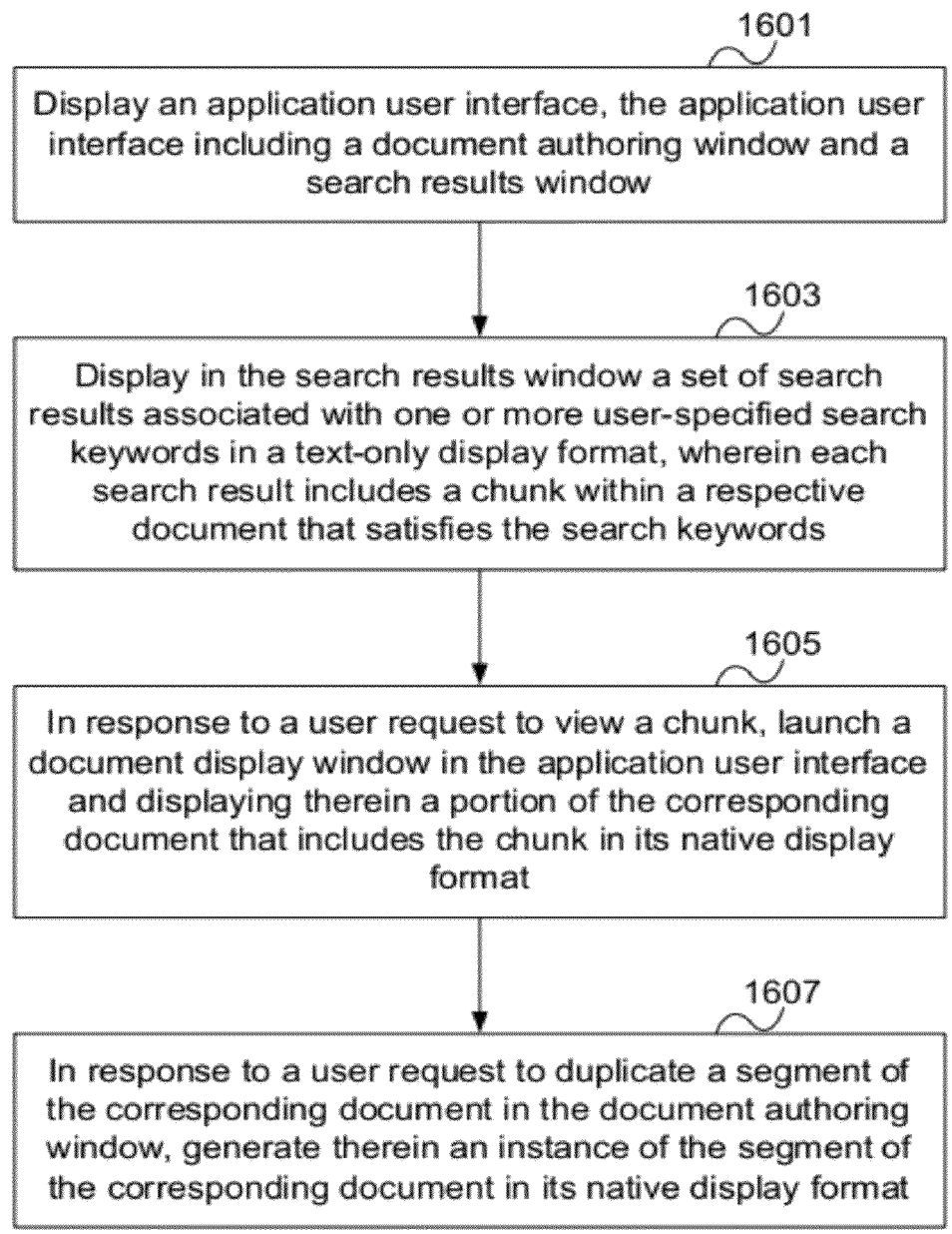
FIG. 16A is a flowchart illustrative of a process of displaying and re-using search results based on user instructions in accordance with some embodiments.
Figure 16B:
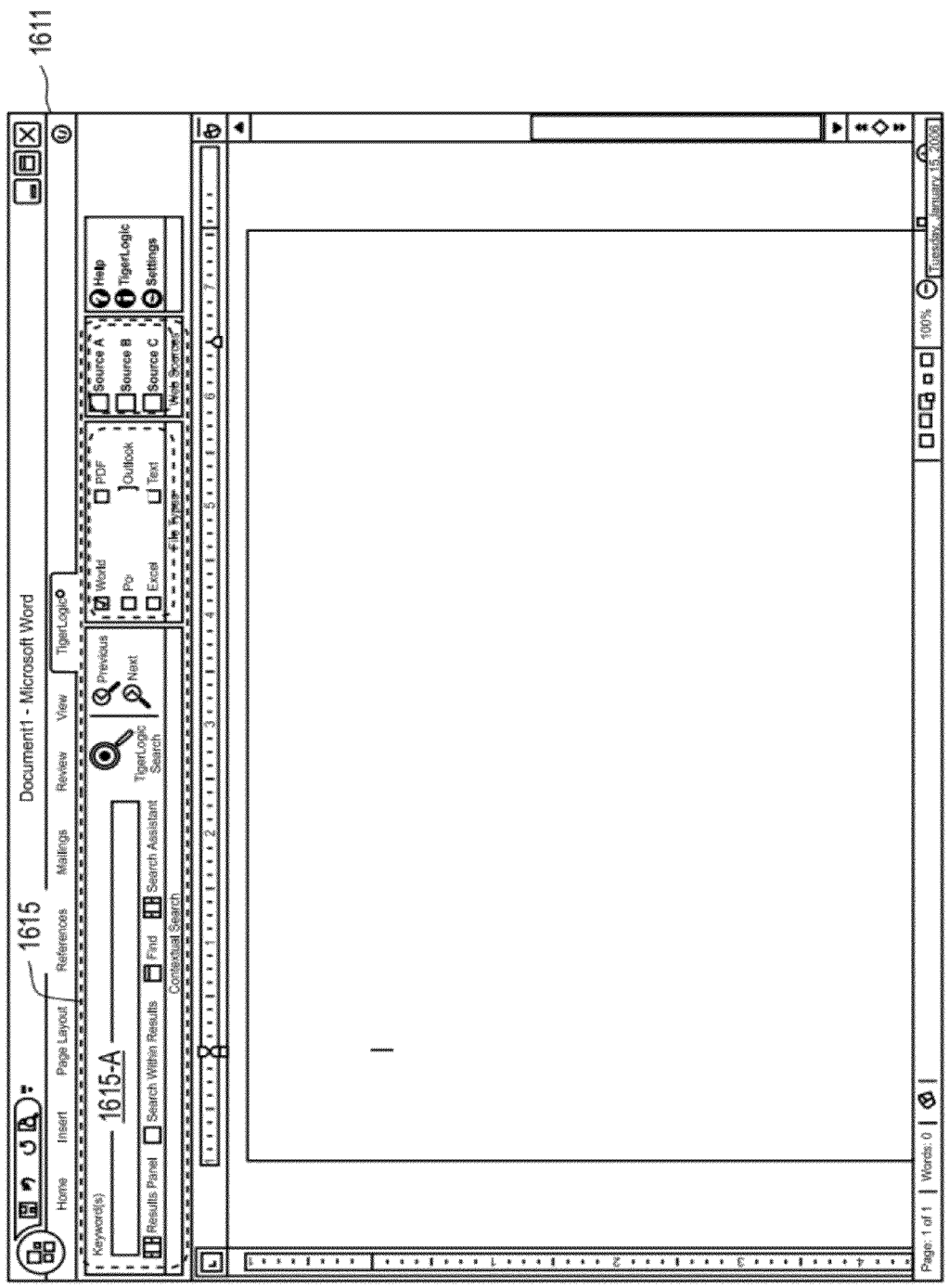
FIGS. 16B through 16J are screenshots of a graphical user interface on a computer display illustrative of features associated with the process as shown in FIG. 16A in accordance with some embodiments.

FIG. 16A is a flowchart illustrative of a process of displaying and re-using search results based on user instructions in accordance with some embodiments.

A computer displays an application user interface (1601). The application user interface includes a document authoring window and a search results window. In response to a search request including one or more user-specified search keywords, the computer displays in the search results window a set of search results in a text-only display format (1603). In some embodiments, each search result includes a chunk within a respective document that satisfies the search keywords. In response to a user request to view a chunk, the computer launches a document display window in the application user interface and displays therein a portion of the corresponding document that includes the chunk in its native display format (1605). In response to a user request to duplicate a segment of the corresponding document in the document authoring window, the computer generates therein an instance of the segment of the corresponding document in its native display format (1607).

FIGS. 16B through 16J are screenshots of a graphical user interface on a computer display illustrative of features associated with the process as shown in FIG. 16A in accordance with some embodiments.

The application user interface includes a document authoring window and a search results window. A set of search results associated with one or more user-specified search keywords is displayed in the search results window in a text-only display format and each search result includes one or more chunks identified within a respective document as satisfying the user-specified search keywords. In response to a user request to duplicate a chunk within a document in the document authoring window, an instance of the chunk is displayed in the document authoring window in the document's native display format. In some embodiments, two chunks identified within two different documents have different native display formats.

In some embodiments, each chunk in the search results window has an associated chunk link. In response to a user selection of a respective chunk link, a document display window is displayed in the application user interface and a portion of the corresponding document that includes the corresponding chunk is displayed in the document display window in the document's native display format.

In some embodiments, each chunk includes terms that match the user-specified search keywords an associated chunk link. Different terms matching different search keywords are highlighted in the search results window in a visually distinguishable manner.

In some embodiments, the chunks identified within a document are displayed in the search results window in an order consistent with their relative relevancy to the user-specified search keywords. In some other embodiments, the chunks identified within a document are displayed in the search results window in an order consistent with their relative locations within the corresponding document.

FIG. 16B is a screenshot of the Microsoft Office 2007 Word application user interface 1611. The main region of the user interface is occupied by a document authoring window 1613. Above the document authoring window 1613 is an add-in 1615 to Microsoft Office 2007. The add-in 1615 includes a keyword(s) input field 1615-A into which the user enters search keywords, a document type selection field 1615-B through which the user selects the types of candidate documents to be searched, and a web source field 1615-C including multiple document sources through which the user can search and re-use documents identified by the respective document sources.

In some embodiments, the set of search results includes a first chunk within a first document having a first content type and a second chunk within a second document having a second content type, wherein the first content type is different from the second content type. Different search keywords in the search results window are highlighted in different manners.

Figure 16C:
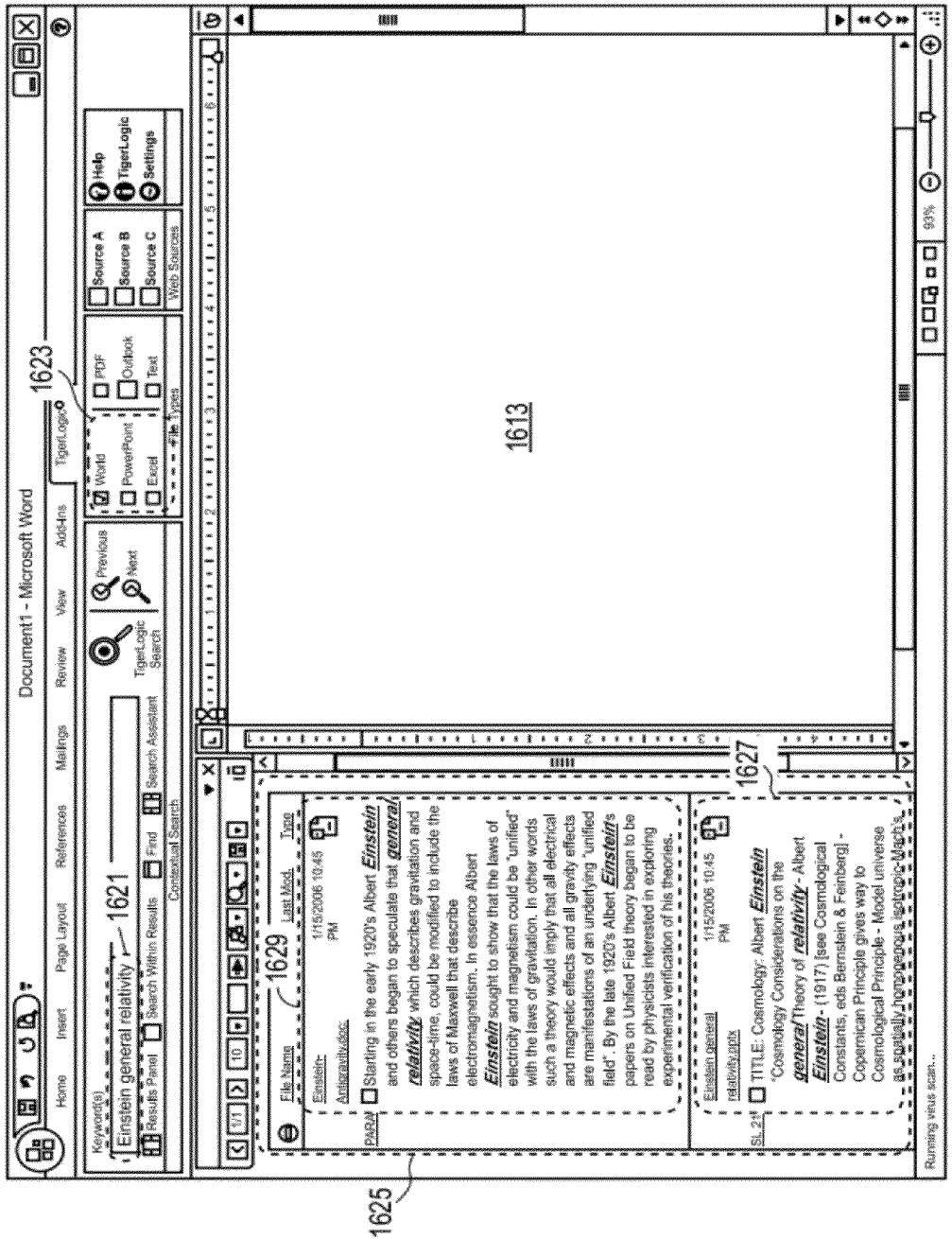

FIG. 16C is a screenshot including a search results window 1625 and the search phrases 1621 "Einstein general relativity." In this example, the user limits the document search to two types of documents 1623, Word and PowerPoint. As described above in connection with FIG. 1, this search limit is passed down from the front end 15 (the add-in 1615 in this example) to the query engine 30 and then to the cache engine 40. Thus, the cache engine 40 only looks for Word and PowerPoint documents in the index database 50. In this example, one chunk 1627 from a PowerPoint document and another chunk 1629 from a Word document are shown in the search results window 1625.

Note that each chunk in the search results window has an associated content type, which may be different from the document type of the corresponding document that includes the chunk. For example, a Word document may include a PowerPoint slide or an Excel spreadsheet. If the PowerPoint slide is identified to be the relevant chunk, the content type of the relevant chunk is PowerPoint, not Word, although the PowerPoint slide is within a Word document. Similarly, if a row in the Excel spreadsheet is identified to be the relevant chunk and the content type of the relevant chunk is therefore Excel, not Word. These chunks may or may not be displayed depending upon the embodiment.

In some embodiments, in response to a user request to duplicate the first chunk from the search results window into the document authoring window, the computer generates therein an instance of a first segment of the first document, including the first chunk, in its native display format. In response to a user request to duplicate the second chunk from the search results window into the document authoring window, the computer generates therein an instance of a second segment of the second document, including the second chunk, in its native display format. Sometimes, the first document and the second document have different native display formats.

Figure 16D:
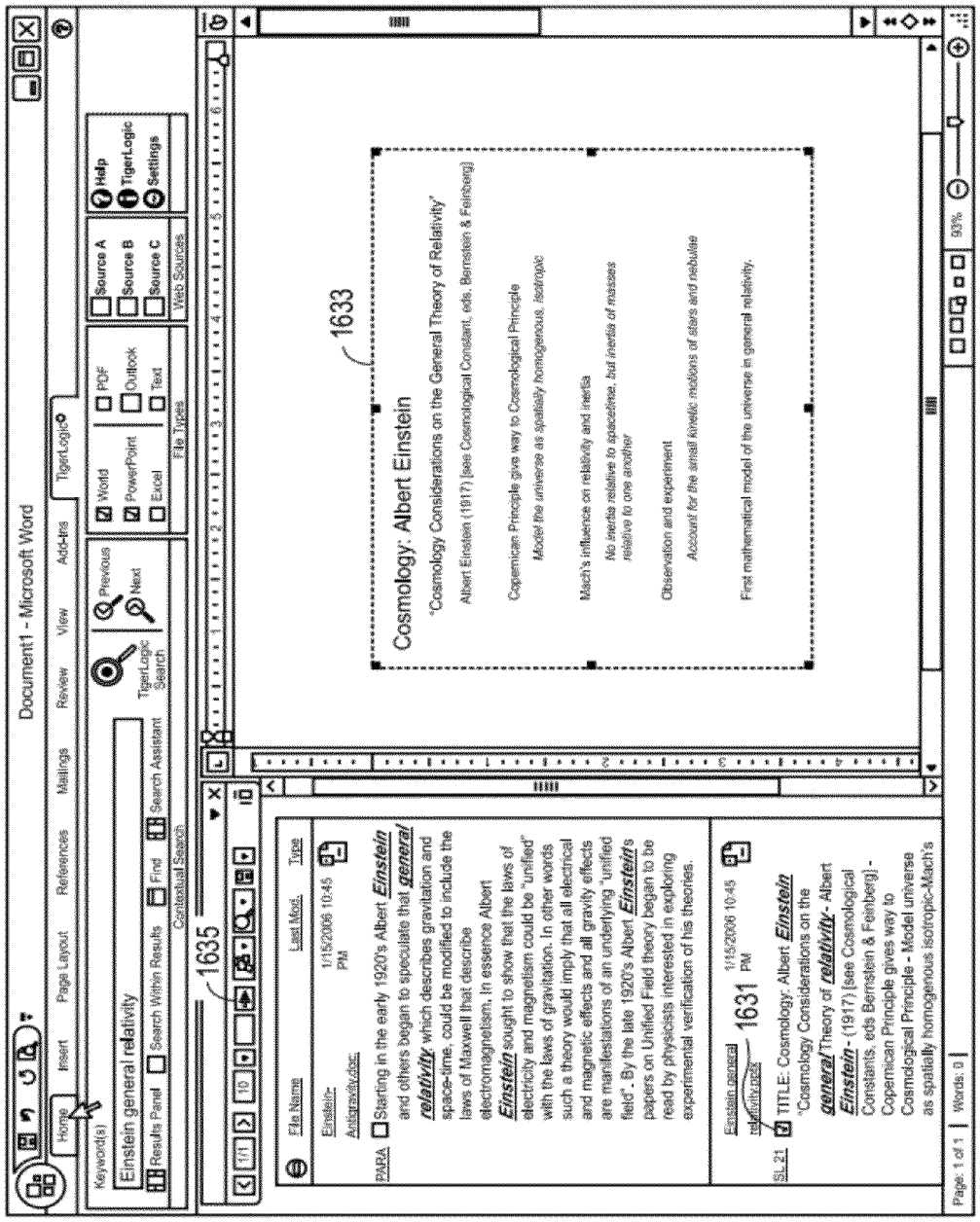

FIG. 16D is a screenshot including a PowerPoint slide 1633 in the document authoring window and the slide 1633 corresponds to the relevant chunk 1627 in FIG. 16C. To duplicate this slide 1633 in the document authoring window, the user first selects the checkbox 1631 next to the text-only version of the slide in the search results window and then clicks the duplicate icon 1635 at the top of the search results window.

Figure 16E:
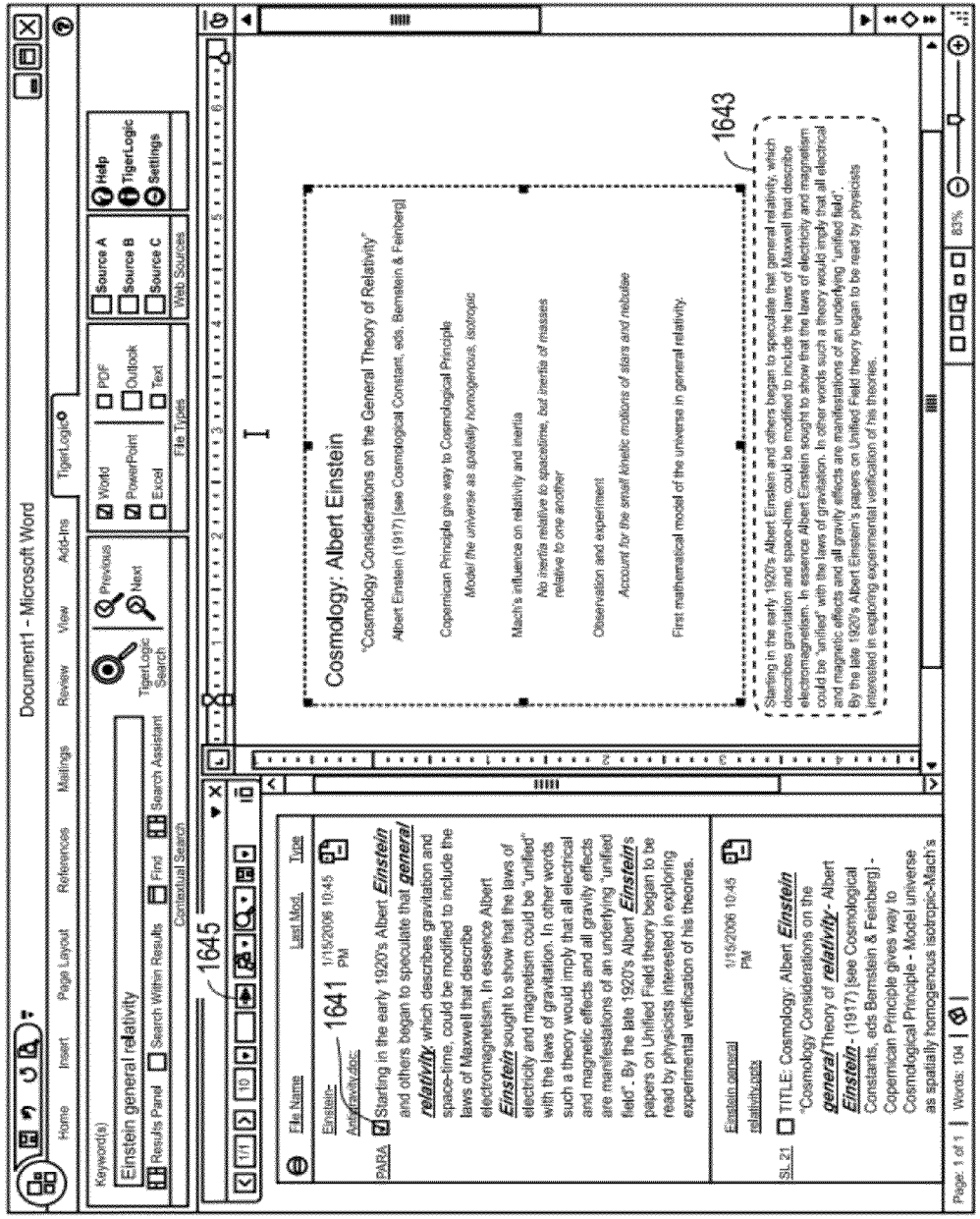

FIG. 16E is another screenshot including not only the PowerPoint slide 1633 but also a paragraph 1643, which corresponds to the relevant chunk 1629 in FIG. 16C. To duplicate this paragraph 1643 in the document authoring window, the user first selects the checkbox 1641 next to the text-only version of the paragraph in the search results window and then clicks the duplicate icon 1645 at the top of the search results window.

Note that a PowerPoint document and a Word document are deemed to have different native display formats. But relevant chunks in the search results window are displayed in a text-only format regardless of whether these chunks are identified within a PowerPoint document, a Word document, a plain-text document or even a PDF document. But when a chunk is duplicated into the document authoring window, the computer tries to display the chunk in its native format. Note that a chunk found in a plain-text or PDF document will be customized to a native display format associated with the document authoring window. In other words, if the document authoring window is a Word document authoring window, the chunk is displayed in the Word document's native display format.

In some embodiments, the user may like to display a relevant chunk in its native display format before re-producing the chunk in the document authoring window. For example, in response to a first user selection of the first chunk, the computer launches a first document display window in the application user interface and displays therein a first document that includes the first chunk in its native display format. In response to a second user selection of the second chunk, the computer launches a second document display window in the application user interface and displays therein a second document that includes the second chunk in its native display format.

In some embodiments, the application user interface allows multiple document display windows associated with different document types to exist simultaneously. In some other embodiments, at one time, the application user interface only allows one document display window associated with a document type, e.g., by closing the first document display window before launching the second document display window in response to the second user selection of the second chunk.

In some embodiments, in response to a user request to view the chunk, the computer generates an empty region in the application user interface by shrinking the document authoring window and then occupies the empty region with the document display window in the application user interface.

In some embodiments, the portion of the corresponding document in the document display window includes more information about the search keywords than the chunk in the search results window, such as the location of the search keywords in the corresponding document or the textual contents adjacent to the search keywords in the corresponding document.

Figure 16F:
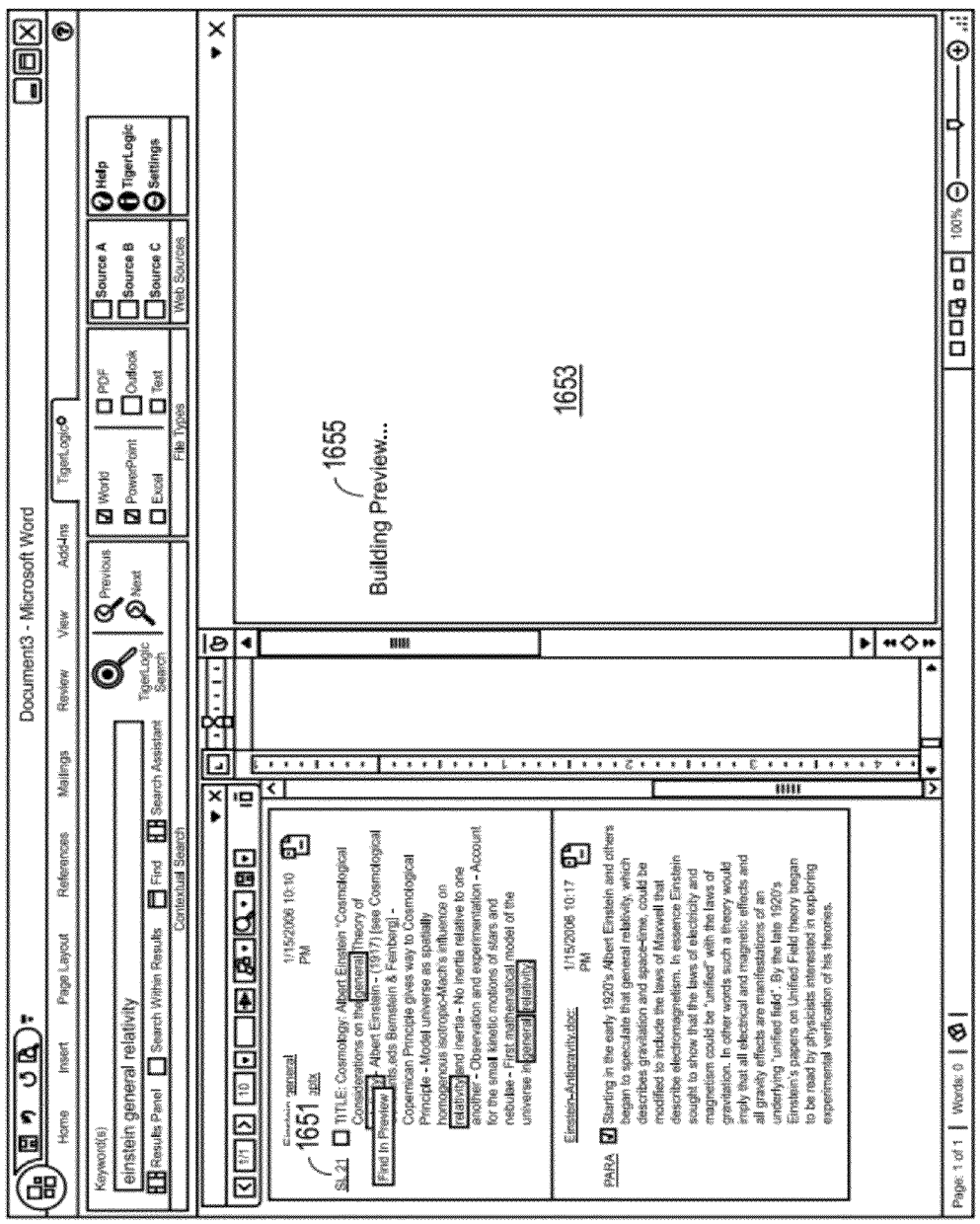
Figure 16G:
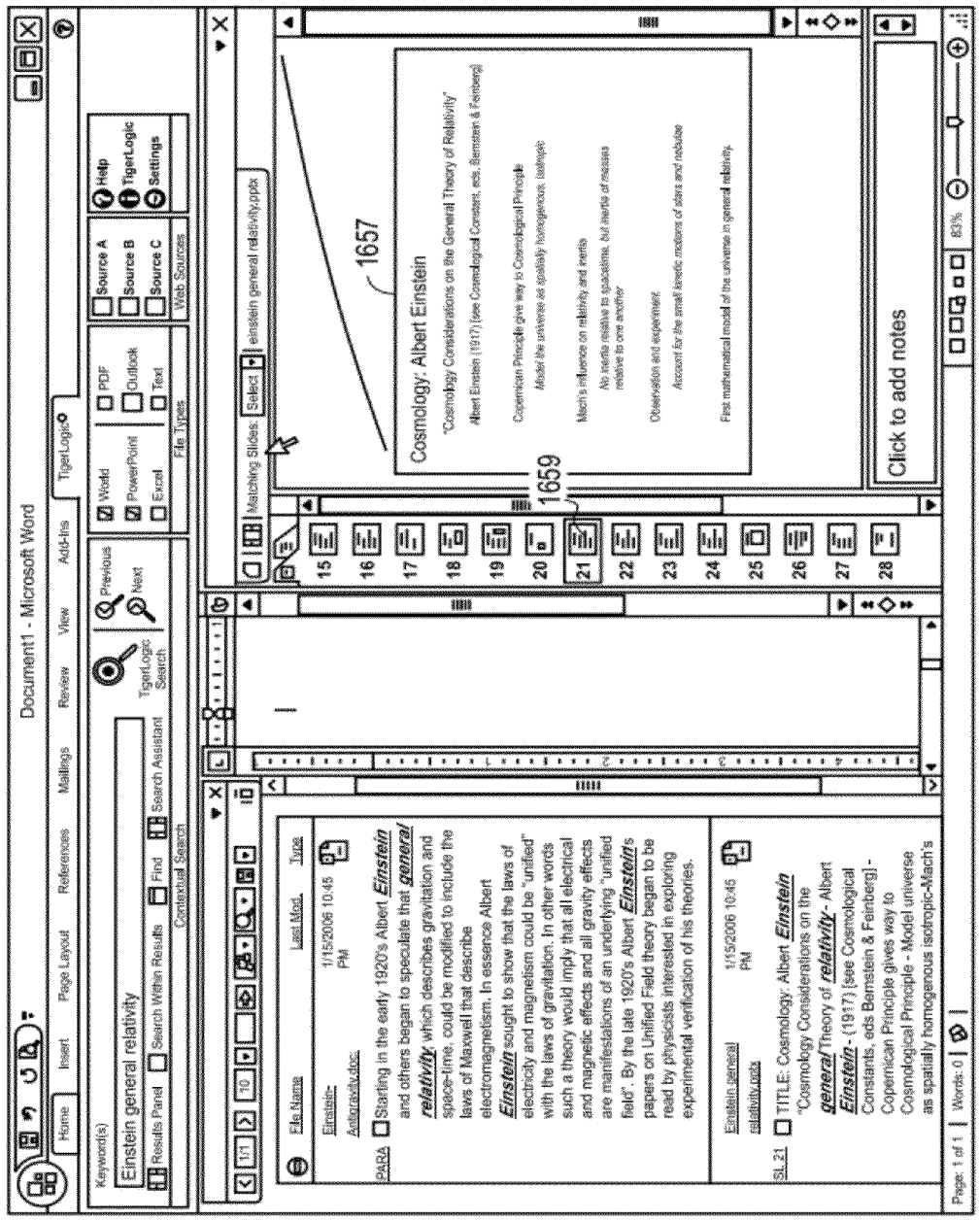

FIG. 16F is a screenshot including a document display window 1653 in the process of being rendered within the application user interface in response to a user selection of the link 1651. Note that the link 1651 is next to a chunk identified within a PowerPoint document. As shown in FIG. 16G, the corresponding slide 1657 is displayed in the document display window and its location 1659 is highlighted in the document display window.

Figure 16H:
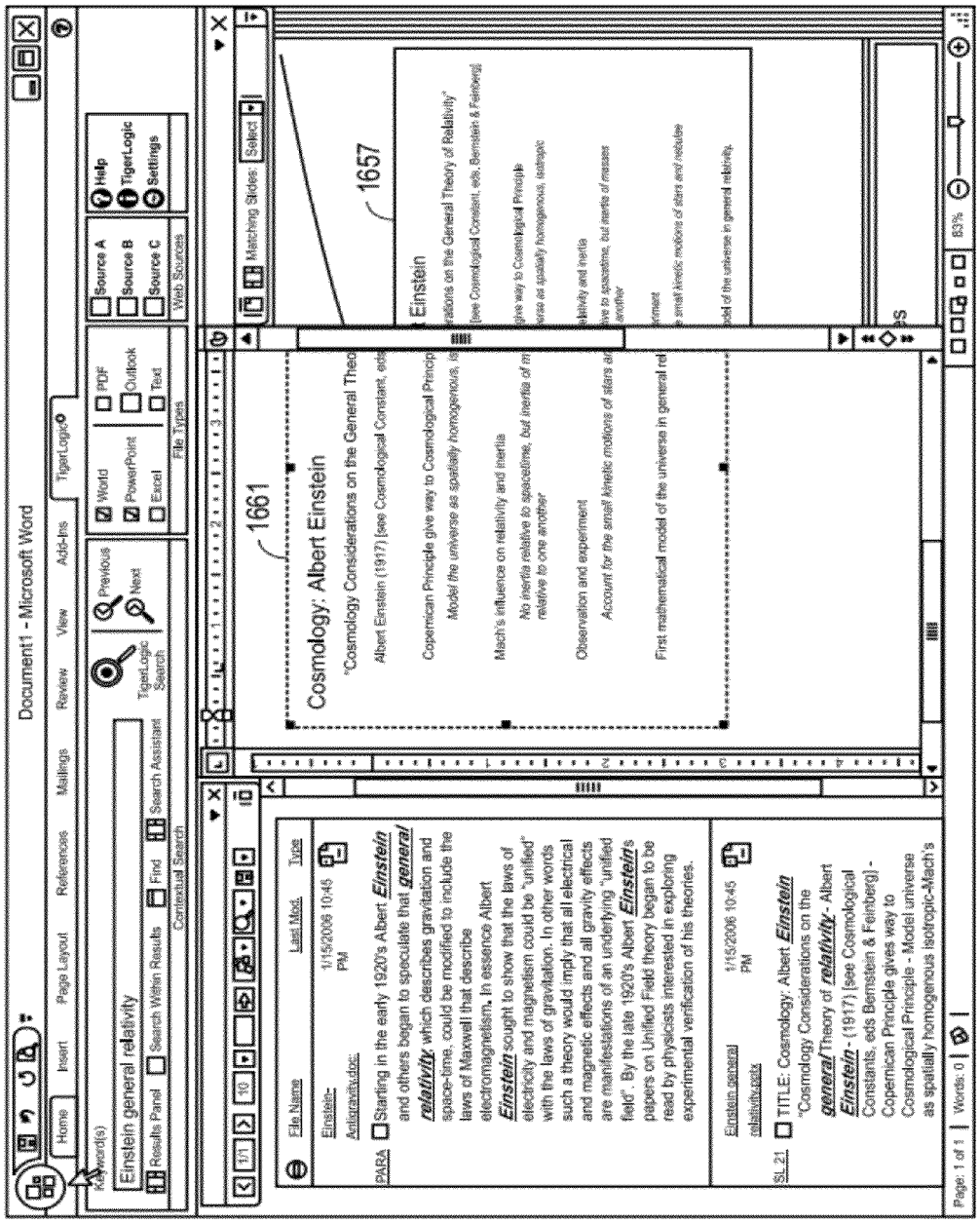
Figure 16I:
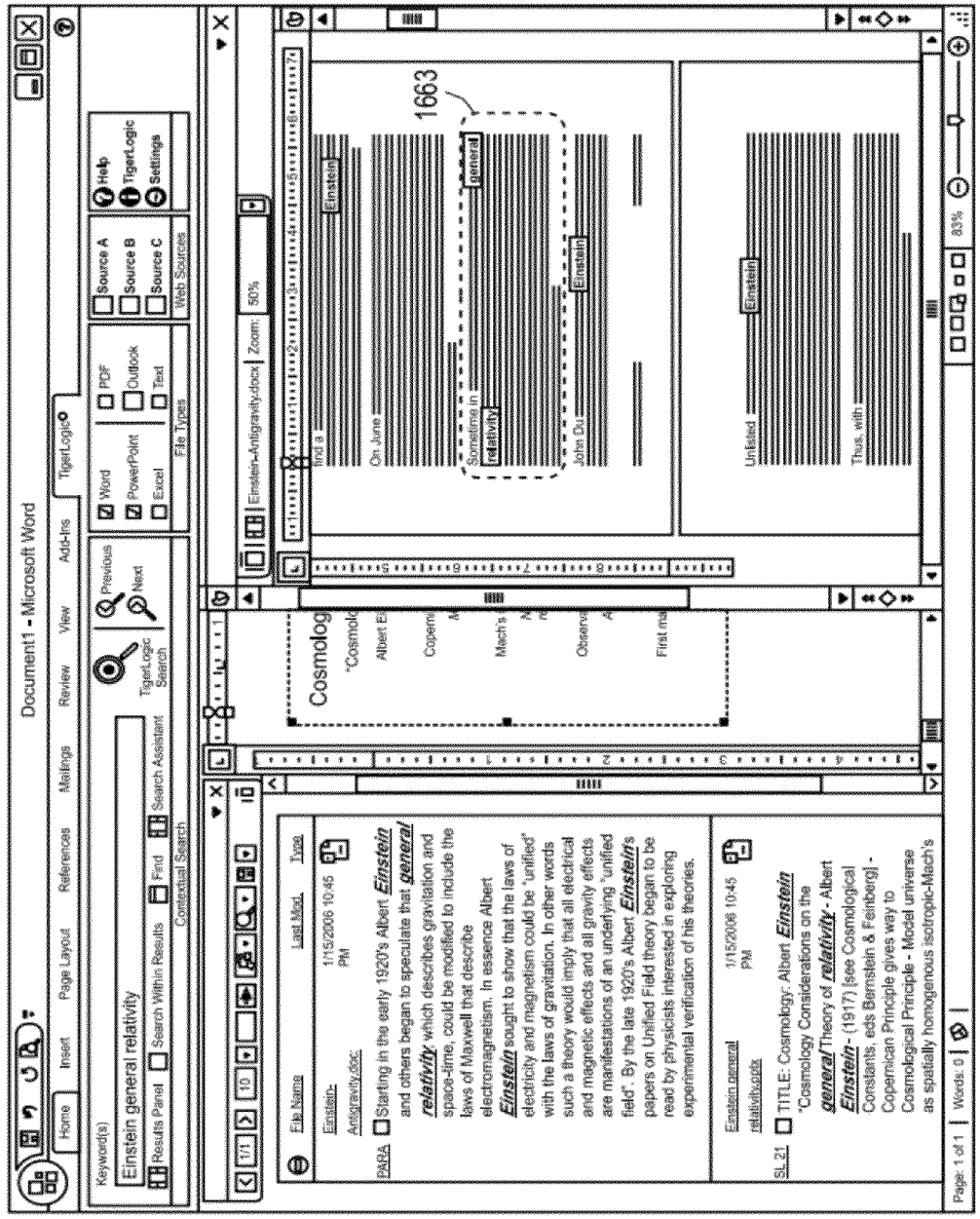
Figure 16J:
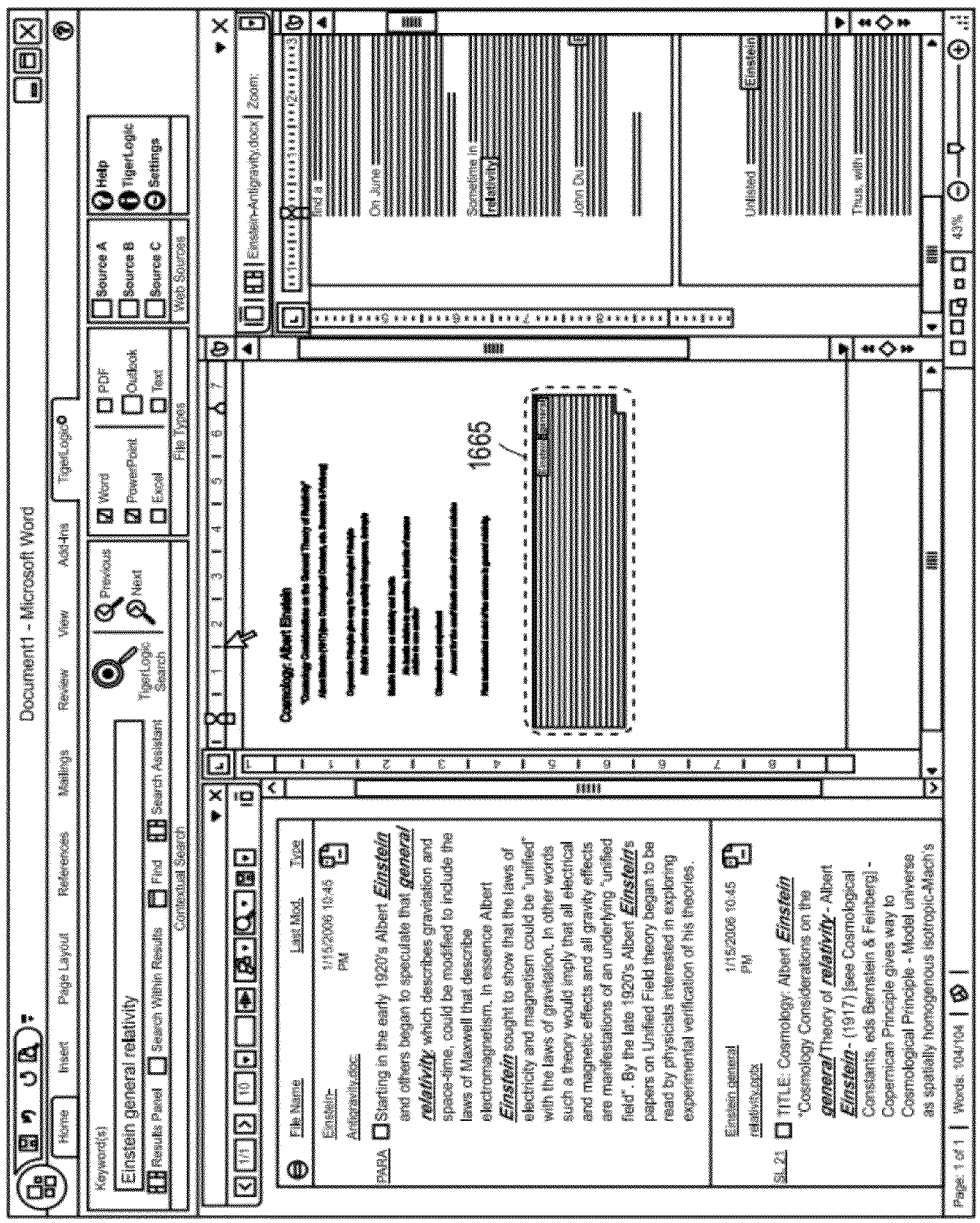

After viewing a chunk in the document display window, the author may want to duplicate the chunk in the document authoring window as well. As shown in FIGS. 16H-16J, respectively, in response to a user request to copy and paste a segment 1657 of the first document from the first document display window into the document authoring window, the computer generates therein an instance 1661 of the segment of the first document in its native display format; in response to a user request to copy and paste a segment 1663 of the second document display window into the document authoring window, the computer generates therein an instance 1665 of the segment 1663 of the second document in its native display format. This process is similar to the process described above in connection with FIGS. 16D and 16E.

In some embodiments, the document display window is a preview-only window of the corresponding document (e.g., a PDF document). The user cannot modify the document through the preview-only window. In some other embodiments, the document display window itself is a document authoring window, which may be another instance of the document authoring window (see, e.g., FIG. 16I) or may be different from the original document authoring window (see, e.g., FIG. 16G). Sometimes, the search keywords in the document display window are also highlighted.

Another application of the invention is to replace one text string with another text string among a set of documents without having to open any of them. For example, a user may like to change the name of a subject from A to B within many documents of different types that cover the subject. In some cases, the user may like to limit the change to certain types of documents or certain locations within the documents. Currently, the user has to open each document one by one and manually apply the change. This is not only time-consuming but also error-prone.

Figure 17A:
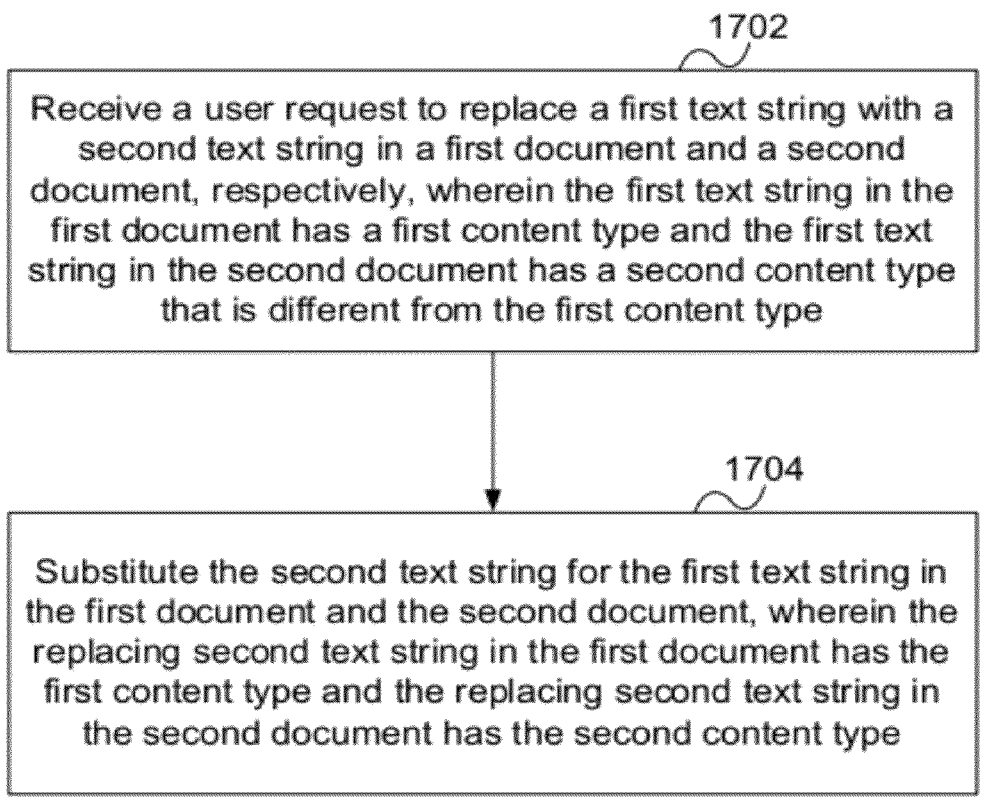
FIG. 17A is a flowchart illustrative of a process of finding and replacing text strings in connection with a set of search results based on user instructions in accordance with some embodiments.

FIG. 17A is a flowchart illustrative of a process of finding and replacing text strings in connection with a set of search results based on user instructions in accordance with some embodiments.

A computer receives a user request to replace a first text string with a second text string in a first document and a second document (1702). The first text string in the first document has a first content type and the first text string in the second document has a second content type, which is different from the first content type. The computer substitutes the second text string for the first text string in the first document and the second document (1704). The replacing second text string in the first document has the first content type and the replacing second text string in the second document has the second content type.

Figure 17B:
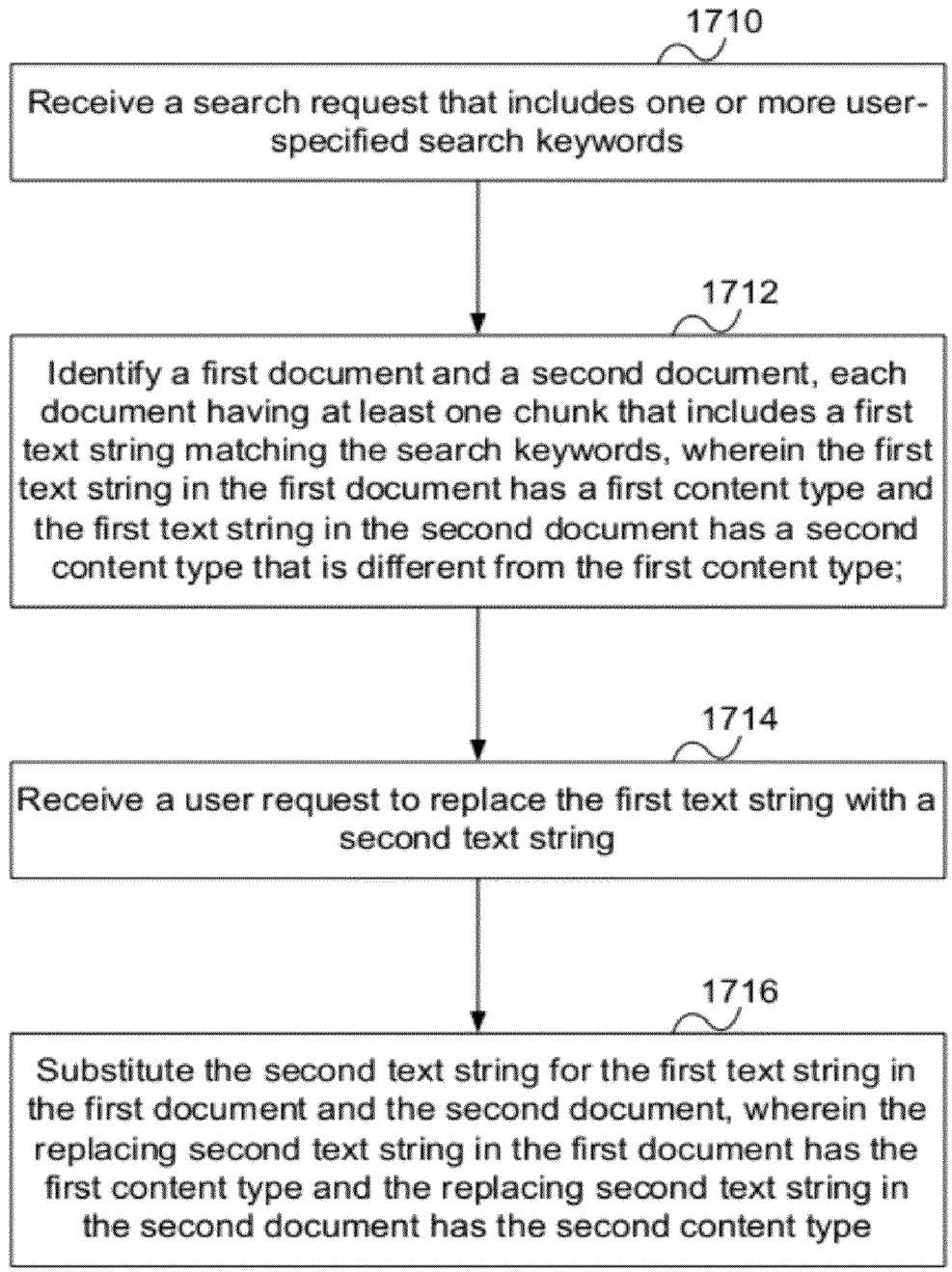
FIG. 17B is a flowchart illustrative of a process of finding and replacing text strings within a set of documents based on user instructions in accordance with some embodiments.

FIG. 17B is a flowchart illustrative of a process of finding and replacing text strings within a set of documents based on user instructions in accordance with some embodiments.

After receiving a search request that includes one or more user-specified search keywords (1710), a computer identifies a first document and a second document (1712), each document having at least one chunk that satisfies the search keywords. A first text string in the first document has a first content type and the first text string in the second document has a second content type, which is different from the first content type. After receiving a user request to replace the first text string with a second text string (1714), the computer substitutes the second text string for the first text string in the first document and the second document (1716). The replacing second text string in the first document has the first content type and the replacing second text string in the second document has the second content type.

Figure 17C:
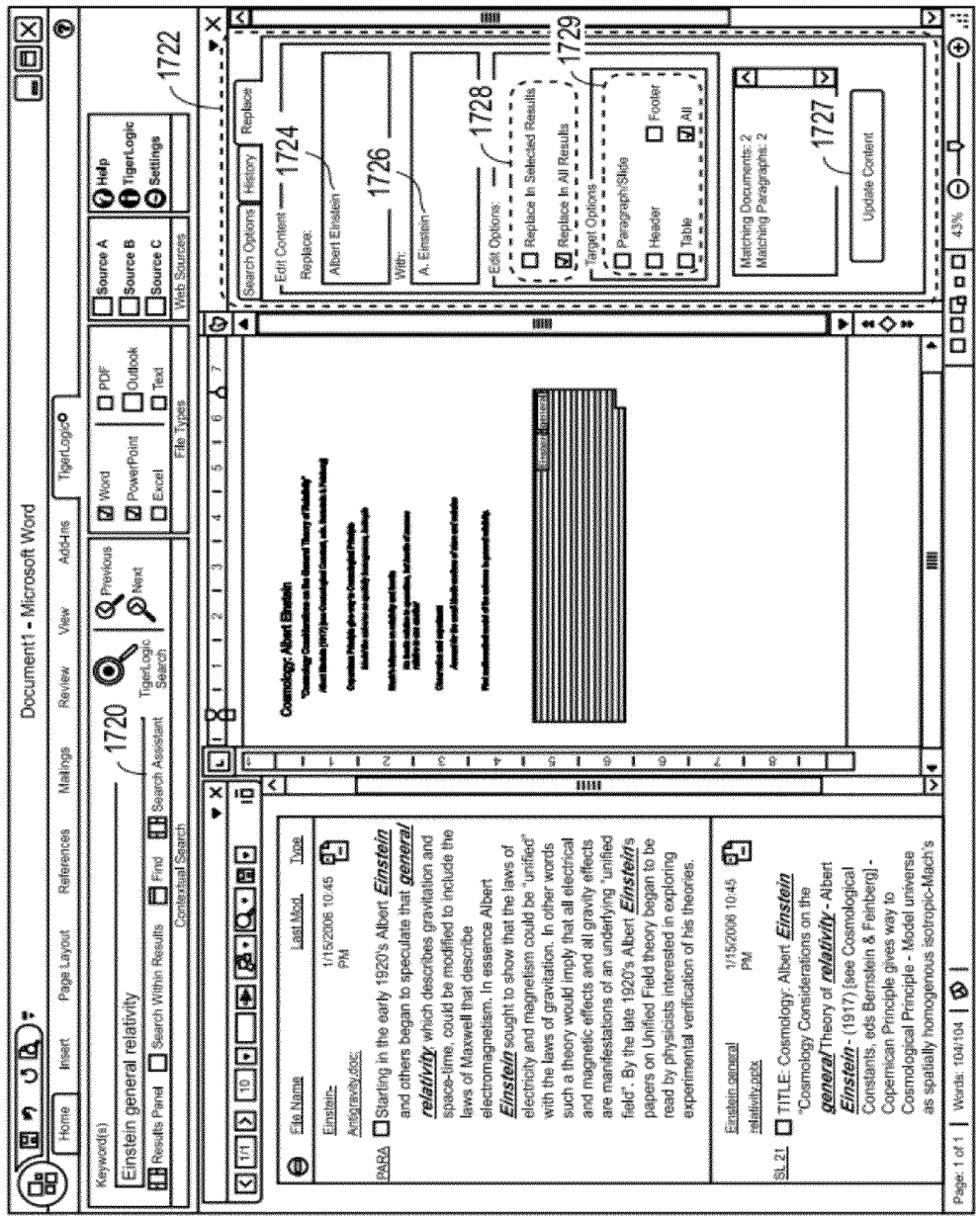
FIGS. 17C through 17E are screenshots of a graphical user interface on a computer display illustrative of features associated with the processes as shown in FIGS. 17A and 17B in accordance with some embodiments.
Figure 17D:
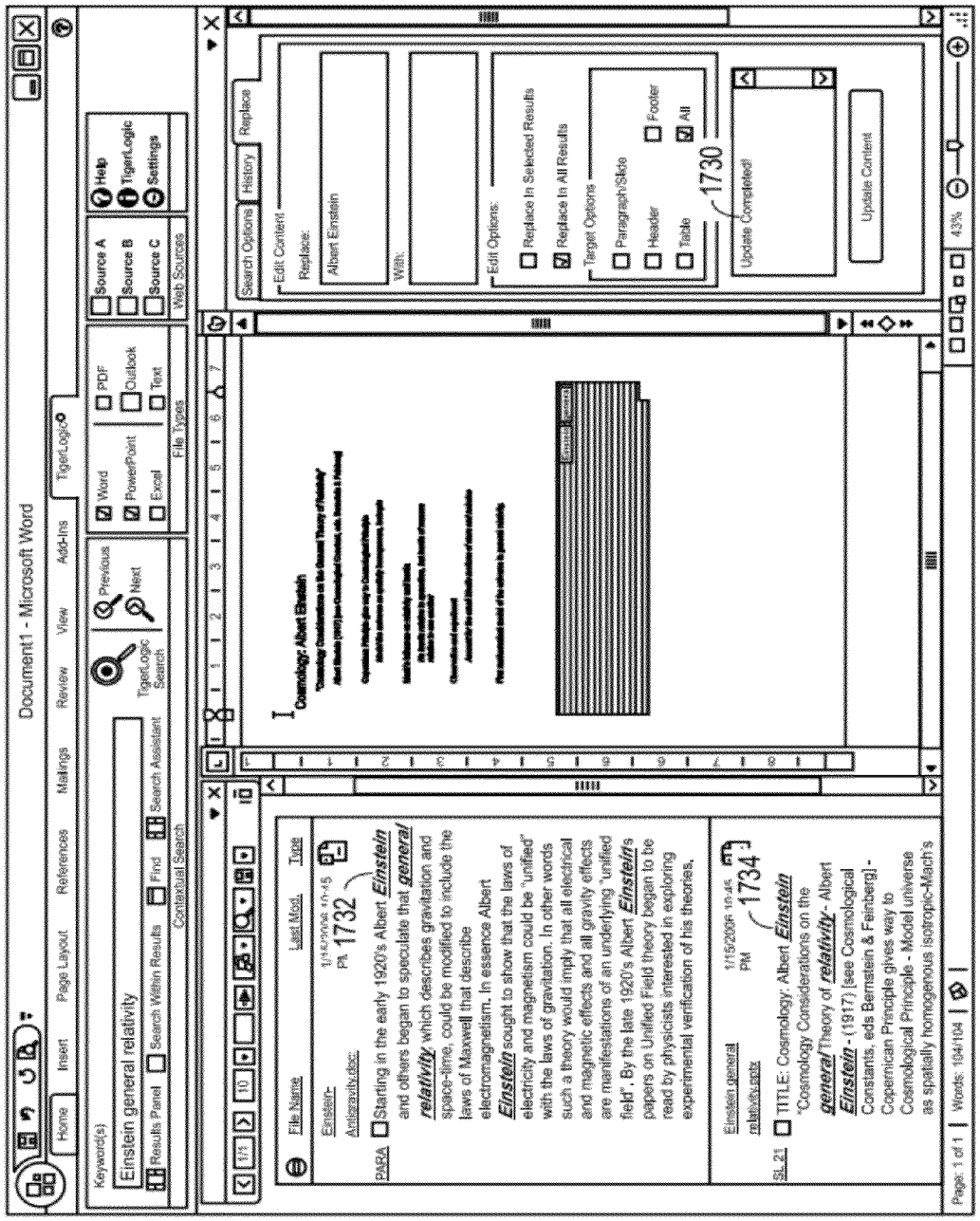
Figure 17E:
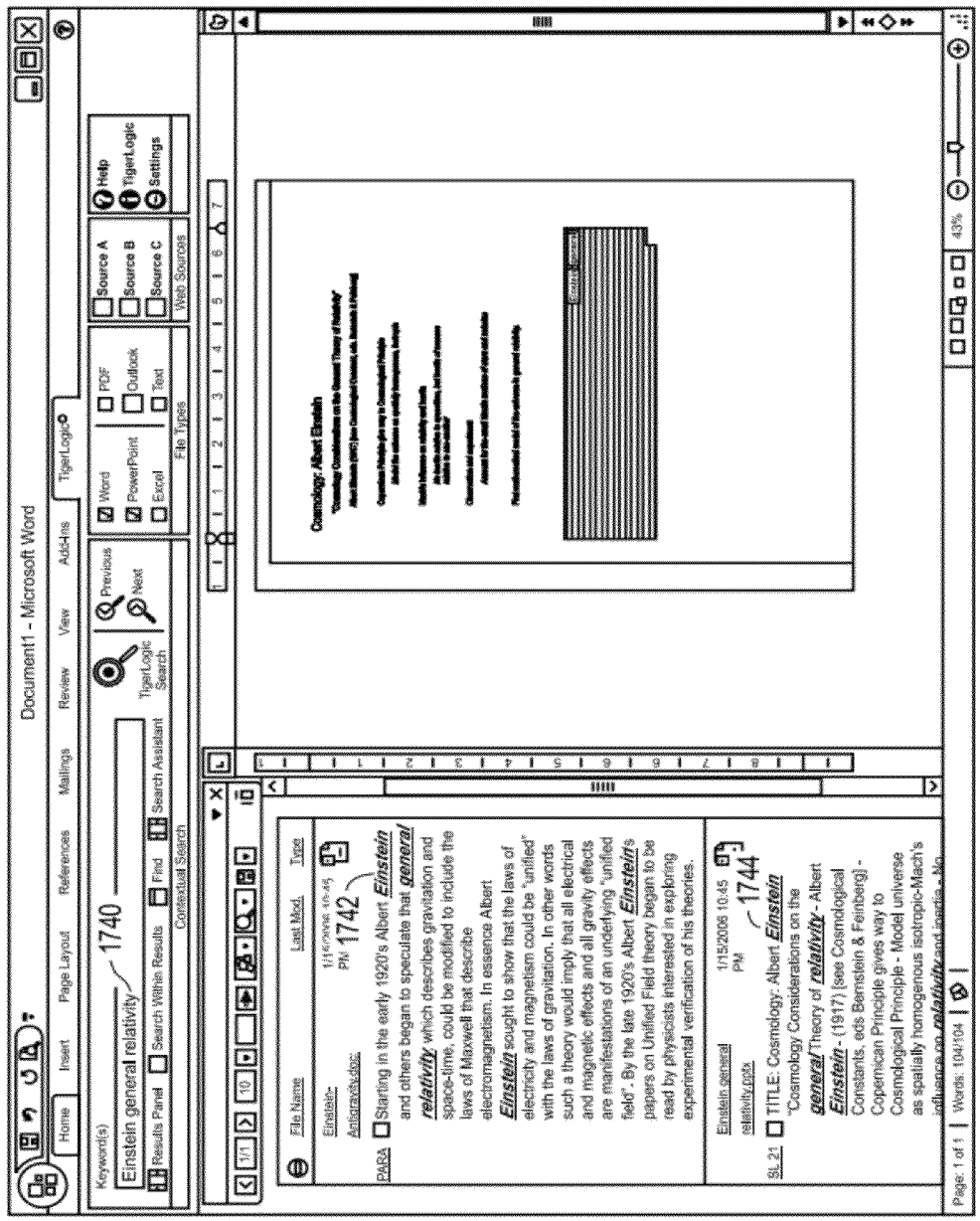

FIGS. 17C through 17E are screenshots of a graphical user interface on a computer display illustrative of features associated with the processes as shown in FIGS. 17A and 17B in accordance with some embodiments.

FIG. 17C is a screenshot including a search assistant window 1722, which occupies the space in the application user interface previously occupied by the document display window (see, e.g., FIG. 16J). In some embodiments, the search assistant window 1722 is activated by a user selection of the search assistant icon 1720. The search assistant window 1722 includes three tabs, "Search Options," "History," and "Replace." The "Replace" tab allows a user to replace one text string 1724 ("Albert Einstein" in this example) with another text string 1726 ("A. Einstein" in this example) by clicking the "Update Content" button 1727.

In some embodiments, the "Replace" tab provides additional options 1728 for the user to choose. For example, the user can limit the replacement to the selected search results in the search results window or relevant chunks in the identified documents, which documents result from a search and display of chunks that satisfy user-specified search keywords. Note that the text string 1724 to be replaced does not have to be related to the user-specified search keywords. They can be the same or overlapping (as is the case in FIG. 17C) or completely different.

In some embodiments, the user can broaden the scope of the replacement to be the identified documents including, but not limited to, the relevant chunks. In some other embodiments, the user can further expand the scope to cover all the documents whether or not they have a relevant chunk.

In some embodiments, the "Replace" tab also allows the user to specify the locations within a document at which the replacement may happen. For example, FIG. 17C depicts target options 1729 that include multiple locations, each having an associated checkbox. Thus, the user can stipulate that the first text string at one or more user-specified locations in the first and second documents be replaced by the second text string by checking the respective checkboxes. As a result, the computer substitutes the second text string for the first text string at the user-specified locations in the first document and the second document, respectively. Possible locations within a document include one or more selected from the group consisting of title, paragraph, table, header, footer, slide, spreadsheet, and all.

In some embodiments, after identifying the first document and the second document, the computer displays a first chunk from the first document and a second chunk from the second document, each chunk including at least one instance of the first text string. The instances of the first text string within the first and second chunks are displayed in a text-only display format. As described above, a PowerPoint document and a Word document are identified as having chunks satisfying the search phrase "Einstein general relativity." The two relevant chunks are displayed in a text-only display format and different matching terms therein are highlighted in different colors.

In some embodiments, the first and second documents may have different document type. Note that a document's document type is relevant to the document's distinct appearance when the document is rendered through its native application. For example, the first text string in the first document may have a first appearance when the first document is rendered by its native application and the first text string in the second document may have a second appearance that is different from the first appearance when the second document is rendered by its native application.

In this example, the Word document and the PowerPoint document have different document types because their contents have different appearances when rendered by Microsoft Office. Sometimes, a document's suffix may uniquely identify its document type, e.g., a document with the suffix ".docx" is a Microsoft Office 2007 Word document. Sometimes, a document's suffix cannot uniquely identify its document type, e.g., documents like "hello.c" and "hello.java" are probably both plain-text documents and therefore have the same document type.

FIG. 17D is a screenshot after the update is completed 1730. In some embodiments, replacing one text string with another text string does not trigger an update of the chunks in the search results window. Thus, the instances 1732, 1734 of the old text string "Albert Einstein" still appear in the search results window. To view the replacing text string, the user has to perform a new search for the replacing text string.

As shown in FIG. 17E, in response to a new search request including search keywords 1740 "Einstein general relativity," the computer updates the chunks in the search results window, and as a result, "Albert Einstein" is replaced with "A. Einstein." Note that the instances 1742, 1744 of the replacing second text string within the first and second chunks are also displayed in the text-only display format.

In some embodiments, after substituting the second text string for the first text string, the computer also replaces the displayed instances of the first text string within the first and second chunks in the search results window with respective instances of the second text string.

In some embodiments, the first document includes an original second text string that has a content type different from the replacing second text string. For example, the Word document may include a PowerPoint slide that has the phrase "A. Einstein," but not the phrase "general relativity." Assuming that the user limits the replacement to the chunks in the search results window, after the update, when the Word document is rendered by Microsoft Office, the second text string has at least two different appearances, one being a Word appearance and the other being a PowerPoint appearance.

Note that the methodology enabling the application of text string finding-and-replacement can be used for implementing other document-editing features such as undoing or reversing last N editing operations (including addition, deletion, and modification) applied to a set of documents and redoing or repeating N editing operations (including addition, deletion, and modification) applied to the set of documents. The set of documents may be located at the same data source or distributed across multiple data sources.

Another application of the invention is to refine search results using different search keywords. For example, after conducting one search using a set of search keywords, a user may like to conduct another search among the documents (or chunks) identified by the first search using another set of search keywords.

Figure 18A:
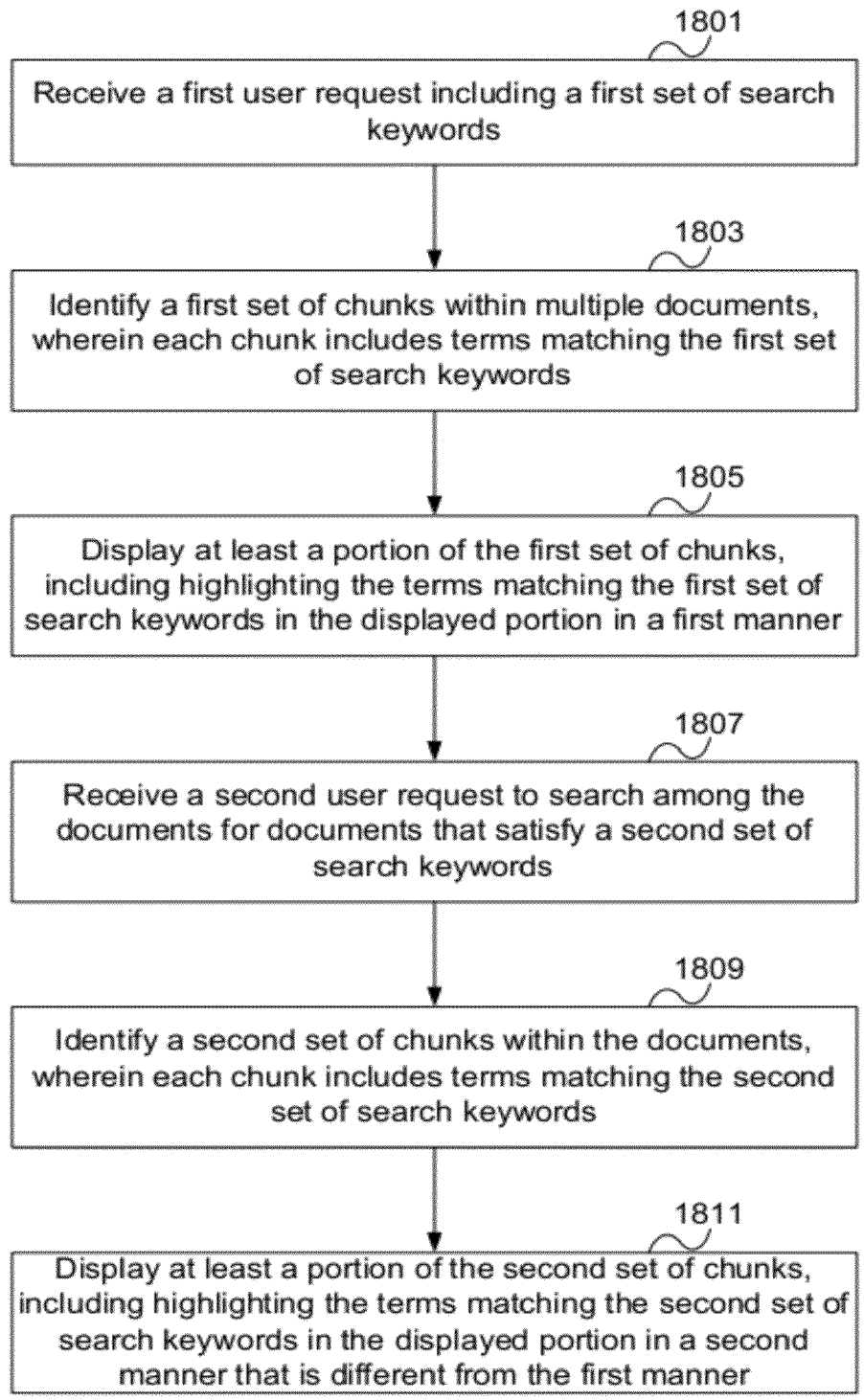
FIG. 18A is a flowchart illustrative of a first process of narrowing search results based on user instructions in accordance with some embodiments.

FIG. 18A is a flowchart illustrative of a first process of narrowing search results based on user instructions in accordance with some embodiments.

After receiving a first user request including a first set of search keywords (1801), a computer identifies a first set of chunks within multiple documents (1803). Each chunk includes terms matching the first set of search keywords. The computer displays at least a portion of the first set of chunks (1805), including highlighting the terms matching the first set of search keywords in the displayed portion in a first manner. After receiving a second user request to search among the documents for documents that satisfy a second set of search keywords (1807), the computer identifies a second set of chunks within the documents (1809). Each chunk includes terms matching the second set of search keywords. The computer displays at least a portion of the second set of chunks (1811), including highlighting the terms matching the second set of search keywords in the displayed portion in a second manner that is different from the first manner.

Figure 18B:
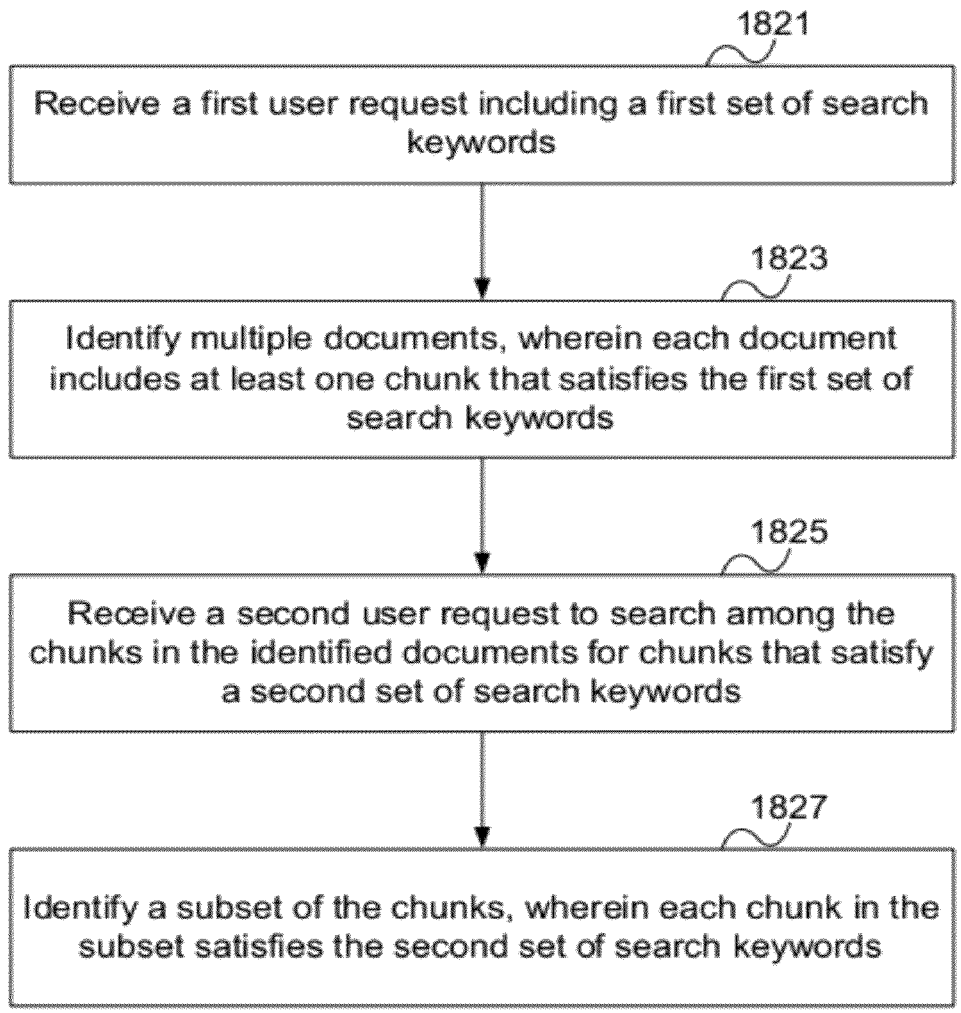
FIG. 18B is a flowchart illustrative of a second process of narrowing search results based on user instructions in accordance with some embodiments.

FIG. 18B is a flowchart illustrative of a second process of narrowing search results based on user instructions in accordance with some embodiments.

After receiving a first user request including a first set of search keywords (1821), a computer identifies multiple documents (1823). Each document includes at least one chunk that satisfies the first set of search keywords. After receiving a second user request to search among the chunks in the identified documents for chunks that satisfy a second set of search keywords (1825), the computer identifies a subset of the chunks (1827). Each chunk in the subset satisfies the second set of search keywords.

Note that a user can repeat any of the two processes above for many times by providing different sets of search keywords for each search step until a predefined condition is met, e.g., the chunks of the user's interest have been found or no chunk is identified. At any time, the user can roll back the search process to a previously-identified set of chunks and try a different set of search keywords that has not been used previously.

Figure 18C:
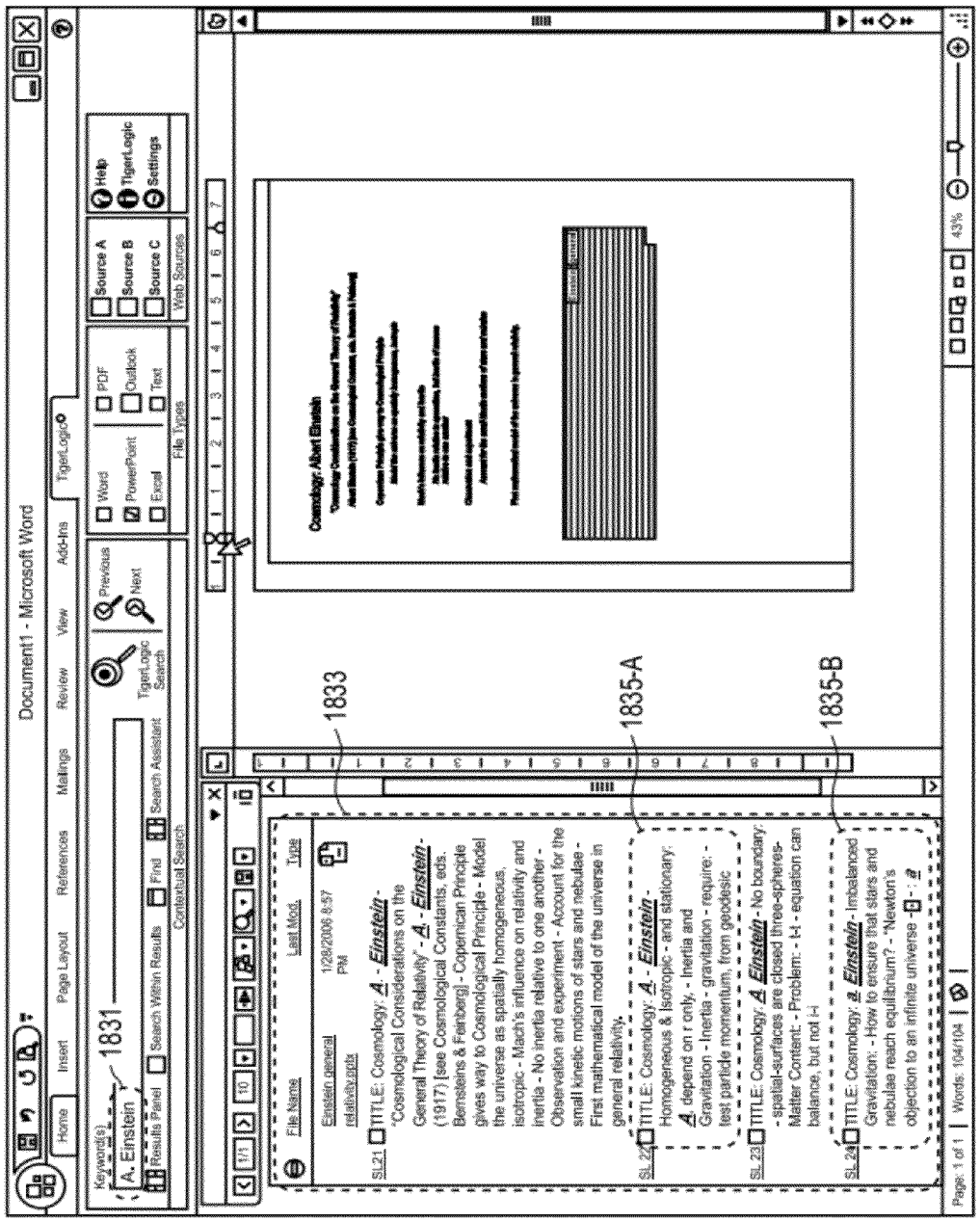
FIGS. 18C through 18D are screenshots of a graphical user interface on a computer display illustrative of features associated with the processes as shown in FIGS. 18A and 18B in accordance with some embodiments.
Figure 18D:
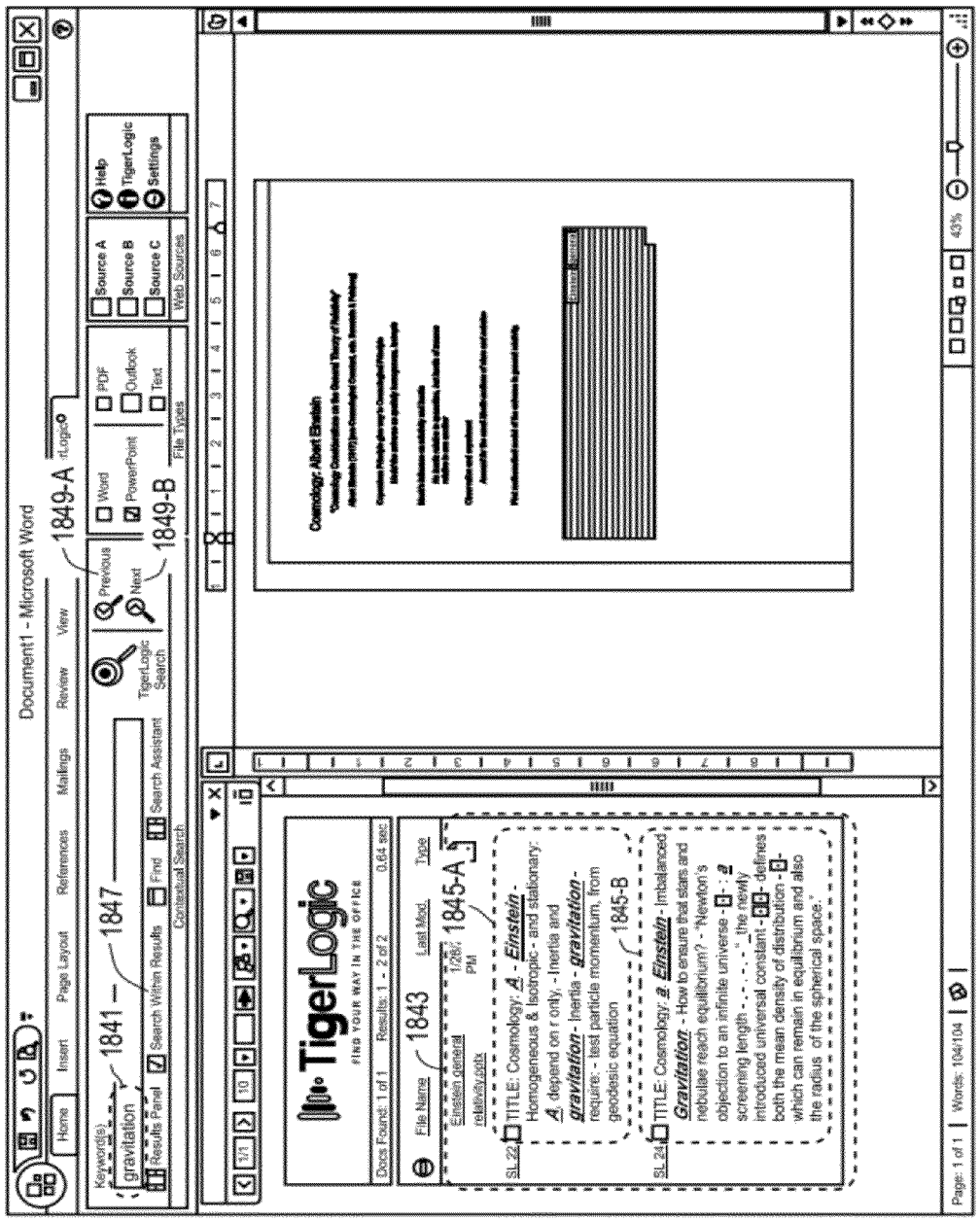

FIGS. 18C through 18D are screenshots of a graphical user interface on a computer display illustrative of features associated with the processes as shown in FIGS. 18A and 18B in accordance with some embodiments.

The graphical user interface includes a first set of search results displayed in a text-only display format, each search result including one or more chunks identified within a respective document as satisfying a first set of search keywords. In response to a user request to search among the identified chunks for chunks that satisfy a second set of search keywords, the first set of search results is replaced by a second set of search results. Each search result in the second set includes one or more chunks identified within a respective document as satisfying both the first set of search keywords and the second set of search keywords. In some embodiments, two chunks identified within two different documents have different native display formats. In some embodiments, the second set of search keywords includes at least one search keyword that is not present in the first set of search keywords.

In some embodiments, terms matching the first set of search keywords and terms matching the second set of search keywords within a respective chunk are highlighted in a visually distinguishable manner.

In some embodiments, the chunks identified within a respective document as satisfying the first set of search keywords are displayed in an order consistent with their relative relevancy to the first set of search keywords, and the chunks identified within a respective document as satisfying both the first set of search keywords and the second set of search keywords are displayed in an order consistent with their relative relevancy to the second set of search keywords. In some other embodiments, the chunks identified within a respective document as satisfying any of the first and second sets of search keywords are displayed in an order consistent with their relative locations within the corresponding document.

FIG. 18C is a screenshot including a first set of relevant chunks 1833 identified within a PowerPoint document as satisfying the search keyword 1831 "A. Einstein." In some embodiments, the chunks 1833 are ordered by their respective relevancy to the search keywords 1831. In this example, the chunk 1835-B has a relative lower ranking metric when compared with the other chunks above (e.g., 1835-A) and is therefore displayed at the bottom of the search results window. In some embodiments, if the subset of chunks includes a first chunk and a second chunk, the computer displays the first chunk ahead of the second chunk in response to the first user request and displays the second chunk ahead of the first chunk in response to the second user request.

FIG. 18D is a screenshot including a second set of relevant chunks 1843 identified within the PowerPoint document as satisfying the search keyword 1841 "gravitation." Note that the second set of search keywords 1841 can be completely different from the first set of search keywords 1831. In this example, the user has selected the checkbox next to the "Search Within Results" icon 1847. Accordingly, the search for the second set of chunks is limited to the documents identified as having chunks that satisfy the search keywords 1831. In this case, it is possible that the second set of chunks includes at least one chunk that is not included in the first set of chunks. In some embodiments, the search for the second set of chunks is further limited to the chunks 1833 that are identified by the first search.

In some embodiments, the second set of chunks includes at least one chunk that is included in the first set of chunks. For example, the chunks 1845-A, 1845-B in FIG. 18D are the same as the respective chunks 1835-A, 1835-B in FIG. 18C. In some embodiments, the chunks 1835-A, 1835-B are displayed in an order consistent with their relevancy to the first set of search keywords 1831 in the first set of chunks and the chunks 1845-A, 1845-B are displayed in an order consistent with their relevancy to the second set of search keywords 1841 in the second set of chunks In some embodiments, the terms in the chunks 1843 matching the first set of search keywords 1831 and the terms in the chunks 1843 matching the second set of search keywords are highlighted in different manner (e.g., different colors, font type, etc.). In this example, the matching terms are displayed using larger, italic, and underlined font.

At any time, if the user is unsatisfied with the identified chunks 1843, the user can bring back the previously-identified chunks by clicking the "Previous" link 1849-A and restart the search process by entering a different set of search keywords. Similarly, the user can skip some search results by clicking the "Next" link 1849-B.

Another application of the invention is to minimize the response latency by alternatively processing different node streams to identify the relevant chunk within a node stream as quickly as possible.

Figure 19:
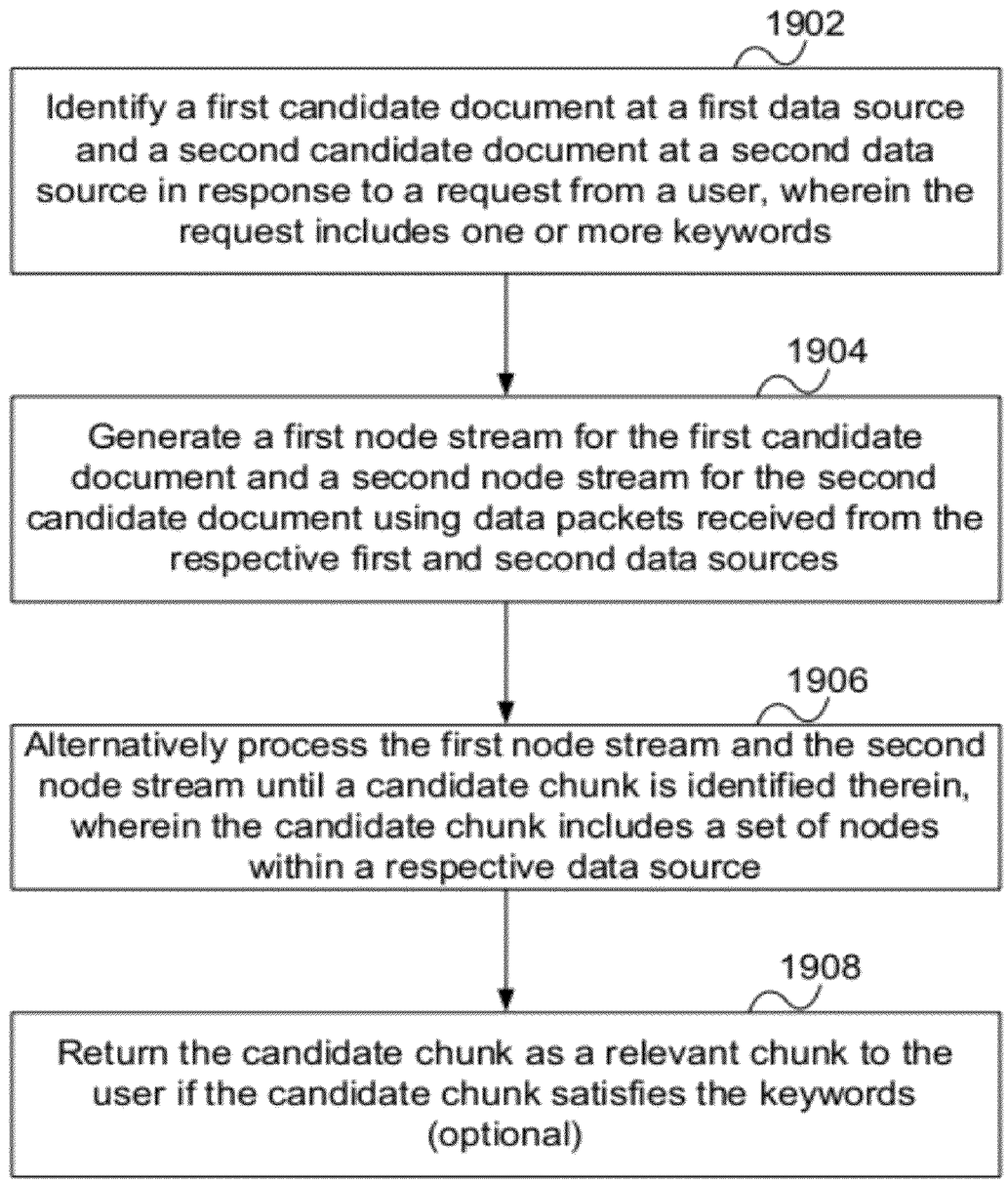
FIG. 19 is a flowchart illustrative of a process of alternatively processing document node streams in accordance with some embodiments.

FIG. 19 is a flowchart illustrative of a process of alternatively processing document node streams in accordance with some embodiments.

The computer identifies a first candidate document at a first data source and a second candidate document at a second data source in response to a request from a user (1902). The request includes one or more keywords. In some embodiments, the request is a search including one or more search keywords. The computer generates a first node stream for the first candidate document and a second node stream for the second candidate document using data packets received from the respective first and second data sources (1904). The computer alternatively processes the first node stream and the second node stream until a candidate chunk is identified therein (1906). In some embodiments, the candidate chunk includes a set of nodes within a respective data source. Optionally, the computer returns the candidate chunk as a relevant chunk to the user if the candidate chunk satisfies the keywords (1908). Note that the first data source and the second data source may or may not be the same one. For example, they may be two different web servers. Thus, each candidate document can be an HTML web page.

In some embodiments, the computer submits an HTTP request to the first data source and receives an HTTP response from the first data source. The HTTP response may include multiple data packets corresponding to the first candidate document. After receiving one of the data packets from the first data source, the computer extracts one or more nodes from the data packet and inserts the one or more nodes into the first node stream. Sometimes, the computer may extract only a node fragment from the data packet if the node is too large to fit in a single data packet. In this case, the computer then forms a node by combining the node fragment with another node fragment, which may be extracted from a previous data packet, and insert the formed node (if the node is now complete) into the first node stream.

In some embodiments, after processing nodes currently in the first node stream, the computer waits for more nodes to appear in the first node stream. If no new node appears in the first node stream for a first amount of time, the computer may suspend processing the first node stream and switch to process nodes currently in the second node stream and identify the candidate chunk in the second node stream, if there is any one.

In some embodiments, after processing the nodes currently in the second node stream, the computer may switch back to process nodes currently in the first node stream if no new node appears in the second node stream for the first amount of time and identify the candidate chunk in the first node stream, if there is any one.

In some embodiments, the computer may discard processing results associated with one of the first node stream and the second node stream if no new node appears in the node stream for a second amount of time, which should be no less than and preferably longer than the first amount of time. For example, if there is a network traffic jam and the computer has not received any data packet from a remote data source for a relatively long period of time, the computer can stop working on the corresponding node stream and use the resources associated with the node stream for other purposes, e.g., processing another node stream.

Note that the HTTP-related example above is for illustrative purposes. The process is equally applicable to any communication protocol in which response latency is a concern, such as other TCP/IP based network protocols, file transfer protocol (FTP), or the like.

Another application of the invention is to provide a unified data model for documents having different structure types such as a strictly-structured XML document, a semi-structured HTML web page, and an unstructured plain-text document. This unified data model simplifies the process of identifying relevant chunks therein in response to a set of search keywords.

Figure 20:
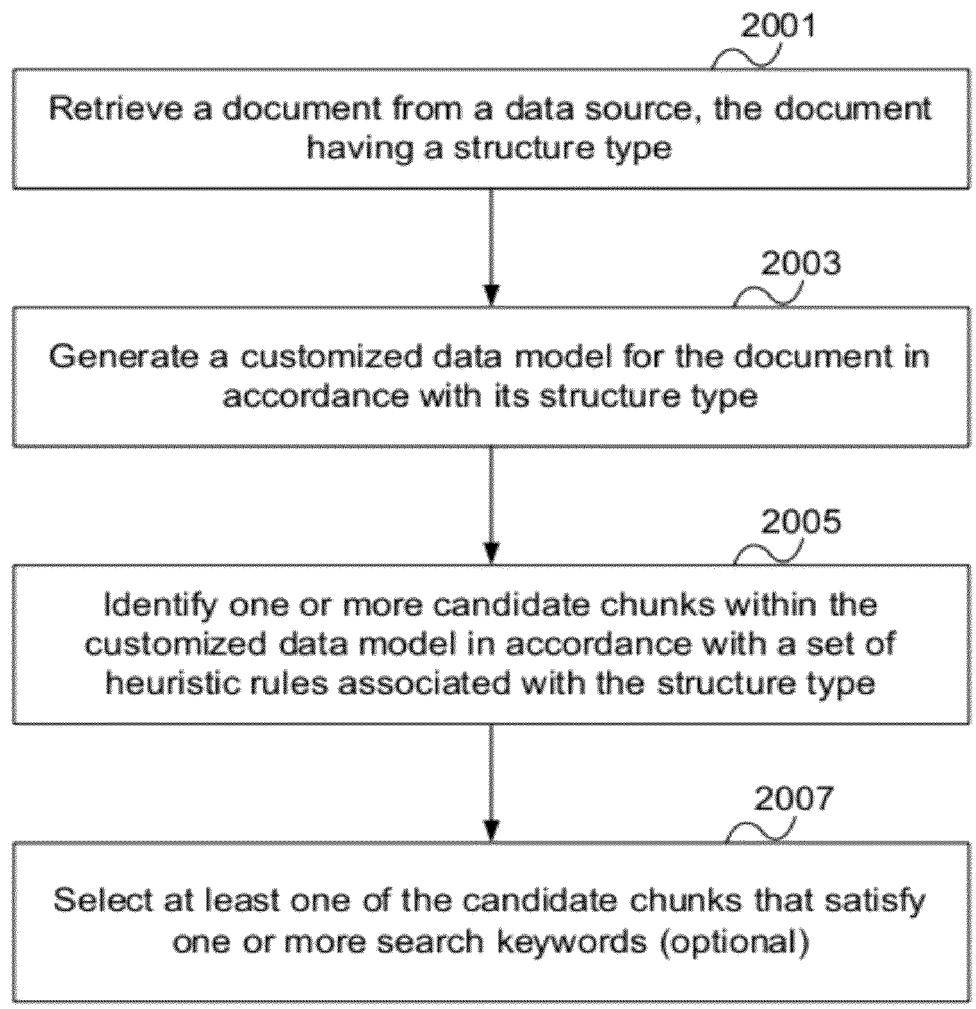
FIG. 20 is a flowchart illustrative of a process of semantically and contextually annotating documents of different structures in accordance with some embodiments.

FIG. 20 is a flowchart illustrative of a process of semantically annotating documents of different structures in accordance with some embodiments.

After retrieving a document from a data source (2001), the computer generates a customized data model (e.g., a hierarchical data mode) for the document in accordance with its structure type (2003). In some embodiments, the structure type can be structured, semi-structured, and unstructured. The computer identifies one or more candidate chunks within the customized data model in accordance with a set of heuristic rules associated with the structure type (2005). Optionally, the computer selects one of the candidate chunks that satisfies one or more search keywords and returns it to an end user as a relevant chunk (2007).

In some embodiments, the data source is a web server and the document is an HTML web page that includes multiple pairs of HTML tags. In this case, the computer identifies a first subset of the HTML web page between a first pair of HTML tags as a first candidate chunk if the first pair of HTML tags satisfies one of the set of heuristic rules. If necessary, the computer recursively identifies a second subset of the HTML web page within the first subset of the HTML web page between a second pair of HTML tags as a second candidate chunk if the second pair of HTML tags satisfies one of the set of heuristic rules.

In some embodiments, for a plain-text document, the computer generates the data model by heuristically inserting metadata such as XML tags into the data model. The document contents following different XML tags are identified to be different candidate chunks if they have predefined textual patterns. For example, a paragraph separated by blank lines is a candidate chunk and a sentence following a hyphen is also a candidate chunk if it is deemed to be part of a list of items.

Another application of the invention is to adaptively select matching chunks from a plurality of candidate chunks identified within a candidate document in response to a search request so as to improve the usability of the chunks to the end user.

As noted above in connection with FIG. 12C, because the "'Exact' Match" and "Match All" options require all the search keywords find their matches in a chunk, they may ignore a chunk that, although highly relevant, fails to satisfy one of the search keywords. Alternatively, these two search options may return a chunk that, although satisfying all the search keywords, is too long to retain the benefits an ideal chunk should offer, e.g., being both precise and efficient in locating the information of the user's search interest. The latter case is especially true if the candidate document has a hierarchical data model and the search keywords spread over multiple layers of the data model.

On the other hand, the "Match Any" option accepts any chunk that satisfies at least one search keyword. This could end up with returning too many short chunks to a user, which is equally frustrating because the user has to review many remotely matching chunks before locating the information of the user's search interest or concluding that no such information is in the document.

Fortunately, the "Best Match" option, as will be described below, can successfully avoid the issues associated with these more polarized search options by screening out chunks that are potentially more distractive and presenting only chunks that satisfy a set of carefully-chosen criteria to the user.

Figure 21A:
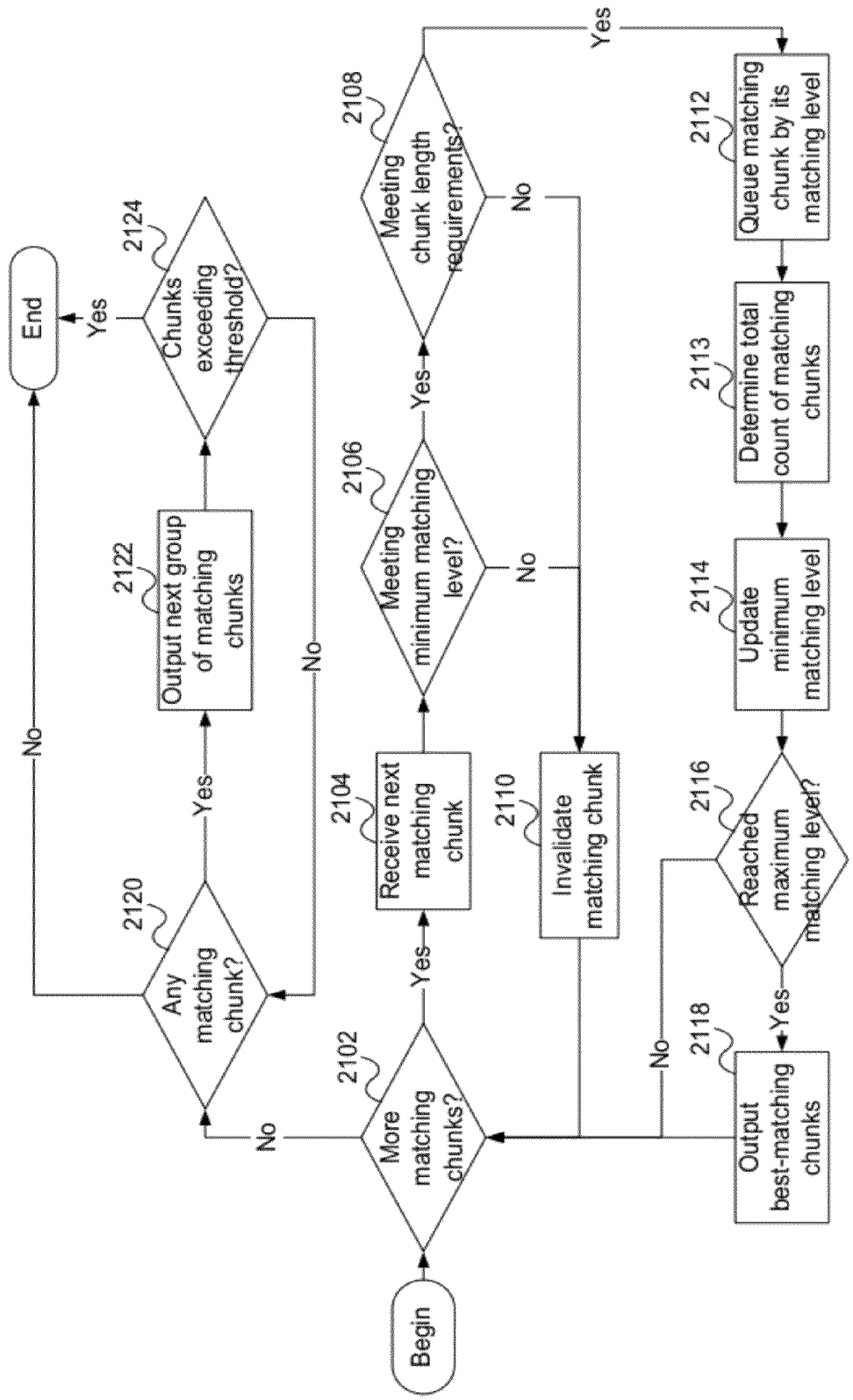
FIG. 21A is a flowchart illustrative of a first process of screening matching chunks within a document based on pre-defined criteria in accordance with some embodiments.

FIG. 21A is a flowchart illustrative of a first process of screening matching chunks within a candidate document based on predefined criteria in accordance with some embodiments. In this application, a "matching chunk" is defined as a candidate chunk that matches at least one search keyword. Certainly, a matching chunk could be an all-match if it matches all the search keywords and even an exact-match if it matches the search keywords in exactly the same order.

Assume that a set of matching chunks within the candidate document have been identified and they are fed into a computer in an order consistent with their respective locations in the document. The computer begins the adaptive process by checking if there is any more matching chunk to be further processed (2102). If so (2102, yes), the computer receives the next matching chunk (2104) and checks if the matching chunk meets the current minimum matching level set for the document (2106).

In some embodiments, a matching chunk is characterized by one or more attributes such as its matching level to the corresponding search request and its length. For example, the matching level of a matching chunk may be the total count of unique search keywords found within the chunk and the chunk's length may be the total count of words or non-white-space characters in the chunk. Initially, the computer assigns a minimum matching level, e.g., one unique keyword per chunk, and a range of accepted chunk length, e.g., 50-70 words per chunk, to the candidate document.

If the matching level of the next matching chunk is below the minimum matching level (2106, no), the computer invalidates the matching chunk (2110) and proceeds to the next one in the pipeline. If the matching level of the next matching chunk is above the minimum matching level (2106, yes), the computer checks whether the chunk's length is within the range of accepted chunk length (2108). If the length of the chunk is outside the scope of accepted chunk length (2108, no), either too long or too short, the computer repeats the same procedure of invalidating the matching chunk (2110) and proceeds to the next one in the pipeline.

Otherwise (2108, yes), the computer inserts the matching chunk into a respective queue in accordance with the chunk's match level (2112). In some embodiments, matching chunks having different total counts of unique search keywords are put into separate queues. In some other embodiments, matching chunks having different sets of unique search keywords are grouped into separate queues. In either case, the computer calculates the current total count of matching chunks within the different queues (2113).

If the total count of matching chunks is greater than a predefined threshold, e.g., 10 chunks per document, the computer updates the document's current minimum matching level (2114) by, e.g., increasing the minimum matching level by one. As a result, at least one queue of matching chunks has a matching level less than the updated minimum matching level. In some embodiments, the computer invalidates the entire queue of matching chunks, re-determines the current total count of matching chunks, and repeats this procedure until the total count of matching chunks is less than the threshold. Certainly, the computer should not invalidate any matching chunk if the total count of matching chunks is less than the predefined threshold.

After updating the current minimum matching level, the computer checks whether the current minimum matching level has reached the maximum matching level associated with the search request (2116). In some embodiments, the maximum matching level is defined by identifying a best-matching chunk such as an all-match chunk or an exact-match chunk. If true (2116, yes), the computer outputs all the best-matching chunks it has accumulated in one or more queues to the user (2118). By doing so, the computer effectively reduces the latency by serving the presumably most relevant chunks to the user while continuously processing the other matching chunks. Otherwise (2116, no), the computer proceeds to the next one in the pipeline. In some embodiments, the operations 2116, 2118 are optional and the computer postpones returning any chunk to the user until after processing all the matching chunks.

At the end of the aforementioned process, the computer should filter out most, if not all, the distractive chunks that are presumably of little interest to the user and is now ready to serve the remaining matching chunks in the queues to the user. Assuming that the computer has queued multiple groups of matching chunks (2120, yes), it begins with serving a group of currently best-matching chunks to the user (2122). After that, the computer checks if the total count of matching chunks that have been served exceeds the predefined threshold or not (2124). If so (2124, yes), the computer stops the process of serving any more matching chunks even if there are additional queues of un-served matching chunks. By keeping the total count of served matching chunks below the threshold, the computer can avoid overwhelming the user with too many chunks in the search results view. Otherwise (2124, no), the computer repeats the process of serving the group of second best-matching chunks until the predefined threshold is met. In some embodiments, the computer stops serving any matching chunk if no more matching chunks are left in any queue (2120, no). This may occur even if the total count of served matching chunks has not reached the predefined threshold.

In some embodiments, the matching chunks identified within a document having a hierarchical data model are queued in an order such that a descendant matching chunk always precedes its ancestor matching chunks if they appear in the same queue. This ordering guarantees that the computer first serve the more refined descendant matching chunk before encountering any of the ancestor matching chunks because, as noted above, the serving process proceeds from perfect-matching chunks to less perfect ones. After serving the more refined descendant matching chunk, the computer also invalidates all the ancestor matching chunks in the same queue since none of them are presumably more relevant than the descendant chunk.

According to the aforementioned process, the matching chunks are served in an order consistent with their relevancy to the search request, which may be different from the order of the chunks' locations in the document. For example, a best-matching chunk served before the other matching chunks may be located at the end of the document and vice versa. In some embodiments, the computer may apply a two-phase process to ensure that the matching chunks be served in an order consistent with their locations in the candidate document:

Phase One—The computer screens the matching chunks as described above, including assigning a monotonically increasing chunk identifier to each matching chunk based on the matching chunk's location in the document and invalidating any chunk and its ancestors that fail to meet any of the predefined criteria, without serving any chunk to an end user.

Phase Two—The computer sorts the surviving matching chunks within different queues in accordance with their respective chunk identifiers such that the first matching chunk to be served is located above the other matching chunks in the same document and outputs the matching chunks in this new sorted order.

Note that there are many other approaches of outputting chunks in an order consistent with their locations in the document. For example, the computer may generate a chunk linked-list during initial data model generation or matching chunk screening process such that each chunk includes a reference to the next chunk in the document. After the screening process, the computer can output the result matching chunks in an order consistent with their locations in the document by navigating the chunk linked-list and skipping invalidated chunks.

FIG. 21B is an exemplary HTML document 2130 illustrative of the process as shown in FIG. 21A in accordance with some embodiments. For illustration, the HTML document 2130 includes five matching chunks, each chunk having a unique chunk ID "cid."

Assume that there are seven user-specified search keywords, "Scintillating Examples of the Best Match Algorithm." Further assume that the predefined threshold of total chunk count is two (2), the range of accepted chunk length is 30-200 characters, and the initial minimum matching level is one keyword per chunk. The five matching chunks, each satisfying at least one of the seven search keywords, are fed into the computer in the order (as represented by their chunk IDs) of #2, #3, #1, #5, #4.

According to the flow chart shown in FIG. 21A, chunks #2 and #3 are both placed in Queue 4, which contains the chunks matching four search keywords, although the two chunks do not have the same four search keywords. Chunk #1 is placed in Queue 6, which contains the chunks matching six search keywords. Since three chunks have been placed into different queues, exceeding the threshold, the computer updates the current minimum matching level from "one keyword per chunk" to "four keywords per chunk."

Although containing four matching keywords, chunk #5 is nonetheless invalidated because its length (26 characters) is outside the range of accepted chunk length. In contrast, chunk #4, which is a parent of chunk #5, is placed in Queue 4 for containing the same four matching keywords and being longer than 30 characters.

After processing all the matching chunks, the computer begins outputting the matching chunks within different queues. In this example, the computer outputs the chunks in an order consistent with their respective relevancy to the search request. Thus, chunk #1 in Queue 6 is first served to the user. As noted above, the export of chunk #1 also causes the invalidation of chunks #2 and #3 in Queue 4 because they are descendants of chunk #1. Because Queue 5 is empty, the computer proceeds to Queue 4, which has only chunk #5 left for output. Finally, the computer stops the process after examining the queues of matching chunks with a matching level no less than the current minimum matching level.

Figure 21C:
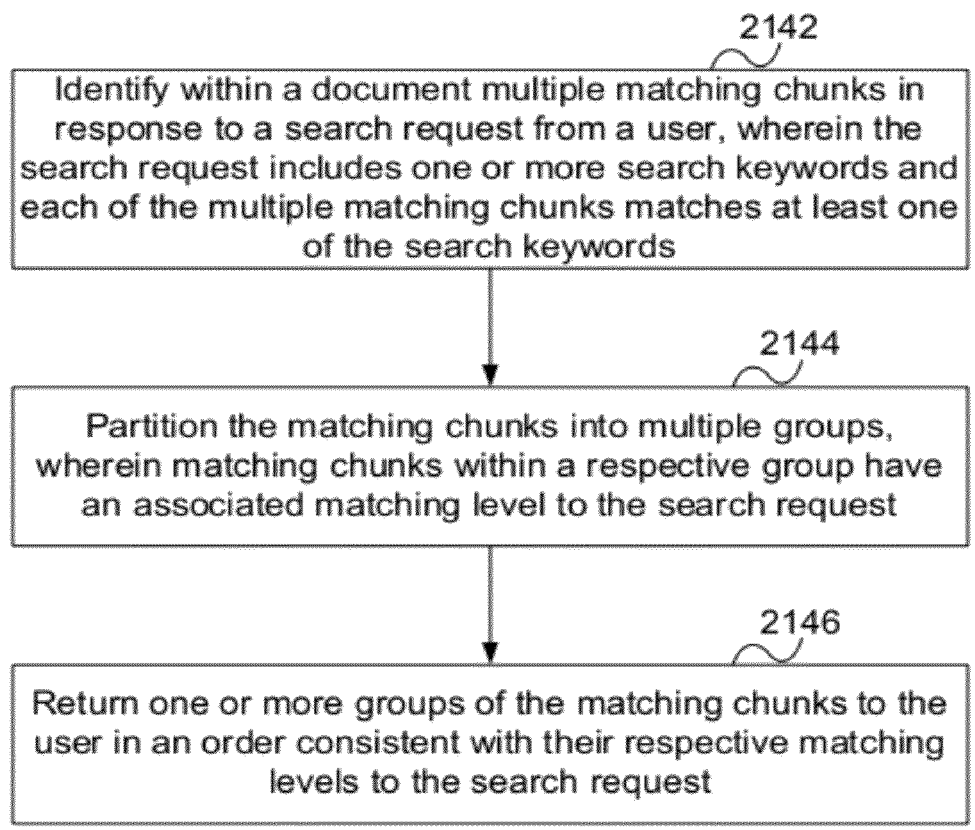
FIG. 21C is a flowchart illustrative of a second process of screening matching chunks within a document based on pre-defined criteria in accordance with some embodiments.

FIG. 21C is a flowchart illustrative of a second process of screening matching chunks within a document based on predefined criteria in accordance with some embodiments.

A computer identifies within a document multiple matching chunks in response to a search request from a user (2142). In some embodiments, the search request includes one or more search keywords and each of the multiple matching chunks matches at least one of the search keywords. The computer partitions the matching chunks into multiple groups (2144). The matching chunks within a respective group have an associated matching level to the search request. In some embodiments, the partition is a queuing process wherein chunks containing the same number of matching keywords are placed in the same queue. The computer returns one or more groups of the matching chunks to the user in an order consistent with their respective matching levels to the search request (2136). In some embodiments, the computer displays a respective relevancy indicator adjacent each of the returned matching chunks, indicating the relevancy between the corresponding matching chunk and the search request. The relevancy indicator can be formed using image, text, number or the like to give the user an intuitive impression as to the matching chunk's proximity to the search keywords.

In some embodiments, each of the search keywords has an associated weight indicative of its relevance to the user's search interest. Different search keywords may have the same weight or different weights. Some of the search keywords may even have an associated weight of zero. For instance, in the example described above in connection with FIG. 21B, the keyword "the" may be given a weight of zero and therefore have no impact on the search results.

In some embodiments, the matching level of a respective group of matching chunks is, at least partially, determined by summing the weights of unique search keywords within one of the matching chunks. For example, the matching level of a respective group of matching chunks may be, at least partially, determined by the number of unique search keywords within one of the matching chunks. If all the search keywords (including "the") are given the same weight, chunks #2 and #3 would have the same matching level and therefore be put in the same group.

In some embodiments, to partition the matching chunks into multiple groups, the computer selects one of the matching chunks, determining the chunk's matching level and length, and invalidates the chunk if its matching level is less than a minimum matching level or if its length is outside a predefined range of acceptable chunk length. If the selected matching chunk satisfies all the criteria including the minimum matching level and the predefined range of acceptable chunk length, the computer inserts the chunk into one of the groups of matching chunks. As noted above, the length of the matching chunk can be the total word count of the textual content of the matching chunk, or alternatively, the total character count of the textual content of the matching chunk after white-space normalization.

In some embodiments, after selecting a matching chunk that satisfies all the criteria, the computer compares the chunk's matching level to the matching level of a respective group of matching chunks until identifying a group of matching chunks whose matching levels are the same or similar to the selected chunk's matching level and then adds the chunk to the group of matching chunks.

In some embodiments, after placing a matching chunk within a group or exporting a matching chunk to the end user, the computer checks whether there are any chunks within the same group that are descendants of the newly-placed or newly-exported matching chunk in a hierarchical data model of the document. If so, the computer then invalidates the descendant matching chunks from the group of matching chunks because they are redundant chunks from the user's perspective.

In some embodiments, after inserting one matching chunk into a group of matching chunks, the computer determines a total count of matching chunks whose matching levels are no less than the minimum matching level and updates the current minimum matching level if the total count of matching chunks is greater than a predefined count threshold. Additionally, the computer may invalidate at least a subset of one of the groups of matching chunks whose matching levels are less than the updated minimum matching level.

In some embodiments, if there are multiple groups of matching chunks (e.g., Queue 6 and Queue 4 in the example shown in FIG. 21B), the computer selects among the groups of matching chunks a group of matching chunks that has a highest matching level (e.g., Queue 6) and returns the selected group of matching chunks to the user. If there are still groups of matching chunks left, the computer then returns to select a group of matching chunks having a next highest matching level (e.g., Queue 4) until the total count of the returned matching chunks is not less than a predefined count threshold.

Figure 21D:
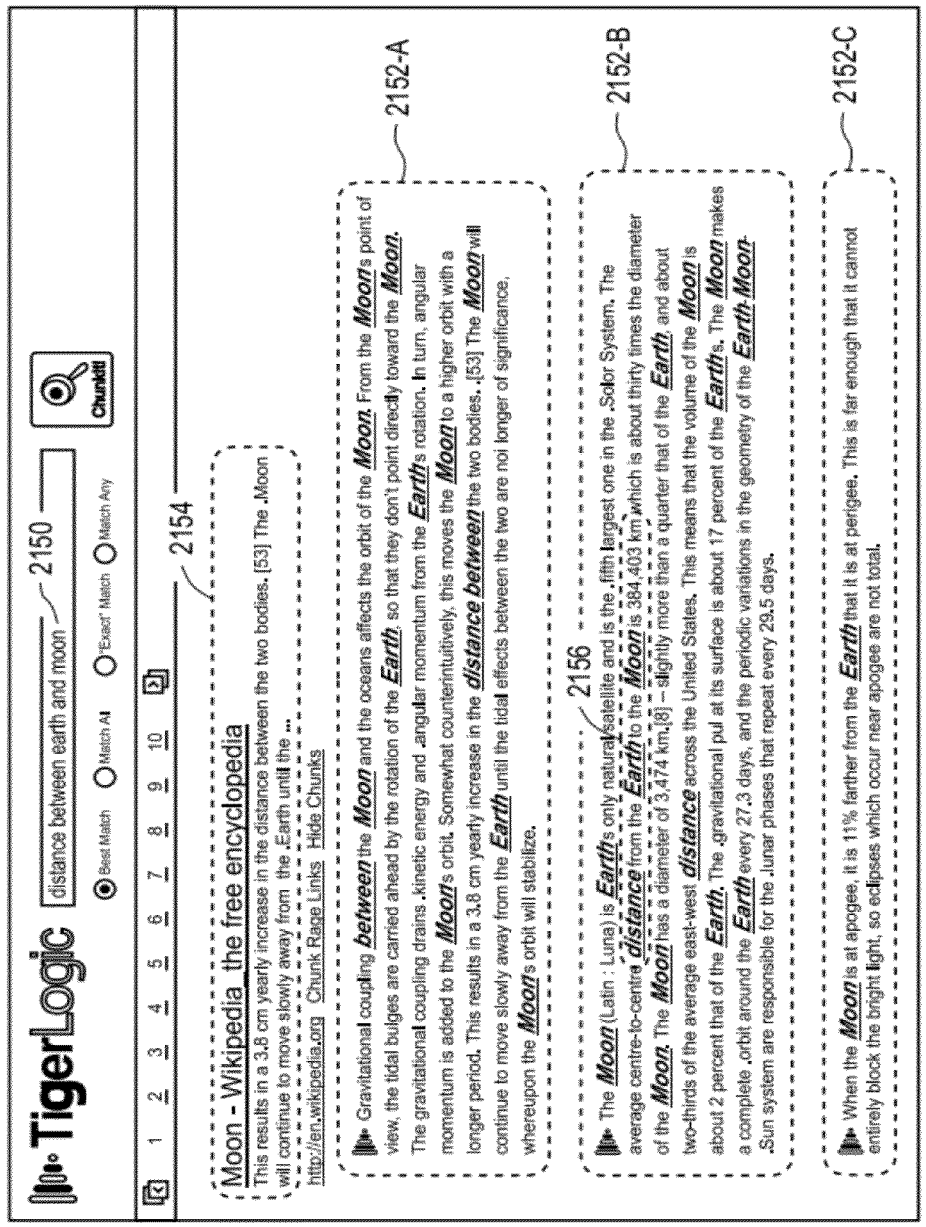
FIG. 21D is a screenshot of a graphical user interface on a computer display illustrative of features associated with the processes as shown in FIGS. 21A and 21B in accordance with some embodiments.

FIG. 21D is a screenshot of a graphical user interface on a computer display illustrative of features associated with the processes as shown in FIGS. 21A and 21B in accordance with some embodiments. In this example, the search keywords box includes five search keywords 2150, "distance between earth and moon," and the "Best Match" search option is chosen for selecting matching chunks.

Based on these search keywords, it is not difficult to appreciate that the user is probably interested in knowing the spatial distance between the earth and the moon. But as shown in FIG. 21D, the search result 2154 provided by a generic search tool is not satisfactory because it has nothing to do with the answer expected by the user although all the four search keywords are present in the search result (note that the term "and" is treated as a stop-word with no weight).

In contrast, a process according to some embodiments of the invention identifies multiple matching chunks within the same document, 2152-A through 2152-C, different chunks having different numbers of search keywords. In this example, the matching chunks are ordered by their matching levels to the search keywords. Therefore, the matching chunk 2152-A appears before the other two chunks because it includes at least one instance of each of the four search keywords, which is essentially an all-match chunk. But this chunk does not have the answer to the user's question either. Actually, it is the second matching chunk 2152-B that, although having no match for the search keyword "between," has the answer to the user's question, that is, the phrase 2156 "distance from the Earth to the Moon is 384,403 km." Thus, the user receives a satisfactory answer to his or her question from the matching chunks without visiting any of the candidate documents. Note that the same matching chunk 2152-B would have been ignored by the "Match All" and "'Exact' Match" options because it does not have the keyword "between."

Another application of the invention is to search a set of inter-related documents for contents matching a search request. This application is different from the conventional search tools, which always treat the Internet as the search space and perform all the searches in the entire search space no matter how irrelevant most of the documents in the space are to the user-specified search keywords. Consequently, many documents identified by the conventional search tool, although have nothing to do with the user's search interest, end up occupying prominent spots in the search results window. If a user is allowed to narrow the search space to a small set of user-specified documents, it is possible for a computer to produce more relevant search results at a fraction of the cost wasted by the conventional search tools.

Figure 22A:
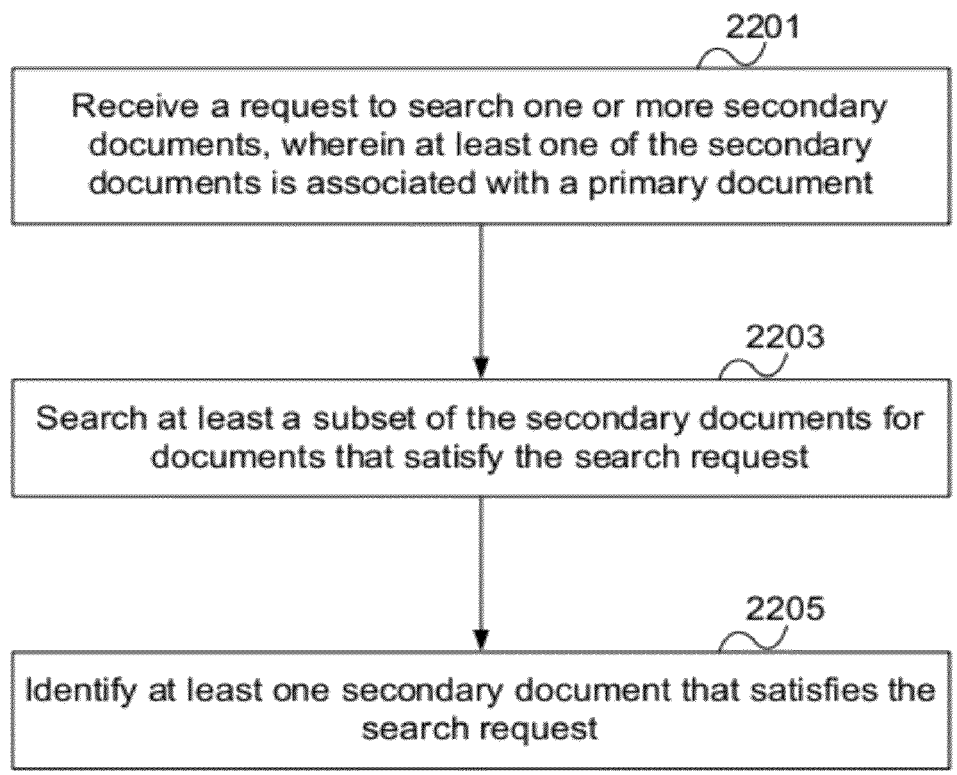
FIG. 22A is a flowchart illustrative of a process of identifying contents matching a search request within a plurality of inter-related documents in accordance with some embodiments.

FIG. 22A is a flowchart illustrative of a process of identifying contents matching a search request within a plurality of inter-related documents in accordance with some embodiments. In this application, a first document is inter-related to a second document if the first document includes a document link that either directly references the second document or indirectly references the second document by referencing a third document that directly or indirectly references the second document. The first document is also inter-related to the second document if they are both directly or indirectly referenced by a third document. As such, different documents referenced by respective document links within an HTML web page are referred to as "inter-related documents." In this case, the HTML web page is called "primary document" and the documents referenced by the web page are called "secondary documents."

A computer receives a request to search one or more secondary documents (2201). At least one of the secondary documents is associated with a primary document. The computer searches at least a subset of the secondary documents for documents that satisfy the search request (2203) and identifies at least one secondary document that satisfies the search request (2205).

In some embodiments, the computer first displays the primary document (e.g., a web page) on a display device (e.g., a computer monitor) before receiving the search request from a user. The primary document includes one or more document links, each document link referencing one of the secondary documents. After identifying the secondary document, which may be another web page or the like, the computer displays at least a portion of the identified secondary document to the user. The displayed portion of the secondary document preferably includes one or more search keywords in the search request.

In some embodiments, the computer locates within the identified secondary document one or more chunks that satisfy the search request using the approaches as described above and displays one or more of the identified chunks to the user.

In some embodiments, the primary document includes many document links pointing to a large number of secondary documents, many of which may have nothing to do with the user's search interest. For example, many web pages include links to boilerplate-type secondary documents such as "About Us," "Contact Us," "Sitemap," "Disclaimer," etc. Searching out these secondary documents rarely returns any useful search results. Thus, in some embodiments, rather than searching all the secondary documents referenced by the primary document, the user is allowed to select a subset of secondary documents to be searched by identifying document links associated with the user-selected secondary document.

For example, each of the subset of secondary documents can be selected by a respective mouse click of the corresponding document link in the primary document. Alternatively, the computer defines a region in the primary document using an input device and then identifies document links within the defined region as the user-selected document links. For example, the computer presses down a mouse's button at a first location and drags the mouse from one location to another location until releasing the mouse's button at a second location. By doing so, the user-selected region is a rectangle area defined by the first location and the second location and all the document links falling into this rectangle area are document links to secondary documents to be further searched in response to a search request.

In some embodiments, the computer searches both the primary and secondary documents for chunks that satisfy the search request, and as a result, identifies at least one chunk in the primary document and at least one chunk in one of the secondary documents, both chunks satisfying the search request. The chunks associated with the primary and secondary documents are visually separated by a bar such that it is intuitive for a user to distinguish chunks identified within the primary document and chunks identified within the secondary documents.

In some embodiments, the search of secondary documents is a recursive process. In response to a user request to search a secondary document, the computer recursively retrieves the secondary document and documents referenced by this secondary document. Thus, the search results may not only include chunks identified within the primary document but also chunks within a secondary document that is indirectly referenced by the primary document.

Figure 22B:
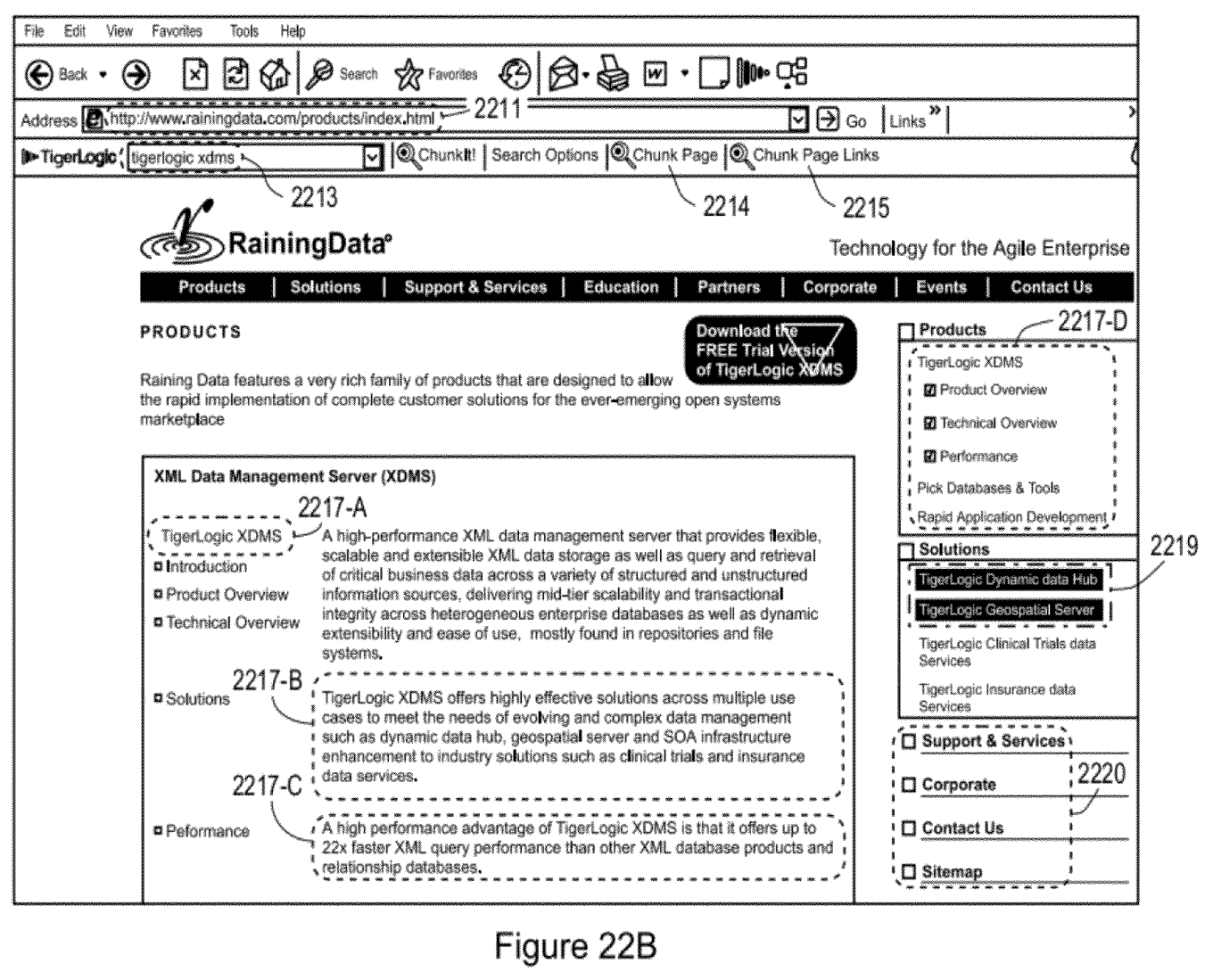
Figure 22C:
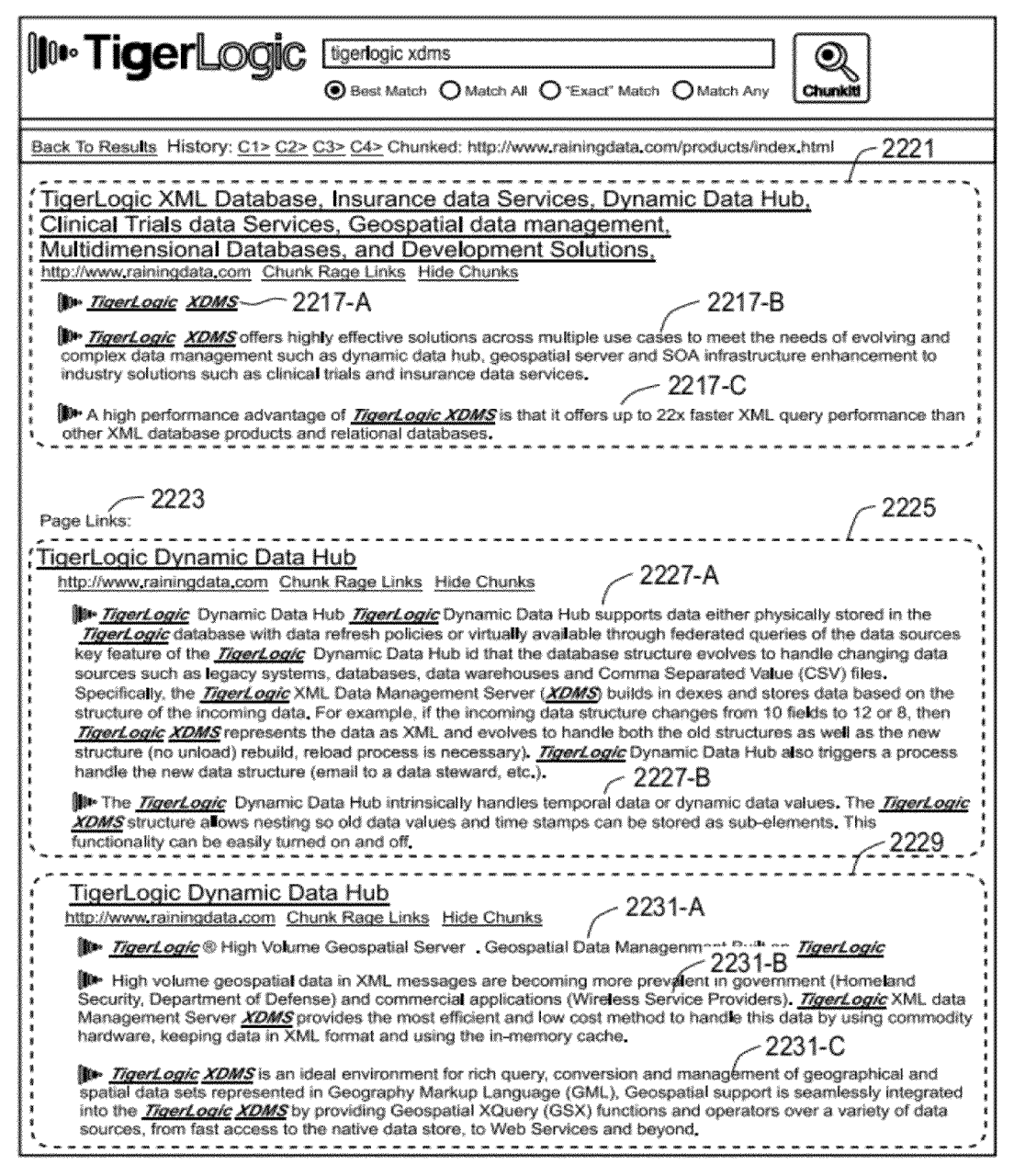
Figure 22D:
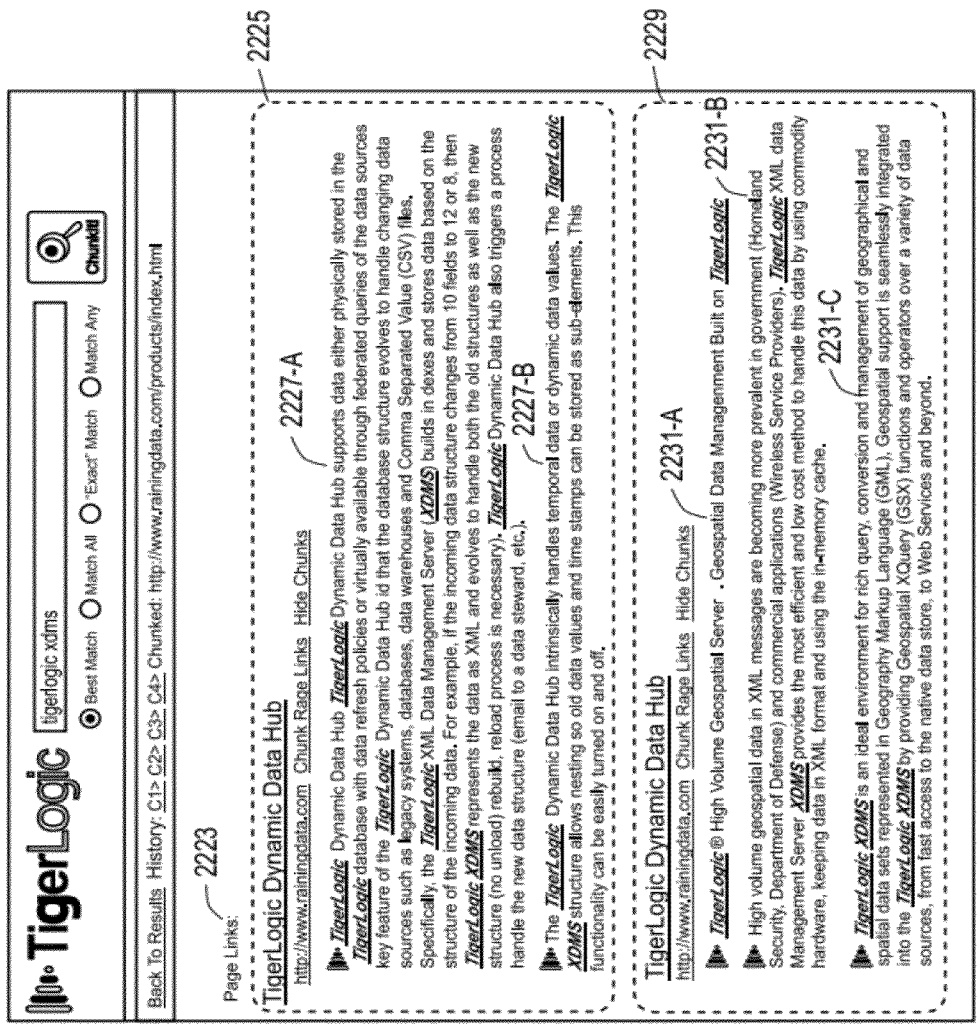

FIGS. 22B through 22D are screenshots of a graphical user interface on a computer display illustrative of features associated with the process as shown in FIG. 22A in accordance with some embodiments.

FIG. 22B is a screenshot of a web browser window rendering a web page identified by the URL 2211 http://www.rainingdata.com/products/index.html. There are two user-specified search keywords 2213 "tigerlogic xdms" in the search box. The screenshot depicts at least chunks 2217-A through 2217-D that match the two search keywords. The web page includes many document links. Some of the document links (e.g., links 2219) are likely to be related to the search keywords 2213 and others (e.g., links 2220) probably have nothing to do with the search keywords 2213. In this example, the user avoids searching secondary documents associated with the links 2220 by either mouse-clicking the links or defining a rectangle region covering the links.

After a user mouse-click of the "Chunk Page Links" icon 2215, the computer generates a plurality of chunks identified within the primary document and the secondary documents identified by the links 2219 as shown in the screenshot of FIG. 22C. Note that the search results 2221 associated with the primary document (including the chunks 2217-A through 2217-C) are separated from the search results 2225 and 2229, which are associated with the two secondary documents identified by the two links 2219, each including a respective set of matching chunks 2227's and 2231's. FIG. 22D is another screenshot that only depicts the search results from the secondary documents, nothing from the primary document.

Figure 23:
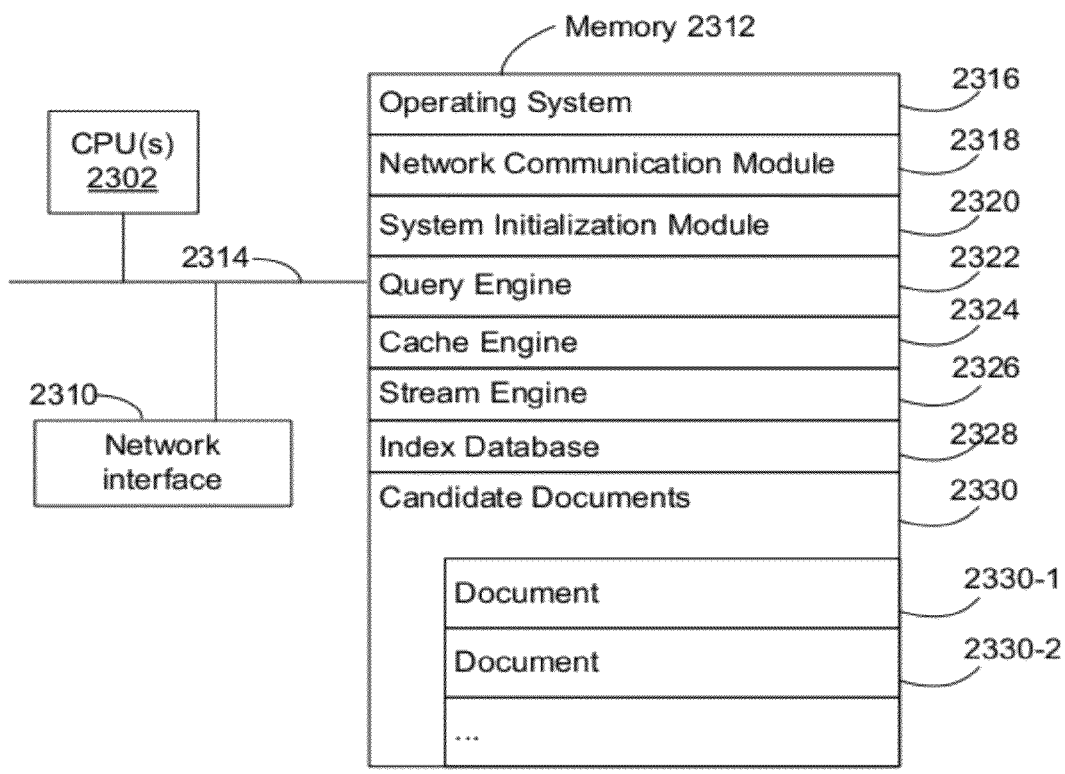
FIG. 23 is a block diagram of an exemplary document search server computer in accordance with some embodiments.

FIG. 23 is a block diagram of an exemplary document search server 2300 computer in accordance with some embodiments.

The exemplary document search server 2300 typically includes one or more processing units (CPU's) 2302, one or more network or other communications interfaces 2310, memory 2312, and one or more communication buses 2314 for interconnecting these components. The communication buses 2314 may include circuitry (sometimes called a chipset) that interconnects and controls communications between system components. The document search server 2300 may optionally include a user interface, for instance a display and a keyboard. Memory 2312 may include high speed random access memory and may also include non-volatile memory, such as one or more magnetic disk storage devices. Memory 2312 may include mass storage that is remotely located from the CPU's 2302. In some embodiments, memory 2312 stores the following programs, modules and data structures, or a subset or superset thereof:

- an operating system 2316 that includes procedures for handling various basic system services and for performing hardware dependent tasks;
- a network communication module 2318 that is used for connecting the document search server 2300 to other servers or computers via one or more communication networks (wired or wireless), such as the Internet, other wide area networks, local area networks, metropolitan area networks, and so on;
- a system initialization module 2320 that initializes other modules and data structures stored in memory 2312 required for the appropriate operation of the document search server 2300;
- a query engine 2322 for processing a user-driven search query and preparing relevant chunks in response to the search query;
- a cache engine 2324 for identifying candidate documents in response to the search query;
- a stream engine 2326 for retrieving candidate documents and identifying candidate chunks therein; and
- an index database 2328 for storing index information of a number of candidate documents 2330 accessible to the document search server 2300.

Figure 24:
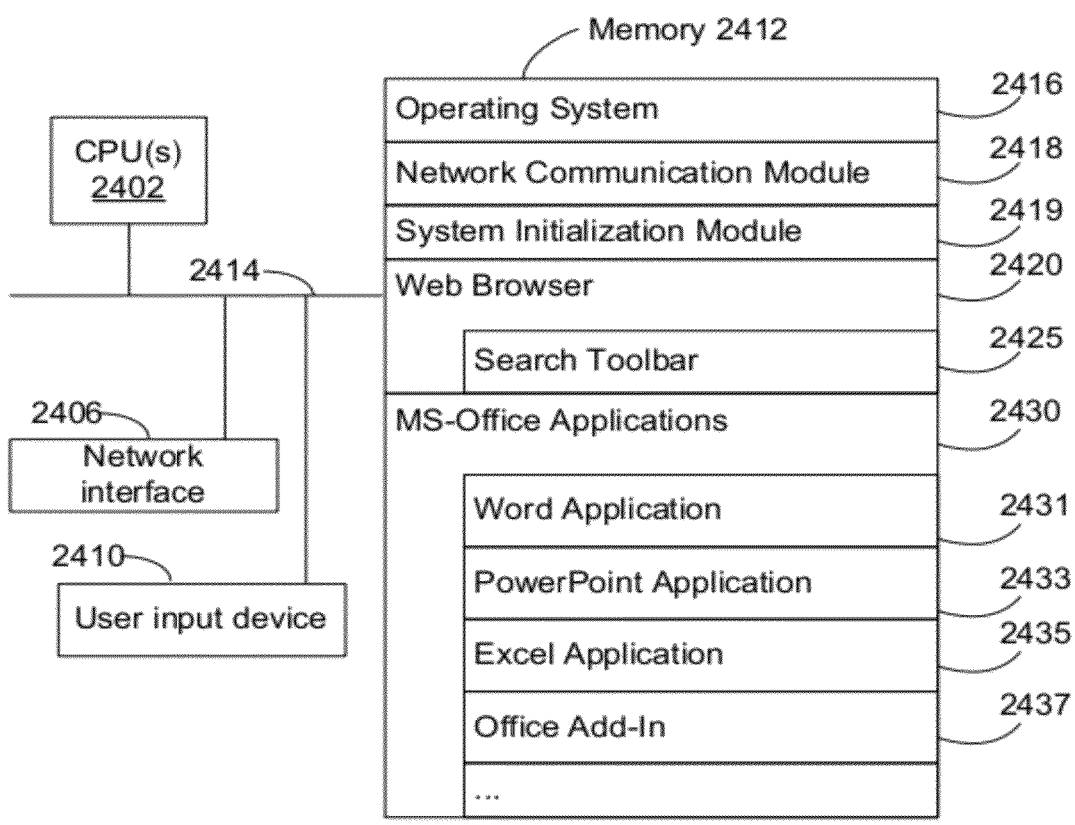
FIG. 24 is a block diagram of an exemplary client computer in accordance with some embodiments.

FIG. 24 is a block diagram of an exemplary client computer 2400 in accordance with some embodiments.

The exemplary client computer 2400 typically includes one or more processing units (CPU's) 2402, one or more network or other communications interfaces 2410, memory 2412, and one or more communication buses 2414 for interconnecting these components. The communication buses 2414 may include circuitry (sometimes called a chipset) that interconnects and controls communications between system components. The client computer 2400 may include a user input device 2410, for instance a display and a keyboard. Memory 2412 may include high speed random access memory and may also include non-volatile memory, such as one or more magnetic disk storage devices. Memory 2412 may include mass storage that is remotely located from the CPU's 2402. In some embodiments, memory 2412 stores the following programs, modules and data structures, or a subset or superset thereof:

- an operating system 2416 that includes procedures for handling various basic system services and for performing hardware dependent tasks;
- a network communication module 2418 that is used for connecting the client computer 2400 to the document search server 2300 or other computers via one or more communication networks (wired or wireless), such as the Internet, other wide area networks, local area networks, metropolitan area networks, and so on;
- a system initialization module 2419 that initializes other modules and data structures stored in memory 2412 required for the appropriate operation of the client computer 2400;
- a web browser 2420 for retrieving and displaying candidate documents including web pages from remote web servers;
- a search toolbar 2425 attached to the web browser 2420 for identifying relevant chunks within the retrieved candidate document and displaying the relevant chunks;
- one or more applications 2430 such as Microsoft Office Word application 2431, Microsoft Office PowerPoint application 2433, Microsoft Office Excel application 2435, etc.; and
- an add-in application 2437 attached to the Microsoft Office applications for displaying relevant chunks associated with user-specified search keywords and re-using the relevant chunks based on user instructions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, the aforementioned processes of identifying a relevant chunk within a document are by no means limited to a particular language such as English. Actually, the same processes are equally applicable to documents written in other languages and/or multi-lingual documents. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a computer having memory, a display, and a processor, while a document displayed on the display is being browsed:
   displaying a first portion of the document on the display;
   receiving a user-specified text string that includes multiple search keywords; and
   upon receiving the user-specified text string that includes multiple search keywords:
   comparing the multiple search keywords with a plurality of candidate chunks within the document, wherein each candidate chunk corresponds to a predefined semantically-based unit of text in the document;

identifying, among the plurality of candidate chunks, one or more chunks matching the multiple search keywords; and displaying, in addition to the first portion of the document, a list of the one or more chunks matching the multiple search keywords in the document on the display, wherein terms in a respective chunk that satisfy the search keywords are either ordered differently from the search keywords in the user-specified text string or separated from one another by at least one term that does not satisfy any of the search keywords.

2. The method of claim 1, further comprising:

detecting a user-selection of a first chunk from the list of one or more chunks; and upon detecting the user-selection of the first chunk from the list of one or more chunks, displaying, in addition to the list of one or more chunks, a second portion of the document in replacement of the first portion of the document on the display, the second portion including the first chunk.

3. The method of claim 1, wherein:

displaying, in addition to the first portion of the document, the list of one or more chunks includes displaying the list of one or more chunks in a first region of the display and displaying the first portion of the document in a second region of the display, the second region distinct from the first region.

4. The method of claim 1, further comprising:

detecting a user-selection of a second chunk from the list of one or more chunks; and upon detecting the user-selection of the second chunk from the list of one or more chunks, displaying, in addition to the list of one or more chunks in the document, a third portion of the document, the third portion including the second chunk.

5. The method of claim 1, wherein the first chunk is not located within the first portion of the document.

6. The method of claim 1, wherein the second region of the display is adjacent to the first region of the display.

7. A computer system, comprising:

one or more processors;

a display; and memory storing one or more programs for execution by the one or more processors, the one or more programs including instructions for:

while a document displayed on the display is being browsed:

displaying a first portion of the document on the display;

receiving a user-specified text string that includes multiple search keywords; and upon receiving the user-specified text string that includes multiple search keywords:

comparing the multiple search keywords with a plurality of candidate chunks within the document, wherein each candidate chunk corresponds to a predefined semantically-based unit of text in the document;

identifying, among the plurality of candidate chunks, one or more chunks matching the multiple search keywords; and displaying, in addition to the first portion of the document, a list of the one or more chunks matching the search keywords in the document on the display, wherein terms in a respective chunk that satisfy the search keywords are either ordered differently from the search keywords in the user-specified text string or separated from one another by at least one term that does not satisfy any of the search keywords.

8. The computer system of claim 7, wherein the one or more programs include instructions for:

detecting a user-selection of a first chunk from the list of one or more chunks; and upon detecting the user-selection of the first chunk from the list of one or more chunks, displaying, in addition to the list of one or more chunks, a second portion of the document in replacement of the first portion of the document on the display, the second portion including the first chunk.

9. The computer system of claim 7, wherein:

the instructions for displaying, in addition to the first portion of the document, the list of one or more chunks include instructions for displaying the list of one or more chunks in a first region of the display and displaying the first portion of the document in a second region of the display, the second region distinct from the first region.

10. The computer system of claim 7, wherein the one or more programs include instructions for:

detecting a user-selection of a second chunk from the list of one or more chunks; and upon detecting the user-selection of the second chunk from the list of one or more chunks, displaying, in addition to the list of one or more chunks in the document, a third portion of the document, the third portion including the second chunk.

11. The computer system of claim 7, wherein the first chunk is not located within the first portion of the document.

12. The computer system of claim 7, wherein the second region of the display is adjacent to the first region of the display.

13. A non-transitory computer readable storage medium having stored therein instructions, which, when executed by a computer system, cause the computer system with a display to:

while a document displayed on the display is being browsed:

display a first portion of the document on the display;

receive a user-specified text string that includes multiple search keywords; and upon receiving the user-specified text string that includes multiple search keywords:

compare the multiple search keywords with a plurality of candidate chunks within the document, wherein each candidate chunk corresponds to a predefined semantically-based unit of text in the document;

identify, among the plurality of candidate chunks, one or more chunks matching the multiple search keywords; and display, in addition to the first portion of the document, a list of the one or more chunks matching the multiple search keywords in the document on the display, wherein terms in a respective chunk that satisfy the search keywords are either ordered differently from the search keywords in the user-specified text string or separated from one another by at least one term that does not satisfy any of the search keywords.

14. The computer readable storage medium of claim 13, wherein the instructions cause the computer system to:

detect a user-selection of a first chunk from the list of one or more chunks; and upon detecting the user-selection of the first chunk from the list of one or more chunks, display, in addition to the list of one or more chunks, a second portion of the document in replacement of the first portion of the document on the display, the second portion including the first chunk.

15. The computer readable storage medium of claim 13, wherein:
the instructions for displaying, in addition to the first portion of the document, the list of one or more chunks include instructions for displaying the list of one or more chunks in a first region of the display and displaying the first portion of the document in a second region of the display, the second region distinct from the first region.

16. The computer readable storage medium of claim 13, wherein the instructions cause the computer system to:
detect a user-selection of a second chunk from the list of one or more chunks; and
upon detecting the user-selection of the second chunk from the list of one or more chunks, display, in addition to the list of one or more chunks in the document, a third portion of the document, the third portion including the second chunk.

17. The computer readable storage medium of claim 13, wherein the first chunk is not located within the first portion of the document.

* * * * *